(12) United States Patent
Wakizaka et al.

(10) Patent No.: US 10,436,948 B2
(45) Date of Patent: Oct. 8, 2019

(54) OPTICAL FILM, PROCESS FOR PRODUCING OPTICAL FILM, POLARIZER, AND IMAGE DISPLAY DEVICE

(71) Applicant: FUJIFILM Corporation, Tokyo (JP)

(72) Inventors: Daiki Wakizaka, Kanagawa (JP); Miho Asahi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 753 days.

(21) Appl. No.: 14/883,312

(22) Filed: Oct. 14, 2015

(65) Prior Publication Data

US 2016/0033687 A1 Feb. 4, 2016

Related U.S. Application Data

(63) Continuation of application No. PCT/JP2014/060442, filed on Apr. 10, 2014.

(30) Foreign Application Priority Data

Apr. 15, 2013 (JP) ................................ 2013-085260

(51) Int. Cl.
| | |
|---|---|
| *G02B 1/14* | (2015.01) |
| *G02B 1/12* | (2006.01) |
| *G02B 5/30* | (2006.01) |
| *G02F 1/1335* | (2006.01) |
| *G02B 1/04* | (2006.01) |

(52) U.S. Cl.
CPC ................ *G02B 1/14* (2015.01); *G02B 1/12* (2013.01); *G02B 5/3033* (2013.01); *G02B 1/04* (2013.01); *G02F 2001/133521* (2013.01); *Y10T 428/1036* (2015.01); *Y10T 428/1059* (2015.01)

(58) Field of Classification Search
CPC ... G02B 1/04; G02B 1/12; G02B 1/14; G02B 5/3033; C08L 33/10; C08L 33/26; G02F 2001/133521; Y10T 428/1036; Y10T 428/1059
See application file for complete search history.

(56) References Cited

U.S. PATENT DOCUMENTS

| 2,883,372 A | * | 4/1959 | Stamatoff | ............. C08F 210/00 526/159 |
|---|---|---|---|---|
| 2009/0099308 A1 | | 4/2009 | Takebe et al. | |
| 2015/0022748 A1 | | 1/2015 | Takeda et al. | |

FOREIGN PATENT DOCUMENTS

| JP | 07228673 A | * | 8/1995 |
|---|---|---|---|
| JP | 2006-083225 A | | 3/2006 |
| JP | 2006083225 A | * | 3/2006 |
| JP | 2008-015500 A | | 1/2008 |
| JP | 2008-107499 A | | 5/2008 |
| JP | 2008107499 A | * | 5/2008 |
| JP | 2008-158483 A | | 7/2008 |
| JP | 2008-230036 A | | 10/2008 |
| JP | 2011-080984 A | | 4/2011 |
| WO | 2009/047924 A1 | | 4/2009 |
| WO | 2013/153960 A1 | | 10/2013 |

OTHER PUBLICATIONS

International Search Report dated Jul. 15, 2014 in connection with Application No. PCT/JP2014/060442.
Written Opinion of the International Searching Authority dated Jul. 15, 2014 in connection with International Patent Application No. PCT/JP2014/060442.

* cited by examiner

*Primary Examiner* — Sophie Hon
(74) *Attorney, Agent, or Firm* — Edwards Neils LLC; Jean C. Edwards, Esq.

(57) ABSTRACT

There is provided an optical film which includes a light transmissive support body containing a thermoplastic resin, a layer containing the thermoplastic resin and a resin cured with light and/or heat, and a layer containing a resin same as the resin cured with light and/or heat and a cyclic polyolefin-based resin in this order.

21 Claims, No Drawings

OPTICAL FILM, PROCESS FOR PRODUCING OPTICAL FILM, POLARIZER, AND IMAGE DISPLAY DEVICE

CROSS REFERENCE TO RELATED APPLICATION

This is a continuation of International Application No. PCT/JP2014/060442 filed on Apr. 10, 2014, which was published under PCT Article 21(2) in Japanese, and claims priority from Japanese Patent Application No. 2013-085260 filed on Apr. 15, 2013, the entire disclosures of all of which are incorporated herein by reference in their entirety.

BACKGROUND OF THE INVENTION

1. Field of the Invention

The present invention relates to an optical film, a process for producing an optical film, a polarizer, and an image display device.

2. Description of the Related Art

Recently, a liquid crystal display device has been widely used for a liquid crystal television, and a liquid crystal panel of a personal computer, a mobile phone, and a digital camera, and the like. In general, the liquid crystal display device includes a liquid crystal panel member having polarizers on both sides of a liquid crystal cell, and controls light from a backlight member by the liquid crystal panel member, and thus performs display. Here, the polarizer is formed of a polarizing element and protective films on both sides of the polarizing element, a general polarizing element is obtained by dyeing a stretched polyvinyl alcohol (PVA)-based film with iodine or a dichroic dye, and a cellulose ester film or the like is used as the protective film.

Recently, the liquid crystal display device has been relentlessly required to have high quality, versatile application, and durability. For example, when the liquid crystal display device is used in outdoor applications, stability with respect to an environmental change is required, and an optical film such as the protective film for a polarizer described above or an optical compensation film used in the liquid crystal display device is also required to suppress a change in dimension or optical properties with respect to a change in temperature or humidity. As a problem of the liquid crystal display device which is exposed to a high temperature and high humidity environment, warping of the liquid crystal cell of the liquid crystal display device, and the occurrence of display unevenness are included, and it is considered that this is because a shrinkage difference is generated between the polarizers on a front surface and a back surface of the liquid crystal cell of the liquid crystal display device due to a change in temperature and humidity of the use environment of the polarizer and the optical film configuring the polarizer, the balance is broken, and thus the liquid crystal cell is warped, and four corners or four sides of the liquid crystal cell are in contact with a housing or member on the back surface side, and thus the display unevenness occurs. For this reason, the protective film of the polarizer, the optical compensation film, and the like have been required to improve humidity dependency resistance and moisture-heat resistance, and in order to drastically improve these properties, the optical film on an outermost surface of the polarizer on a visible side has been required to reduce moisture permeability.

In WO2009/047924A, in order to provide an optical film having high transparency, low hygroscopicity, high heat resistance, and high mechanical strength, an optical film is disclosed in which a large amount of acrylic resin such as polymethyl methacrylate (PMMA) is added to cellulose ester.

On the other hand, a film has also been known in which a layer of low moisture permeability is disposed on a light transmissive support body. For example, in JP2006-83225A, a film is disclosed in which a layer of low moisture permeability formed of a composition containing a compound having an alicyclic hydrocarbon group and two or more ethylenically unsaturated double bond groups in a molecule is disposed on a light transmissive support body of cellulose acylate having a film thickness of 80 μm, and moisture permeability measured on the basis of JIS Z 0208 under an atmosphere of 60° C. and a relative humidity of 95% is approximately 610 g/m²/day to 1000 g/m²/day.

In addition, in JP2008-230036A, a film is disclosed in which a layer of low moisture permeability containing a resin having a repeating unit derived from a chlorine-containing vinyl monomer is disposed on a light transmissive support body of cellulose acylate having a film thickness of 80 μm.

SUMMARY OF THE INVENTION

The liquid crystal display device is used not only in indoor applications of the related art, but also in a more severe environment such as outdoor applications, and thus it is more important for the optical film on the outermost surface of the liquid crystal display device on the visible side to have lower moisture permeability. In addition, as the material of the protective film for a polarizer used in a liquid crystal display, a thermoplastic resin such as a cellulose-based resin or an acrylic resin is preferably used from a viewpoint of workability and versatility. However, it is difficult to reduce moisture permeability while ensuring the workability and the versatility only by the film, and thus the film formed of the thermoplastic resin such as the cellulose-based resin or the acrylic resin has been required to be improved.

The present inventors have focused on a cyclic polyolefin-based resin which is a material having extremely low moisture permeability in order to provide an optical film having low moisture permeability. However, it has been known that when a film formed of a cyclic polyolefin-based resin is laminated on the film formed of the thermoplastic resin such as the cellulose-based resin or the acrylic resin, adhesiveness between the film formed of the thermoplastic resin and the film formed of the cyclic polyolefin-based resin deteriorates. It is considered that this is because the cyclic polyolefin-based resin is extremely hydrophobic with respect to the thermoplastic resin such as the cellulose-based resin or the acrylic resin, and thus has low affinity, and even though means for mixing a base material and a binder by using a solvent which dissolves the base material is generally known in order to improve the adhesiveness, it is difficult to dissolve the cyclic polyolefin-based resin in a solvent which dissolves the cellulose-based resin or the acrylic resin.

In consideration of the above circumstances, an object of the present invention, that is, a problem to be solved by the present invention is to provide an optical film having excellent adhesiveness between a light transmissive support body and each layer and low moisture permeability, and a process for producing the optical film.

As a result of intensive studies of the present inventors, it has been found that an optical film having excellent adhesiveness and low moisture permeability is able to be provided by using the following means, and thus the present invention has been completed.

[1] An optical film, including, in this order, a light transmissive support body containing a thermoplastic resin; a layer containing the thermoplastic resin and a resin cured with light and/or heat; and a layer containing a resin same as the resin cured with light and/or heat and a cyclic polyolefin-based resin.

[2] The optical film according to [1], in which the resin cured with light and/or heat is a cured material of a multi-functional monomer or oligomer having two or more epoxy groups, oxetanyl groups, or ethylenically unsaturated double bond groups.

[3] The optical film according to [2], in which the multifunctional monomer or oligomer is a compound having an alicyclic hydrocarbon group.

[4] The optical film according to [3], in which the alicyclic hydrocarbon group of the compound having an alicyclic hydrocarbon group is a group denoted by General Formula (I) or (IV) described below.

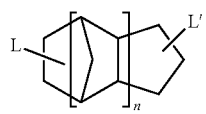

(I)

In General Formula (I), L and L' each independently represent a bivalent or more linking group, and n represents an integer of 1 to 3.

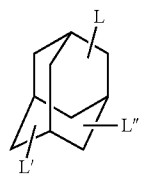

(IV)

In General Formula (IV), L and L' each independently represent a bivalent or more linking group, and L" represents a hydrogen atom or a bivalent or more linking group.

[5] The optical film according to any one of [1] to [4], in which the cyclic polyolefin-based resin is a polymer having a structural unit derived from cyclic olefin denoted by General Formula (B-II) or (B-III) described below.

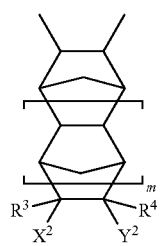

General Formula (B-II)

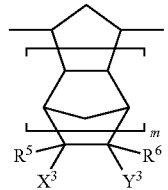

General Formula (B-III)

In General Formulas (B-II) and m represents an integer of 0 to 4. $R^3$ to $R^6$ each independently represent a hydrogen atom or a hydrocarbon group having 1 to 10 carbon atoms, $X^2$ and $X^3$, and $Y^2$ and $Y^3$ each independently represent a hydrogen atom, a hydrocarbon group having 1 to 10 carbon atoms, a halogen atom, a hydrocarbon group having 1 to 10 carbon atoms which is substituted with a halogen atom, a vinyl group which may have a substituent group, a (meth) acryloyl group, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOZ$, $-(CH_2)_nW$, or $(-CO)_2O$, $(-CO)_2NR^{15}$ configured of $X^2$ and $Y^2$, or $X^3$ and $Y^3$. Furthermore, $R^{11}$, $R^{12}$, $R^{13}$, $R^{14}$, and $R^{15}$ each independently represent a hydrogen atom, a hydrocarbon group having 1 to 20 carbon atoms, Z represents a hydrocarbon group or a hydrocarbon group substituted with halogen, W represents $SiR^{16}_pD_{3-p}$ ($R^{16}$ represents a hydrocarbon group having 1 to 10 carbon atoms, D represents a halogen atom, $-OCOR^{16}$, or $-OR^{16}$, and p represents an integer of 0 to 3), and n represents an integer of 0 to 10.

[6] The optical film according to [5], in which in General Formula (B-II) or (B-III) described above, m represents 0 or 1, and $R^3$ to $R^6$, $X^2$ and $X^3$, and $Y^2$ and $Y^3$ each represent a hydrogen atom.

[7] The optical film according to any one of [1] to [6], in which the cyclic polyolefin-based resin contains the structural unit derived from the cyclic olefin in the amount of less than or equal to 90 mass % with respect to the total mass of the cyclic polyolefin-based resin.

[8] The optical film according to any one of [1] to [7], in which the thermoplastic resin contained in the light transmissive support body contains a cellulose-based resin as a main component.

[9] The optical film according to any one of [1] to [7], in which the thermoplastic resin contained in the light transmissive support body contains a (meth)acrylic resin as a main component.

[10] The optical film according to any one of [1] to [9], in which moisture permeability of the optical film at 40° C. and a relative humidity of 90% is less than 200 g/m²/day.

[11] A process for producing an optical film including a layer containing a cyclic polyolefin-based resin on at least one surface of a light transmissive support body containing a thermoplastic resin, the process including, in this order, (a) a step of disposing a coated layer by applying a first composition containing at least a compound which is able to form a resin by being cured with light and/or heat and a first solvent onto the light transmissive support body; (b) a step of applying a second composition containing at least a cyclic polyolefin-based resin and a second solvent onto the same surface as that of the light transmissive support body on which the coated layer is disposed in the step of (a); and (c) a step of forming a resin by curing the compound which is able to form a resin by being cured with light and/or heat using light irradiation and/or heating.

[12] The process for producing an optical film according to [11], in which a reaction rate of the compound which is able to form a resin by being cured with light and/or heat in the coated layer obtained in the step of (a) at the time of performing the step of (b) is less than 80%.

[13] The process for producing an optical film according to [11] or [12], in which the compound which is able to form a resin by being cured with light and/or heat is a monomer or an oligomer which is dissolved in the second solvent in the amount of greater than or equal to 30 mass %.

[14] The process for producing an optical film according to any one of [11] to [13], in which the second solvent is an alicyclic hydrocarbon-based solvent or an aromatic hydrocarbon-based solvent.

[15] The process for producing an optical film according to [14], in which the alicyclic hydrocarbon-based solvent or the aromatic hydrocarbon-based solvent is at least one selected from cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroinden, cyclooctane, toluene, and xylene.

[16] The process for producing an optical film according to any one of [11] to [15], in which the first solvent is a solvent which dissolves or swells the light transmissive support body.

[17] The process for producing an optical film according to [16], in which the solvent which dissolves or swells the light transmissive support body is at least one selected from methyl ethyl ketone, methyl acetate, methyl acetoacetate, cyclohexanone, acetone, dimethyl carbonate, and diethyl carbonate.

[18] A polarizer including the optical film according to any one of [1] to [10].

[19] An image display device, including the optical film according to any one of [1] to [10]; or the polarizer according to [18].

According to the present invention, it is possible to provide an optical film having excellent adhesiveness between a light transmissive support body and each layer and low moisture permeability, and a process for producing the optical film.

DESCRIPTION OF THE PREFERRED EMBODIMENTS

Hereinafter, embodiments of the present invention will be described in detail, but the present invention is not limited thereto. Furthermore, herein, when a numerical value indicates a physical property value, a characteristic value, and the like, an expression such as "(numerical value 1) and (numerical value 2)" indicates "greater than (numerical value 1) and less than (numerical value 2)". In addition, herein, an expression of "(meth)acrylate" indicates "at least any one of acrylate and methacrylate". The same applies to "(meth)acrylic acid", "(meth)acryloyl", and the like.

[Optical Film]

An optical film of the present invention includes a light transmissive support body containing a thermoplastic resin, a layer containing the thermoplastic resin and a resin cured with light and/or heat (also referred to as a "layer A"), and a layer containing the resin cured with light and/or heat and a cyclic polyolefin-based resin (also referred to as a "layer B") in this order.

[Light Transmissive Support Body]
<Thermoplastic Resin Contained in Light Transmissive Support Body>

The optical film of the present invention includes the light transmissive support body containing the thermoplastic resin.

The thermoplastic resin which is able to be preferably used in the light transmissive support body will be described.

In the light transmissive support body described above, as an optimal thermoplastic resin, a (meth)acrylic resin, a polycarbonate-based resin, a polystyrene-based resin, an olefin-based resin, a cellulose-based resin, and the like are included, and the optimal thermoplastic resin is able to be selected from these resins and a mixed resin of a plurality of types of resins (here, the (meth)acrylic resin described above contains a polymer having a lactone ring structure, a polymer having a glutaric acid anhydride ring structure, and a polymer having a glutarimide ring structure).

Among them, a (meth)acrylic resin, a polycarbonate-based resin, a polystyrene-based resin, cellulose acylate having two or more types of acyl groups, and a mixed resin of a plurality of types of resins are preferable, a (meth)acrylic resin, cellulose acylate having two or more types of acyl groups, and a mixed resin of a plurality of types of resins are more preferable, and a polymer having a lactone ring structure or cellulose acetate propionate is particularly preferable.

((Meth)Acrylic Resin)

It is preferable that the light transmissive support body used in the present invention contains a (meth)acrylic polymer as a main component. Furthermore, herein, the expression that the light transmissive support body contains the (meth)acrylic polymer as the main component indicates that the (meth)acrylic polymer is contained in the light transmissive support body in the amount of greater than or equal to 50 mass %.

Furthermore, in the (meth)acrylic polymer, derivatives of acrylate/methacrylate are contained, and in particular, a (co)polymer of acrylic ester/methacrylic ester is also contained.

((Meth)Acrylic Polymer)

It is preferable that the (meth)acrylic acid-based polymer described above has a repeating structural unit derived from a (meth)acrylic ester monomer as a repeating structural unit.

The (meth)acrylic acid-based polymer described above may further contain a repeating structural unit which is constructed by polymerizing at least one selected from a hydroxyl group-containing monomer, an unsaturated carboxylic acid, and a monomer denoted by General Formula (201) described below as the repeating structural unit.

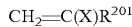　　　　　General Formula (201)

(in the formula, $R^{201}$ represents a hydrogen atom or a methyl group, X represents a hydrogen atom, an alkyl group having 1 to 20 carbon atoms, an aryl group, a —CN group, a —CO—$R^{202}$ group, or a —O—CO—$R^{203}$ group, and $R^{202}$ and $R^{203}$ represent a hydrogen atom or an organic residue having 1 to 20 carbon atoms.)

The (meth)acrylic ester described above is not particularly limited, and as the (meth)acrylic ester, for example, acrylic ester such as methyl acrylate, ethyl acrylate, n-butyl acrylate, isobutyl acrylate, t-butyl acrylate, cyclohexyl acrylate, and benzyl acrylate; methacrylic ester such as methyl methacrylate, ethyl methacrylate, propyl methacrylate, n-butyl methacrylate, isobutyl methacrylate, t-butyl methacrylate, cyclohexyl methacrylate, and benzyl methacrylate; and the like are included, and only one type of the (meth)acrylic ester may be used, or two or more types thereof may be used in combination. Among them, in particular, a methyl methacrylate is preferable from a viewpoint of excellent heat resistance and transparency.

When the (meth)acrylic ester described above is used, the content ratio of the (meth)acrylic ester in a monomer component provided to a polymerization process is preferably 10 mass % to 100 mass %, is more preferably 20 mass % to 100 mass %, is even more preferably 40 mass % to 100 mass %, and is particularly preferably 50 mass % to 100 mass %, in order to sufficiently exhibit the effect of the present invention.

The hydroxyl group-containing monomer described above is not particularly limited, as the hydroxyl group-containing monomer, for example, 2-(hydroxyalkyl)acrylic ester such as α-hydroxymethyl styrene, α-hydroxyethyl styrene, and methyl 2-(hydroxyethyl) acrylate; 2-(hydroxyalkyl)acrylate such as 2-(hydroxyethyl)acrylate; and the like are included, and only one type of the hydroxyl group-containing monomer may be used, or two or more types thereof may be used in combination.

When the hydroxyl group-containing monomer described above is used, the content ratio of the hydroxyl group-containing monomer in the monomer component provided to the polymerization process is preferably 0 mass % to 30 mass %, is more preferably 0 mass % to 20 mass %, is even more preferably 0 mass % to 15 mass %, and is particularly preferably 0 mass % to 10 mass %, in order to sufficiently exhibit the effect of the present invention.

As the unsaturated carboxylic acid described above, for example, an acrylic acid, a methacrylic acid, a crotonic acid, an α-substituted acrylic acid, an α-substituted methacrylic acid, and the like are included, and only one type of the unsaturated carboxylic acid may be used, or two or more types thereof may be used in combination. Among them, in particular, an acrylic acid, and a methacrylic acid are preferable, in order to sufficiently exhibit the effect of the present invention.

When the unsaturated carboxylic acid described above is used, the content ratio of the unsaturated carboxylic acid in the monomer component provided to the polymerization process is preferably 0 mass % to 30 mass %, is more preferably 0 mass % to 20 mass %, is even more preferably 0 mass % to 15 mass %, and is particularly preferably 0 mass % to 10 mass %, in order to sufficiently exhibit the effect of the present invention.

As the monomer denoted by General Formula (201) described above, for example, styrene, vinyl toluene, α-methyl styrene, acrylonitrile, methyl vinyl ketone, ethylene, propylene, vinyl acetate, and the like are included, and only one type of the monomer may be used, or two or more types thereof may be used in combination. Among them, in particular, styrene, and α-methyl styrene are preferable, in order to sufficiently exhibit the effect of the present invention.

When the monomer denoted by General Formula (201) described above is used, the content ratio of the monomer in the monomer component provided to the polymerization process is preferably 0 mass % to 30 mass %, is more preferably 0 mass % to 20 mass %, is even more preferably 0 mass % to 15 mass %, and is particularly preferably 0 mass % to 10 mass %, in order to sufficiently exhibit the effect of the present invention.

[(Meth)Acrylic Polymer Having Ring Structure in Main Chain]

Among the (meth)acrylic polymers, a (meth)acrylic polymer having a ring structure in a main chain is preferable. By introducing the ring structure to the main chain, it is possible to increase the rigidity of the main chain and to improve heat resistance.

In the present invention, among the (meth)acrylic polymers having a ring structure in the main chain, any one of a polymer having a lactone ring structure in a main chain, a polymer having a glutaric acid anhydride ring structure in a main chain, and a polymer having a glutarimide ring structure in a main chain is preferable.

Hereinafter, these polymers having a ring structure in the main chain will be described in sequence.

((Meth)Acrylic Polymer Having Lactone Ring Structure in Main Chain)

The (meth)acrylic polymer having a lactone ring structure in the main chain (hereinafter, also referred to as lactone ring-containing polymer) is not particularly limited insofar as the (meth)acrylic polymer has a lactone ring in the main chain, and preferably, the (meth)acrylic polymer has a lactone ring structure denoted by General Formula (401) described below.

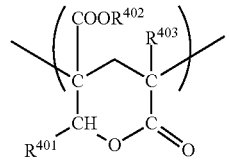

General Formula (401)

In General Formula (401), $R^{401}$, $R^{402}$, and $R^{403}$ each independently represent a hydrogen atom or an organic residue having 1 to 20 carbon atoms, and the organic residue may contain an oxygen atom. Here, as the organic residue having 1 to 20 carbon atoms, a methyl group, an ethyl group, an isopropyl group, a n-butyl group, a t-butyl group, and the like are included.

The content ratio of the lactone ring structure denoted by General Formula (401) described above in the structure of the lactone ring-containing polymer is preferably 5 mass % to 90 mass %, is more preferably 10 mass % to 70 mass %, is even more preferably 10 mass % to 60 mass %, and is particularly preferably 10 mass % to 50 mass %. By setting the content ratio of the lactone ring structure to be greater than or equal to 5 mass %, the heat resistance and the surface hardness of the obtained polymer tend to be improved, and by setting the content ratio of the lactone ring structure to be less than or equal to 90 mass %, the molding workability of the obtained polymer tends to be improved.

A manufacturing method of the lactone ring-containing polymer is not particularly limited, and preferably, the lactone ring-containing polymer is obtained through a lactone cyclocondensation step in which a polymer (p) having a hydroxyl group and an ester group in a molecule chain is obtained by a polymerization process, and then the obtained polymer (p) is subjected to a heat treatment, and thus a lactone ring structure is introduced to the polymer.

The weight average molecular weight of the lactone ring-containing polymer is preferably 1,000 to 2,000,000, is more preferably 5,000 to 1,000,000, is even more preferably 10,000 to 500,000, and is particularly preferably 50,000 to 500,000.

The mass reduction rate of the lactone ring-containing polymer in a range of 150° C. to 300° C. in dynamic TG measurement may be preferably less than or equal to 1%, may be more preferably less than or equal to 0.5%, and may be even more preferably less than or equal to 0.3%. As a measurement method of the dynamic TG, a method disclosed in JP2002-138106A is able to be used.

The lactone ring-containing polymer has a high cyclocondensation reaction rate, and thus a dealcoholation reaction decreases in the manufacturing process of a molded product, and it is possible to prevent intrusion of foam or silver streaks into the molded product after being molded due to the alcohol described above. Further, according to a high cyclocondensation reaction rate, the lactone ring structure is sufficiently introduced to the polymer, and thus the obtained lactone ring-containing polymer has high heat resistance.

When the lactone ring-containing polymer is a chloroform solution having a concentration of 15 mass %, the coloring degree (YI) thereof is preferably less than or equal to 6, is more preferably less than or equal to 3, is even more preferably less than or equal to 2, and is particularly preferably less than or equal to 1. When the coloring degree (YI) is less than or equal to 6, transparency is rarely impaired by coloration, and thus is able to be preferably used in the present invention.

The 5% mass reduction temperature of the lactone ring-containing polymer in thermal mass analysis (TG) is preferably higher than or equal to 330° C., is more preferably higher than or equal to 350° C., and is even more preferably higher than or equal to 360° C. The 5% mass reduction temperature in the thermal mass analysis (TG) is the index of thermal stability, and when the 5% mass reduction temperature is higher than or equal to 330° C., sufficient thermal stability tends to be easily exhibited. In the thermal mass analysis, a measurement device of the dynamic TG described above is able to be used.

The glass transition temperature (Tg) of the lactone ring-containing polymer is preferably higher than or equal to 115° C., is more preferably higher than or equal to 125° C., is even more preferably higher than or equal to 130° C., is particularly preferably higher than or equal to 135° C., and is most preferably higher than or equal to 140° C.

The total amount of residual volatile components contained in the lactone ring-containing polymer is preferably less than or equal to 5,000 ppm, is more preferably less than or equal to 2,000 ppm, is even more preferably less than or equal to 1,500 ppm, and is particularly preferably less than or equal to 1,000 ppm. When the total amount of the residual volatile components is less than or equal to 5,000 ppm, coloring due to a change in quality at the time of molding, foaming, or molding failure such as silver streaks rarely occurs, and thus setting the total amount to be less than or equal to 5,000 ppm is preferable.

The total light transmittance of the lactone ring-containing polymer which is measured with respect to a molded product obtained by injection molding by using a method based on ASTM-D-1003 is preferably greater than or equal to 85%, is more preferably greater than or equal to 88%, and is even more preferably greater than or equal to 90%. The total light transmittance is the index of transparency, and when the total light transmittance is greater than or equal to 85%, transparency tends to be improved.

When polymerization is performed by using a solvent, a polymerization solvent is not particularly limited, and as the polymerization solvent, for example, an aromatic hydrocarbon-based solvent such as toluene, xylene, and ethyl benzene; a ketone-based solvent such as methyl ethyl ketone (MEK), and methyl isobutyl ketone; an ether-based solvent such as tetrahydrofuran; and the like are included, and only one type of the polymerization solvent may be used, or two or more types thereof may be used in combination.

In addition, in a first aspect of the manufacturing method of the present invention, the light transmissive support body is formed by dissolving (meth)acrylic resin in an organic solvent and by casting the solution, and thus the organic solvent at the time of synthesizing the (meth)acrylic resin is not limited compared to a case of performing melting film forming, and the (meth)acrylic resin may be synthesized by using an organic solvent having a high boiling point.

At the time of a polymerization reaction, as necessary, a polymerization initiator may be added. The polymerization initiator is not particularly limited, and as the polymerization initiator, for example, organic peroxide such as cumene hydroperoxide, diisopropyl benzene hydroperoxide, di-t-butyl peroxide, lauroyl peroxide, benzoyl peroxide, t-butyl peroxyisopropyl carbonate, and t-amyl peroxy-2-ethyl hexanoate; an azo compound such as 2,2'-azobis(isobutyronitrile), 1,1'-azobis(cyclohexane carbonitrile), and 2,2'-azobis(2,4-dimethyl valeronitrile); and the like are included, and only one type of the polymerization initiator may be used, or two or more types thereof may be used in combination. The used amount of the polymerization initiator may be suitably set according to a combination of monomers to be used, reaction conditions, and the like, but is not particularly limited.

By adjusting the amount of the polymerization initiator, it is possible to adjust the weight average molecular weight of the polymer.

At the time of performing the polymerization, it is preferable that the concentration of a polymer generated in a polymerization reaction mixture is controlled such that the concentration is less than or equal to 50 mass % in order to suppress gelation of a reaction liquid. Specifically, when the concentration of the polymer generated in the polymerization reaction mixture is greater than 50 mass %, it is preferable that the polymerization solvent is suitably added to the polymerization reaction mixture, and thus the concentration of the polymer is controlled such that the concentration is less than or equal to 50 mass %. The concentration of the polymer generated in the polymerization reaction mixture is preferably less than or equal to 45 mass %, and is more preferably less than or equal to 40 mass %.

A mode of suitably adding the polymerization solvent to the polymerization reaction mixture is not particularly limited, and the polymerization solvent may be continuously added or may be intermittently added to the polymerization reaction mixture. By controlling the concentration of the polymer generated in the polymerization reaction mixture in this way, it is possible to more sufficiently suppress the gelation of the reaction liquid. The polymerization solvent to be added may be the same solvent as that used at the time of initially preparing the polymerization reaction, or may be a different solvent, and it is preferable that the same solvent as that used at the time of initially preparing the polymerization reaction is used. In addition, the polymerization solvent to be added may be one solvent, or may be a mixed solvent of two or more solvents.

((Meth)Acrylic Polymer Having Glutaric Acid Anhydride Ring Structure in Main Chain)

The (meth)acrylic polymer having a glutaric acid anhydride ring structure in the main chain indicates a (meth) acrylic polymer having a glutaric acid anhydride unit.

It is preferable that the polymer having a glutaric acid anhydride unit has a glutaric acid anhydride unit (hereinafter, referred to as a glutaric acid anhydride unit) denoted by General Formula (101) described below.

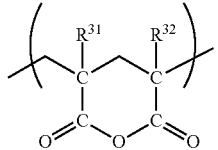

General Formula (101):

In General Formula (101), $R^{31}$ and $R^{32}$ each independently represent a hydrogen atom or an organic residue having 1 to 20 carbon atoms. Furthermore, the organic residue may contain an oxygen atom. $R^{31}$ and $R^{32}$ particularly preferably represent hydrogen atoms or alkyl groups having 1 to 5 carbon atoms which are identical to each other or different from each other.

It is preferable that the polymer having a glutaric acid anhydride unit is a (meth)acrylic polymer having a glutaric acid anhydride unit. As the (meth)acrylic polymer, a (meth)acrylic polymer having a glass transition temperature (Tg) of higher than or equal to 120° C. is preferable from a viewpoint of heat resistance.

The content of the glutaric acid anhydride unit with respect to the (meth)acrylic polymer is preferably 5 mass % to 50 mass %, and is more preferably 10 mass % to 45 mass %. By setting the content of the glutaric acid anhydride unit to be greater than or equal to 5 mass %, it is possible to obtain an effect of improving the heat resistance, and further, it is possible to obtain an effect of improving weather resistance.

In addition, it is preferable that the (meth)acrylic copolymer described above further has a repeating unit based on unsaturated carboxylic acid alkyl ester. As the repeating unit based on the unsaturated carboxylic acid alkyl ester, for example, a repeating unit denoted by General Formula (102) described below is preferable.

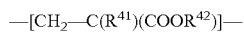

General Formula (102):

In General Formula (102), $R^{41}$ represents hydrogen or an alkyl group having 1 to 5 carbon atoms, $R^{42}$ represents an aliphatic or alicyclic hydrocarbon group having 1 to 6 carbon atoms, or an aliphatic or alicyclic hydrocarbon group having 1 to 6 carbon atoms substituted with hydroxyl groups or halogens in which the number of hydroxyl groups or halogens is greater than or equal to 1 and less than or equal to the number of carbon atoms.

A monomer corresponding to the repeating unit denoted by General Formula (102) is denoted by General Formula (103) described below.

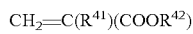

General Formula (103):

As a preferred specific example of such a monomer, methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, and the like are included, and among them, methyl methacrylate is most preferably used. One type of the monomers may be used independently, or two or more types thereof may be used in combination.

The content of the unsaturated carboxylic acid alkyl ester unit with respect to the (meth)acrylic polymer described above is preferably 50 mass % to 95 mass %, and is more preferably 55 mass % to 90 mass %. A (meth)acrylic polymer having a glutaric acid anhydride unit and an unsaturated carboxylic acid alkyl ester-based unit, for example, is able to be obtained by performing polymerization and cyclization with respect to a copolymer having an unsaturated carboxylic acid alkyl ester-based unit and an unsaturated carboxylic acid unit.

As the unsaturated carboxylic acid unit, for example, an unsaturated carboxylic acid unit denoted by General Formula (104) described below is preferable.

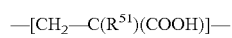

General Formula (104):

Here, $R^{51}$ represents hydrogen or an alkyl group having 1 to 5 carbon atoms.

As a preferred specific example of the monomer from which the unsaturated carboxylic acid unit is derived, a compound denoted by General Formula (105) described below which is a monomer corresponding to the repeating unit denoted by General Formula (104), a maleic acid, a hydrolysate of a maleic acid anhydride, and the like are included, an acrylic acid, and a methacrylic acid are preferable, and a methacrylic acid is more preferable, from a viewpoint of excellent thermal stability.

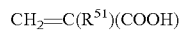

General Formula (105):

One type of the monomers may be independently used, or two or more types thereof may be used in combination. As described above, the thermoplastic acrylic copolymer having a glutaric acid anhydride unit and an unsaturated carboxylic acid alkyl ester-based unit, for example, is able to be obtained by performing the polymerization and cyclization with respect to the polymer having an unsaturated carboxylic acid alkyl ester-based unit and an unsaturated carboxylic acid unit, and thus the unsaturated carboxylic acid unit may remain in a constituting unit.

The content of the unsaturated carboxylic acid unit with respect to the (meth)acrylic polymer described above is preferably less than or equal to 10 mass %, and is more preferably less than or equal to 5 mass %. By setting the content of the unsaturated carboxylic acid unit to be less than or equal to 10 mass %, it is possible to prevent a decrease in colorless transparency and retention stability.

In addition, other vinyl-based monomer units not having an aromatic ring may be included in the (meth)acrylic polymer described above within a range not impairing the effect of the present invention. As a specific example of the other vinyl-based monomer unit not having an aromatic ring, as the corresponding monomer, a vinyl cyanide-based monomer such as acrylonitrile, methacrylonitrile, and ethacrylonitrile; allyl glycidyl ether; a maleic acid anhydride, and an itaconic acid anhydride; N-methyl maleimide, N-ethyl maleimide, N-cyclohexyl maleimide, acrylamide, methacrylamide, N-methyl acrylamide, butoxymethyl acrylamide, N-propyl methacrylamide; aminoethyl acrylate, propyl aminoethyl acrylate, dimethyl aminoethyl methacrylate, ethyl aminopropyl methacrylate, and cyclohexyl aminoethyl methacrylate; N-vinyl diethyl amine, N-acetyl vinyl amine, allyl amine, methallyl amine, and N-methyl allyl amine; 2-isopropenyl-oxazoline, 2-vinyl-oxazoline, and 2-acryloyl-oxazoline; and the like are able to be included. One type of the monomers may be used independently, two or more types thereof may be used in combination.

The content of the other vinyl-based monomer unit not having an aromatic ring with respect to the (meth)acrylic polymer described above is preferably less than or equal to 35 mass %.

Furthermore, a vinyl-based monomer unit having an aromatic ring (N-phenyl maleimide, phenyl aminoethyl methacrylate, p-glycidyl styrene, p-aminostyrene, 2-styryl-oxazoline, and the like) tends to decrease scratch resistance and weather resistance, and thus the content of the vinyl-based monomer unit having an aromatic ring with respect to the (meth)acrylic polymer described above is preferably less than or equal to 1 mass %.

((Meth)Acrylic Polymer Having Glutarimide Ring Structure in Main Chain)

The (meth)acrylic polymer having a glutarimide ring structure in the main chain described above (hereinafter, also referred to as a glutarimide-based resin) is able to express a preferred characteristic balance in the optical properties, the heat resistance, and the like by having a glutarimide unit on the main chain. It is preferable that the (meth)acrylic polymer having a glutarimide ring structure in the main chain described above contains at least a glutarimide resin which has a glutarimide unit denoted by General Formula (301) described below:

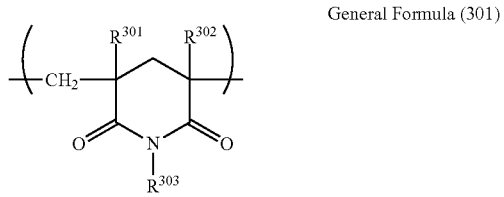

General Formula (301)

(here, in the formula, $R^{301}$, $R^{302}$, and $R^{303}$ independently represent hydrogen, or an unsubstituted or substituted alkyl group having 1 to 12 carbon atoms, a cycloalkyl group, and an aryl group) in the amount of greater than or equal to 20 mass %.

As a preferred glutarimide unit configuring the glutarimide-based resin used in the present invention, $R^{301}$ and $R^{302}$ represent hydrogen or a methyl group, $R^{303}$ represents a methyl group or a cyclohexyl group. The glutarimide unit described above may be a single type glutarimide unit, or may include a plurality of types of glutarimide units in which $R^{301}$, $R^{302}$, and $R^{303}$ are different from each other.

A preferred second constituting unit configuring the glutarimide-based resin used in the present invention is a unit formed of acrylic ester or methacrylic ester. As a preferred constituting unit of acrylic ester or methacrylic ester, methyl acrylate, ethyl acrylate, methyl methacrylate, and the like are included. In addition, as another preferred unit which is able to be imidized, N-alkyl methacrylamide such as N-methyl methacrylamide, or N-ethyl methacrylamide is included. The second constituting unit may be a single type constituting unit, or may include a plurality of types of constituting units.

The content of the glutarimide unit denoted by General Formula (301) in the glutarimide-based resin is greater than or equal to 20 mass % on the basis of the total repeating units of the glutarimide-based resin. The content of the glutarimide unit is preferably 20 mass % to 95 mass %, is more preferably 50 mass % to 90 mass %, and is even more preferably 60 mass % to 80 mass %. Setting the content of the glutarimide unit to be greater than or equal to 20 mass % is preferable from a viewpoint of the heat resistance and the transparency of the film to be obtained. In addition, setting the content of the glutarimide unit to be less than or equal to 95 mass % is preferable from a viewpoint of excellent handleability at the time of manufacturing, and the mechanical strength and the transparency of the film to be obtained.

The glutarimide-based resin, as necessary, may be formed by copolymerizing a third constituting unit. As an example of a preferred third constituting unit, a constituting unit which is formed by copolymerizing styrene, a styrene-based monomer such as substituted styrene, and α-methyl styrene, an acrylic monomer such as butyl acrylate, a nitrile-based monomer such as acrylonitrile, and methacrylonitrile, and a maleimide-based monomer such as maleimide, N-methyl maleimide, N-phenyl maleimide, and N-cyclohexyl maleimide is able to be used. These materials may be directly copolymerized with the glutarimide unit and the unit which is able to be imidized in the glutarimide-based resin, and may be graft-copolymerized with respect to a resin having the glutarimide unit and the unit which is able to be imidized. When the third component is added, the content ratio of the third component in the glutarimide-based resin is preferably greater than or equal to 5 mol % and less than or equal to 30 mol % on the basis of the total repeating units of the glutarimide-based resin.

The glutarimide-based resin is disclosed in U.S. Pat. Nos. 3,284,425A, 4,246,374A, JP1990-153904A (JP-H02-153904A), and the like, and the glutarimide-based resin is able to be obtained by using a resin which is obtained by containing methyl methacrylic ester or the like as a main raw material as the resin having a unit which is able to be imidized, and by imidizing the resin having a unit which is able to be imidized using ammonia or substituted amine. At the time of obtaining the glutarimide-based resin, a unit configured of an acrylic acid or a methacrylic acid, or an anhydride thereof may be introduced into the glutarimide-based resin as a reaction byproduct. Such a constituting unit, in particular, an acid anhydride decreases the total light transmittance and the haze of the film of the present invention film to be obtained, and thus the existence of the acid anhydride is not preferable. The content of the acrylic acid or the methacrylic acid is less than or equal to 0.5 milliequivalents, is preferably less than or equal to 0.3 milliequivalents, and is more preferably less than or equal to 0.1 milliequivalents, per 1 g of the resin. In addition, as disclosed in JP1990-153904A, the glutarimide-based resin is able to be obtained by using a resin which is mainly formed of N-methyl acrylamide and methyl methacrylic ester and by imidizing the resin.

In addition, it is preferable that the weight average molecular weight of the glutarimide-based resin is 10000 to 500000.

(Cellulose-Based Resin)

In the present invention, a cellulose-based resin is able to be used as the thermoplastic resin. As the light transmissive support body used in the present invention, a light transmissive support body containing the cellulose-based resin as a main component is preferable. The expression that the light transmissive support body contains the cellulose-based resin as a main component indicates that the cellulose-based resin is contained in the light transmissive support body in the amount of greater than or equal to 50 mass %.

As a raw material cellulose of cellulose ester used in the present invention, cotton linter, wood pulp (broad leaf wood pulp and conifer wood pulp), and the like are included, cellulose ester which is able to be obtained from any raw material cellulose is also able to be used, and the cellulose ester may be used by being mixed according to a case. As the raw material cellulose, for example, cellulose disclosed in Lecture of Plastic Materials (17) Cellulose-Based Resin (by MARUSAWA and UDA, The Nikkan Kogyo Shimbun, Ltd., Published in 1970) or Japan Institute of Invention and Innovation Disclosure 2001-1745 (Pages 7 to 8) is able to be used, and the cellulose ester used in the present invention is not particularly limited thereto.

As the cellulose ester used in the present invention, ester of cellulose and a fatty acid (including an aromatic fatty acid) is preferable, and cellulose acylate in which a hydroxyl group on a 2-position, a 3-position and a 6-position of a β-1,4 bonding glucose unit configuring cellulose is substituted with an acyl group of the fatty acid described above and is acylated is preferable.

For example, as the cellulose ester, alkyl carbonyl ester, alkenyl carbonyl ester, aromatic carbonyl ester, and aromatic alkyl carbonyl ester of cellulose are included, and cellulose ester substituted with acyl groups of two or more types of fatty acids is also preferable. The cellulose ester may further have a substituted group.

As the acyl group substituting for the hydroxyl group described above, an acetyl group having 2 carbon atoms and an acyl group having 3 to 22 carbon atoms are able to be preferably used. An acetyl group having 2 carbon atoms and an acyl group having 3 to 7 carbon atoms are preferable from a viewpoint of improving the compatibility with respect to an acrylic resin.

The total degree of substitution of the acyl group in the cellulose ester used in the present invention (a ratio of the hydroxyl group substituted with the acyl group in a β-glucose unit of the cellulose, and when three hydroxyl groups on the 2-position, the 3-position, and the 6-position are all substituted with the acyl group, the degree is 3) is not particularly limited, the compatibility with respect to the acrylic resin becomes excellent and humidity dependency decreases as the total degree of substitution of the acyl group becomes higher, and thus increasing the total degree of substitution of the acyl group is preferable. For this reason, the total degree of substitution of the acyl group is preferably 2.00 to 3.00, is more preferably 2.50 to 3.00, and is even more preferably 2.50 to 2.90.

Further, the degree of substitution with respect to an acyl group having 3 to 7 carbon atoms is preferably 1.20 to 3.00, is more preferably 1.50 to 3.00, is even more preferably 2.00 to 3.00, and is particularly preferably 2.00 to 2.90, from a viewpoint of the compatibility with respect to the acrylic resin.

In the cellulose ester used in the present invention, as a measurement method of the degree of substitution of the acyl group substituting for the hydroxyl group of the cellulose, a method based on D-817-91 of ASTM or an NMR method are able to be included.

The acyl group substituting for the hydroxyl group of the β-glucose unit of the cellulose may be an aliphatic group or an aromatic group, but is not particularly limited. In addition, the acyl group substituting for the hydroxyl group described above may be a single acyl group or two or more types of acyl groups, and it is preferable that the cellulose-based resin described above is cellulose acylate having two or more types of acyl groups from a viewpoint of reducing the moisture permeability of the light transmissive support body described above.

As the acyl group described above, an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexane carbonyl group, an oleoyl group, a benzoyl group, a naphthyl carbonyl group, a cynamoyl group, and the like are able to be included. Among them, an acetyl group, a propionyl group, a butanoyl group, a dodecanoyl group, an octadecanoyl group, a t-butanoyl group, an oleoyl group, a benzoyl group, a naphthyl carbonyl group, a cynamoyl group, and the like are preferable, an acetyl group, a propionyl group, and a butanoyl group are more preferable, a propionyl group or a butanoyl group is even more preferable, and a propionyl group is particularly preferable.

From a viewpoint of the ease of synthesis, the cost, the ease of controlling a substituent group distribution, and the like, an acetyl group and a propionyl group, an acetyl group and a butanoyl group, a propionyl group and a butanoyl group, an acetyl group, a propionyl group, and a butanoyl group are able to be preferably used in combination, an acetyl group and a propionyl group, an acetyl group and a butanoyl group, an acetyl group, a propionyl group, and a butanoyl group are able to be more preferably used in combination, an acetyl group and a propionyl group, an acetyl group, a propionyl group, and a butanoyl group are able to be even more preferably used in combination, and an acetyl group and a propionyl group are able to be particularly preferably used in combination.

As the cellulose ester substituted with the acyl group described above, cellulose acetate, cellulose propionate, cellulose butyrate, cellulose acetate propionate, cellulose acetate butyrate, cellulose acetate propionate butyrate, cellulose benzoate, and the like are included, and among them, cellulose propionate, cellulose butyrate, cellulose acetate propionate, cellulose acetate butyrate, and cellulose acetate propionate butyrate are preferable, and cellulose acetate propionate is more preferable.

The polymerization degree of the cellulose ester used in the cellulose-based resin is preferably 180 to 700 by the viscosity average polymerization degree, and in particular, in cellulose acetate propionate substituted with an acetyl group and a propionyl group, the polymerization degree is more preferably 180 to 550, is even more preferably 180 to 400, and is particularly preferably 180 to 350. When the polymerization degree is in this range, the viscosity of a dope solution containing cellulose ester is able to be suitable for manufacturing a film by being cast, and the compatibility with respect to a (meth)acrylic resin increases, and a film having high transparency and mechanical strength is able to be obtained, and thus setting the polymerization degree to be in this range is preferable. The viscosity average polymerization degree is able to be measured by an intrinsic viscosity method, UDA et al., (Kazuo UDA, Hideo SAITO, The Society of Fiber Science and Technology Japan, Vol. 18, No. 1, Pages 105 to 120, 1962). The method is specifically disclosed in JP1997-95538A (JP-H09-95538A).

It is preferable that a cellulose acylate-based resin and the (meth)acrylic resin described above are used in combination. In this case, the content of the (meth)acrylic resin in the optical film is preferably 20.0 mass % to 94.9 mass %, is more preferably 20.0 mass % to 84.9 mass %, is even more preferably 20.0 mass % to 69.9 mass %, and is further preferably 34.0 mass % to 69.9 mass %.

When the cellulose-based resin and the (meth)acrylic resin described above are used in combination, a ratio (a mass ratio) of the cellulose ester and the (meth)acrylic resin is 70:30 to 5:95. By setting the ratio of the cellulose ester to be less than or equal to 70 mass %, the humidity dependency decreases, and the durability at a high temperature and high humidity is improved, and thus preferred optical properties are able to be obtained, and display unevenness of the liquid crystal display device is able to be prevented. In addition, by setting the ratio of the (meth)acrylic resin to be less than or equal to 95 mass %, the heat resistance is improved, and desirable optical anisotropy is easily expressed. In addition, mechanical strength, a surface state, handling aptitude, and a film surface treatment aptitude are able to be improved. The mass ratio of the cellulose ester and the (meth)acrylic resin is 70:30 to 5:95, is preferably 70:30 to 15:85, is more preferably 70:30 to 30:70, and is even more preferably 49:51 to 30:70.

When the cellulose-based resin and the (meth)acrylic resin are used in combination, the (meth)acrylic resin is a resin obtained by polymerizing a derivative of the (meth) acrylic acid and a resin containing the derivative, but is not particularly limited insofar as the effect of the present invention is not impaired.

As the derivative of the (meth)acrylic acid, (meth)acrylate is able to be included. For example, the derivative of the (meth)acrylic acid may be a homopolymer of alkyl (meth) acrylate such as methyl acrylate, ethyl acrylate, n-propyl acrylate, n-butyl acrylate, tert-butyl acrylate, isopropyl acrylate, n-hexyl acrylate, cyclohexyl acrylate, t-butyl cyclohexyl acrylate, methyl methacrylate, ethyl methacrylate, n-propyl methacrylate, n-butyl methacrylate, tert-butyl methacrylate, isopropyl methacrylate, n-hexyl methacrylate, cyclohexyl methacrylate, and t-butyl cyclohexyl methacrylate; a derivative in which an arbitrary hydrogen atom of alkyl (meth)acrylate such as 2-chloroethyl acrylate, 2-hydroxyethyl acrylate, 2,3,4,5-tetrahydroxypentyl acrylate, 2-chloroethyl methacrylate, 2-hydroxyethyl methacrylate, and 2,3,4,5-tetrahydroxypentyl methacrylate is substituted with a halogen group, a hydroxyl group, and other organic residues. Here, it is preferable that the other organic residue is a straight-chained, branched, or cyclic alkyl group having 1 to 20 carbon atoms.

As a main component of the (meth)acrylic resin, alkyl (meth)acrylate is preferable. As the alkyl (meth)acrylate, alkyl (meth)acrylate formed of an alkyl group having 1 to 18 carbon atoms and a (meth)acrylic acid is preferable, alkyl (meth)acrylate formed of an alkyl group having 1 to 12 carbon atoms and a (meth)acrylic acid is more preferable, methyl acrylate and methyl methacrylate are even more preferable, and methyl methacrylate is particularly preferable.

The (meth)acrylic resin described above may be a homopolymer of one type of the derivative of the (meth) acrylic acid, may be a copolymer of two or more types of the derivatives of the (meth)acrylic acid, or may be a copolymer of the derivative of the (meth)acrylic acid and other copolymerizable monomers.

As a copolymerization component which is copolymerizable with the derivative of the (meth)acrylic acid, α,β-unsaturated acids such as an acrylic acid, and a methacrylic acid, unsaturated acids such as unsaturated group-containing bivalent carboxylic acids such as a maleic acid, a fumaric acid, and an itaconic acid, aromatic vinyl compounds such as styrene, o-methyl styrene, m-methyl styrene, p-methyl styrene, 2,4-dimethyl styrene, p-ethyl styrene, p-tert-butyl styrene, α-methyl styrene, and α-methyl-p-methyl styrene, α,β-unsaturated nitriles such as acrylonitrile, and methacrylonitrile, unsaturated carboxylic acid anhydrides such as a lactone ring unit, a glutaric acid anhydride unit, and a maleic acid anhydride, maleimides such as maleimide, and N-substituted maleimide, and a glutarimide unit are included.

An aromatic vinyl compound is preferable, and in particular, styrene is preferable, from a viewpoint of the optical properties.

From a viewpoint of improving the compatibility with respect to the cellulose ester, as the (meth)acrylic resin, a homopolymer or a copolymer of methyl methacrylate is preferable, and the content of a repeating unit derived from methyl methacrylate is preferably greater than or equal to 50 mass %, is more preferably greater than or equal to 70 mass %, and is particularly preferably greater than or equal to 90 mass %. Further, as the (meth)acrylic resin, a copolymer of methyl methacrylate and other monomers is preferable, and the content of a repeating unit derived from a monomer which is copolymerized with methyl methacrylate in the acrylic resin of the copolymer described above is preferably 1 mass % to 50 mass %, is more preferably 1 mass % to 30 mass %, and is even more preferably 1 mass % to 10 mass %.

As the monomer which is copolymerizable with the methyl methacrylate, an alkyl methacrylate formed of an alkyl group having 2 to 18 carbon atoms and a methacrylic acid, and alkyl acrylate formed of an alkyl group having 1 to 18 carbon atoms and an acrylic acid are included in addition to the monomers exemplified as the alkyl (meth) acrylate and the copolymerizable monomer, and these monomers are able to be independently used, or two or more types thereof are able to be used in combination. Among them, methyl acrylate, ethyl acrylate, n-propyl acrylate, n-butyl acrylate, s-butyl acrylate, 2-ethyl hexyl acrylate, and the like are preferably used, and methyl acrylate or n-butyl acrylate is particularly preferably used, from a viewpoint of the thermal decomposition resistance and the fluidity of the copolymer.

As the acrylic resin, the derivative of the (meth)acrylic acid, and the other copolymerizable monomer which are able to be used in the present invention, materials disclosed in JP2009-122664A, JP2009-139661A, JP2009-139754A, JP2009-294262A, WO2009/054376A, and the like are also able to be used. Furthermore, the present invention is not limited thereto, and these materials are able to be independently used or two or more types thereof are able to be used in combination.

When two or more types of (meth)acrylic resins are used, it is preferable that at least one type thereof having the structure described above is used.

In the present invention, when the (meth)acrylic resin and the cellulose-based resin are used in combination, it is preferable that weight average molecular weight Mw is greater than or equal to 80000. When the weight average molecular weight Mw of the acrylic resin is greater than or equal to 80000, mechanical strength increases, and the handling aptitude at the time of manufacturing a film becomes excellent. From this viewpoint, it is preferable that the weight average molecular weight Mw of the (meth) acrylic resin is greater than or equal to 100000.

In the present invention, as the (meth)acrylic resin used when the (meth)acrylic resin and the cellulose-based resin are used in combination, a commercially available (meth) acrylic resin is also able to be used. For example, Delpet 60N, and 80N (manufactured by Asahi Kasei Chemicals Corporation), Dianal BR80, BR85, BR88, and BR102 (manufactured by Mitsubishi Rayon Co., Ltd.), KT75 (manufactured by Denka Denki Kagaku Kogyo Kabushiki Kaisha), and the like are included.

Two or more types of (meth)acrylic resins are able to be used in combination.

(Polycarbonate-Based Resin)

The thermoplastic resin which is able to be used in the present invention is able to be used by adding an additive capable of suitably controlling peeling force and toughness to a polycarbonate-based resin.

(Polystyrene-Based Resin)

The thermoplastic resin which is able to be used in the present invention is able to be used by adding an additive capable of suitably controlling peeling force and toughness to a polystyrene-based resin.

(Other Thermoplastic Resin)

The thermoplastic resin which is able to be used in the present invention may include thermoplastic resins other than the resins described above. The other thermoplastic resin is not particularly limited insofar as the gist of the present invention is not contradicted, and a thermodynamically compatible thermoplastic resin is preferable from a viewpoint of improving mechanical strength or desirable physical properties.

As the other thermoplastic resin described above, for example, an olefin-based thermoplastic resin such as polyethylene, polypropylene, an ethylene-propylene copolymer, and poly(4-methyl-1-pentene); a halogen-containing thermoplastic resin such as vinyl chloride, and a vinyl chloride resin; a thermoplastic acrylic resin such as polymethyl methacrylate; a styrene-based thermoplastic resin such as polystyrene, a styrene-methyl methacrylate copolymer, a styrene-acrylonitrile copolymer, and an acrylonitrile-butadiene-styrene block copolymer; polyester such as polyethylene terephthalate, polybutylene terephthalate, and polyethylene naphthalate; polyamide such as nylon 6, nylon 66, and nylon 610; polyacetal; polycarbonate; polyphenylene oxide; polyphenylene sulfide; polyether ether ketone; polysulfon; polyether sulfon; polyoxybenzylene; polyamide imide; a rubbery polymer such as an ABS resin or an ASA resin in which polybutadiene-based rubber and acrylic rubber are mixed; and the like are included. In addition, the average particle diameter of the rubbery polymer is preferably less than or equal to 100 nm, and is more preferably less than or equal to 70 nm from a viewpoint of improving transparency at the time of being in the shape of a film.

A copolymer having a vinyl cyanide-based monomer unit and an aromatic vinyl-based monomer unit, specifically, an acrylonitrile-styrene-based copolymer or a polymer containing a polyvinyl chloride resin and methacrylic esters in the amount of greater than or equal to 50 mass % may be used. Among them, when the acrylonitrile-styrene-based copolymer is used, a film is able to be easily obtained in which the total light transmittance is greater than or equal to 85% at a glass transition temperature of higher than or equal to 120° C. and a phase difference per 100 μm in a surface direction of less than or equal to 20 nm.

The content of the thermoplastic resin in the light transmissive support body is preferably greater than or equal to 50 mass %, is more preferably greater than or equal to 70 mass % and less than or equal to 100 mass %, and is even more preferably greater than or equal to 85 mass % and less than or equal to 97 mass %.

<Ultraviolet Absorbent>

The light transmissive support body of the present invention may contain an ultraviolet absorbent.

The ultraviolet absorbent which is preferably used in the light transmissive support body described above will be described. The optical film of the present invention including the light transmissive support body described above is used in a polarizer, a member for a liquid crystal display, and the like, and the ultraviolet absorbent is preferably used from a viewpoint of preventing the deterioration of a polarizer, a liquid crystal, or the like. As the ultraviolet absorbent, an ultraviolet absorbent having low absorbance of visible light having a wavelength of greater than or equal to 400 nm is preferably used, from a viewpoint of excellent absorbing ability of an ultraviolet ray having a wavelength of less than or equal to 370 nm and excellent liquid crystal display properties. Only one type of the ultraviolet absorbent may be used, or two or more types thereof may be used in combination. For example, ultraviolet absorbents disclosed in JP2001-72782A and JP2002-543265A are included. As a specific example of the ultraviolet absorbent, for example, an oxybenzophenone-based compound, a benzotriazole-based compound, a salicylic acid ester-based compound, a cyanoacrylate-based compound, a nickel complex salt-based compound, and the like are included.

<Other Additives>

Fine particles are able to be added to the light transmissive support body described above as a matting agent. As the fine particles which are used as the matting agent, silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate, and calcium phosphate are able to be included. Fine particles containing silicon are preferable from a viewpoint of decreasing the haze of the film, and in particular, fine particles containing silicon dioxide are preferable. The primary average particle diameter of the fine particles of the silicon dioxide is less than or equal to 20 nm, and the apparent specific gravity thereof is preferably greater than or equal to 70 g/liter. When the average diameter of the primary particles is small, which is 5 nm to 16 nm, it is possible to decrease the haze of the film, and thus setting the average diameter of the primary particles to be small is preferable. The apparent specific gravity is preferably 90 g/liter to 200 g/liter, and is more preferably 100 g/liter to 200 g/liter. As the apparent specific gravity becomes larger, a dispersion liquid having a high concentration is able to be prepared, and the haze and an aggregate become excellent, and thus setting the apparent specific gravity to be larger is preferable.

In addition to the matting particles described above, various other additives (for example, a retardation increasing agent, a plasticizer, an ultraviolet absorbent, a deterioration preventive agent, a peeling agent, an infrared absorbent, a wavelength dispersion conditioner, a moisture permeability reduced compound, and the like) are able to be added to the light transmissive support body described above, and these additives may be a solid or an oily material. That is, the melting point or the boiling point thereof is not particularly limited. For example, an ultraviolet absorbing material having a temperature of lower than or equal to 20° C. and an ultraviolet absorbing material having a temperature of higher than or equal to 20° C. are mixed, and similarly, plasticizers are mixed, and for example, this is disclosed in JP2001-151901A, and the like. In addition, as an infrared absorbing dye, for example, a dye disclosed in JP2001-194522A is included. In addition, the additives may be added at any time in a dope preparing step, and a step of adding the additives may be added to the final preparing step of the dope preparing step. In addition, the added amount of each material is not particularly limited insofar as the function is expressed. In addition, when the optical film is formed of a plurality of layers, the types or the added amounts of the additives of each of the layers may be different from each other. For example, this is disclosed in JP2001-151902A, and the like, and is a technology which has been known from the related art. As the details thereof, materials specifically disclosed on Pages 16 to 22 of Japan Institute of Invention and Innovation disclosure (Public Technology No. 2001-1745, Published on Mar. 15, 2001, Japan Institute of Invention and Innovation) are preferably used.

A plasticizer which has excellent compatibility with respect to the thermoplastic resin (in particular, the cellulose ester and the acrylic resin) rarely bleeds out and has low haze, and thus is effective for preparing film which realizes a liquid crystal display device having excellent light leakage resistance, front contrast, and brightness.

The plasticizer may be used in the light transmissive support body described above. The plasticizer is not particularly limited, and as the plasticizer, a phosphoric acid ester-based plasticizer, a phthalic acid ester-based plasticizer, a polyvalent alcohol ester-based plasticizer, a polyvalent carboxylic acid ester-based plasticizer, a glycolate-based plasticizer, a citric acid ester-based plasticizer, a fatty acid ester-based plasticizer, a carboxylic acid ester-based plasticizer, a polyester oligomer-based plasticizer, a sugar ester-based plasticizer, an ethylenically unsaturated monomer copolymer-based plasticizer, and the like are included.

A phosphoric acid ester-based plasticizer, a glycolate-based plasticizer, a polyvalent alcohol ester-based plasticizer, a polyester oligomer-based plasticizer, a sugar ester-based plasticizer, and an ethylenically unsaturated monomer copolymer-based plasticizer are preferable, a polyester oligomer-based plasticizer, a sugar ester-based plasticizer, and an ethylenically unsaturated monomer copolymer-based plasticizer are more preferable, an ethylenically unsaturated monomer copolymer-based plasticizer, and a sugar ester-based plasticizer are even more preferable, and an ethylenically unsaturated monomer copolymer-based plasticizer is particularly preferable.

In particular, a polyester oligomer-based plasticizer, an ethylenically unsaturated monomer copolymer-based plasticizer, and a sugar ester-based plasticizer have high compatibility with respect to the light transmissive support body described above and a high effect of reduced bleed-out, and low haze and low moisture permeability, and decomposition of the plasticizer and a change in quality or deformation of the film due to a change in temperature and humidity or aging rarely occur, and thus are able to be preferably used in the present invention.

When the plasticizer is used in the present invention, only one type of the plasticizer is able to be used, or two or more types thereof are able to be used by being mixed.

<Moisture Permeability Reduced Compound>

It is preferable that the light transmissive support body of the present invention contains a moisture permeability reduced compound.

The thermoplastic resin which has low moisture permeability by itself tends to have low solubility with respect to a solvent, and the moisture permeability decreases due to a composite of the thermoplastic resin and the moisture permeability reduced compound, and thus it is possible to make the low moisture permeability and the solubility (a manufacturing aptitude) compatible, and therefore, it is preferable that the light transmissive support body of the present invention contains the moisture permeability reduced compound.

The moisture permeability reduced compound described above may be in a structure having one or more aromatic rings. According to the aromatic ring, hydrophobic properties are able to be applied to the film, and permeation, and absorption and desorption of the moisture are able to be suppressed.

As the moisture permeability reduced compound contained in the substrate film described above, a compound denoted by General Formula (A) described below is able to be preferably used.

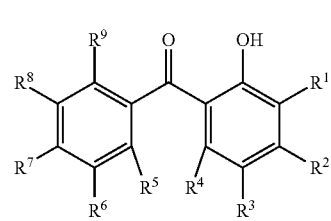

General Formula (A)

(in General Formula (A), $R^1$, $R^2$, $R^3$, $R^4$, $R^5$, $R^6$, $R^7$, $R^8$, and $R^9$ each independently represent a hydrogen atom or a substituent group)

In General Formula (A) described above, $R^1$, $R^2$, $R^3$, $R^4$, $R^5$, $R^6$, $R^7$, $R^8$, and $R^9$ each independently represent a hydrogen atom or a substituent group, and as the substituent group, the substituent groups T described above are able to be applied. In addition, the substituent groups may be substituted with other substituent groups, or the substituent groups may form a ring structure by being subjected to ring condensation.

In General Formula (A) described above, as $R^1$, $R^3$, $R^4$, $R^5$, $R^6$, $R^8$, and $R^9$, a hydrogen atom, an alkyl group, an alkenyl group, an alkynyl group, an aryl group, a substituted or non-substituted amino group, an alkoxy group, an aryl oxy group, a hydroxy group, and a halogen atom are preferable, a hydrogen atom, an alkyl group, an aryl group, an alkyl oxy group, an aryl oxy group, and a halogen atom are more preferable, a hydrogen atom, and an alkyl group having 1 to 12 carbon atoms are even more preferable, a hydrogen atom, and a methyl group are particularly preferable, and a hydrogen atom is most preferable.

In General Formula (A) described above, as $R^2$, a hydrogen atom, an alkyl group, an alkenyl group, an alkynyl group, an aryl group, a substituted or non-substituted amino group, an alkoxy group, an aryl oxy group, a hydroxy group, and a halogen atom are preferable, a hydrogen atom, an alkyl group having 1 to 20 carbon atoms, a substituted or non-substituted amino group having 0 to 20 carbon atoms, an alkoxy group having 1 to 12 carbon atoms, an aryl oxy group having 6 to 12 carbon atoms, and a hydroxy group are more preferable, an alkoxy group having 1 to 20 carbon atoms is even more preferable, and an alkoxy group having 1 to 12 carbon atoms is particularly preferable.

In General Formula (A) described above, as $R^7$, a hydrogen atom, an alkyl group, an alkenyl group, an alkynyl group, an aryl group, a substituted or non-substituted amino group, an alkoxy group, an aryl oxy group, a hydroxy group, and a halogen atom are preferable, a hydrogen atom, an alkyl group having 1 to 20 carbon atoms, a substituted or non-substituted amino group having 0 to 20 carbon atoms, an alkoxy group having 1 to 12 carbon atoms, an aryl oxy group having 6 to 12 carbon atoms, and a hydroxy group are more preferable, a hydrogen atom, and an alkyl group having 1 to 20 carbon atoms (preferably, an alkyl group having 1 to 12 carbon atoms, more preferably an alkyl group having 1 to 8 carbon atoms, and even more preferably a methyl group) are even more preferable, and a methyl group, and a hydrogen atom are particularly preferable.

Hereinafter, a preferred example of the compound denoted by General Formula (A) described above will be described, but the present invention is not limited to these specific examples.

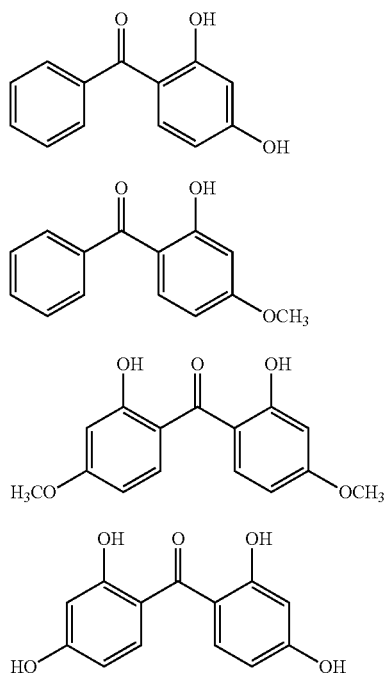

A-1

A-2

A-3

A-4

As the moisture permeability reduced compound contained in the substrate film described above, a compound denoted by General Formula (B) described below is able to be preferably used.

General Formula (B)

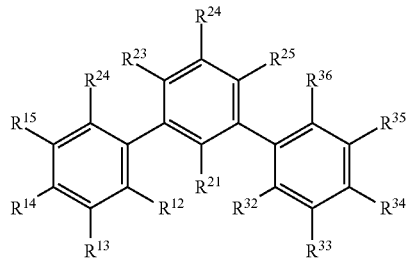

In General Formula (B), $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ each represent a hydrogen atom or a substituent group, and as the substituent group, the substituent groups T described below are able to be applied. Further, in General Formula (B), at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acyl amino group, an alkoxy carbonyl amino group, an aryl oxy carbonyl amino group, a sulfonyl amino group, a hydroxy group, a mercapto group, and a carboxyl group.

As the substituent group T, for example, an alkyl group (preferably an alkyl group having 1 to 20 carbon atoms, more preferably an alkyl group having 1 to 12 carbon atoms, and particularly preferably an alkyl group having 1 to 8 carbon atoms, and as the alkyl group, for example, a methyl group, an ethyl group, an isopropyl group, a tert-butyl group, a n-octyl group, a n-decyl group, a n-hexadecyl group, a cyclopropyl group, a cyclopentyl group, a cyclohexyl group, and the like are included), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and as the alkenyl group, for example, a vinyl group, an allyl group, a 2-butenyl group, a 3-pentenyl group, and the like are included), an alkynyl group (preferably an alkynyl group having 2 to 20 carbon atoms, more preferably an alkynyl group having 2 to 12 carbon atoms, and particularly preferably an alkynyl group having 2 to 8 carbon atoms, and as the alkynyl group, for example, a propargyl group, a 3-pentynyl group, and the like are included), an aryl group (preferably an aryl group having 6 to 30 carbon atoms, more preferably an aryl group having 6 to 20 carbon atoms, and particularly preferably an aryl group having 6 to 12 carbon atoms, and as the aryl group, for example, a phenyl group, a p-methyl phenyl group, a naphthyl group, and the like are included), an amino group (preferably an amino group having 0 to 20 carbon atoms, more preferably an amino group having 0 to 10 carbon atoms, and particularly preferably an amino group having 0 to 6 carbon atoms, and as the amino group, for example, an amino group, a methyl amino group, a dimethyl amino group, a diethyl amino group, a dibenzyl amino group, and the like are included), an alkoxy group (preferably an alkoxy group having 1 to 20 carbon atoms, more preferably an alkoxy group having 1 to 12 carbon atoms, and particularly preferably an alkoxy group having 1 to 8 carbon atoms, and as the alkoxy group, for example, a methoxy group, an ethoxy group, a butoxy group, and the like are included), an aryl oxy group (preferably an aryl oxy group having 6 to 20 carbon atoms, more preferably an aryl oxy group having 6 to 16 carbon atoms, and particularly preferably an aryl oxy group having 6 to 12 carbon atoms, as the aryl oxy group, for example, a phenyl oxy group, a 2-naphthyl oxy group, and the like are included), an acyl group (preferably an acyl group having 1 to 20 carbon atoms, more preferably an acyl group having 1 to 16 carbon atoms, and particularly preferably an acyl group having 1 to 12 carbon atoms, and as the acryl group, for example, an acetyl group, a benzoyl group, a formyl group, a pivaloyl group, and the like are included), an alkoxy carbonyl group (preferably an alkoxy carbonyl group having 2 to 20 carbon atoms, more preferably an alkoxy carbonyl group having 2 to 16 carbon atoms, and particularly preferably an alkoxy carbonyl group having 2 to 12 carbon atoms, and as the alkoxy carbonyl group, for example, a methoxy carbonyl group, an ethoxy carbonyl group, and the like are included), an aryl oxy carbonyl group (preferably an aryl oxy carbonyl group having 7 to 20 carbon atoms, more preferably an aryl oxy carbonyl group having 7 to 16 carbon atoms, and particularly preferably an aryl oxy carbonyl group having 7 to 10 carbon atoms, as the aryl oxy carbonyl group, for example, a phenyl oxy carbonyl group, and the like are included), an acyl oxy group (preferably an acyl oxy group having 2 to 20 carbon atoms, more preferably an acyl oxy group having 2 to 16 carbon atoms, and particularly preferably an acyl oxy group having 2 to 10 carbon atoms, and as the acyl oxy group, for example, an acetoxy group, a benzoyl oxy group, and the like are included), an acyl amino group (preferably an acyl amino group having 2 to 20 carbon atoms, more preferably an acyl amino group having 2 to 16 carbon atoms, and particularly preferably an acyl amino group having 2 to 10 carbon atoms, and as the acyl amino group, for example, an acetyl amino group, a benzoyl amino group, and the like are included), an alkoxy carbonyl amino group (preferably an alkoxy carbonyl amino group having 2 to 20 carbon atoms, more preferably an alkoxy carbonyl amino group having 2 to 16 carbon atoms, and particularly preferably an alkoxy carbonyl amino group having 2 to 12 carbon atoms, and as the alkoxy carbonyl amino group, for example, a methoxy carbonyl amino group, and the like are included), an aryl oxy carbonyl amino group (preferably an aryl oxy carbonyl amino group having 7 to 20 carbon atoms, more preferably an aryl oxy carbonyl amino group having 7 to 16 carbon atoms, and particularly preferably an aryl oxy carbonyl amino group having 7 to 12 carbon atoms, and as the aryl oxy carbonyl amino group, for example, a phenyl oxy carbonyl amino group, and the like are included), a sulfonyl amino group (preferably a sulfonyl amino group having 1 to 20 carbon atoms, more preferably a sulfonyl amino group having 1 to 16 carbon atoms, and particularly preferably a sulfonyl amino group having 1 to 12 carbon atoms, and as the sulfonyl amino group, for example, a methane sulfonyl amino group, a benzene sulfonyl amino group, and the like are included), a sulfamoyl group (preferably a sulfamoyl group having 0 to 20 carbon atoms, more preferably a sulfamoyl group having 0 to 16 carbon atoms, and particularly preferably a sulfamoyl group having 0 to 12 carbon atoms, and as the sulfamoyl group, for example, a sulfamoyl group, a methyl sulfamoyl group, a dimethyl sulfamoyl group, a phenyl sulfamoyl group, and the like are included), a carbamoyl group (preferably a carbamoyl group having 1 to 20 carbon atoms, more preferably a carbamoyl group having 1 to 16 carbon atoms, and particularly preferably a carbamoyl group having 1 to 12 carbon atoms, and as the carbamoyl group, for example, a carbamoyl group, a methyl carbamoyl group, a diethyl carbamoyl group, a phenyl carbamoyl group, and the like are included), an alkylthio group (preferably an alkylthio group having 1 to 20 carbon atoms, more preferably an alkylthio group having 1 to 16 carbon atoms, and particularly preferably an alkylthio group having 1 to 12 carbon atoms, and as the alkylthio group, for example, a methylthio group, an ethylthio group, and the like are included), an arylthio group (preferably an arylthio group having 6 to 20 carbon atoms, more preferably an arylthio group having 6 to 16 carbon atoms, and particularly preferably an arylthio group having 6 to 12 carbon atoms, and as the arylthio group, for example, a phenylthio group, and the like are included), a sulfonyl group (preferably a sulfonyl group having 1 to 20 carbon atoms, more preferably a sulfonyl group having 1 to 16 carbon atoms, and particularly preferably a sulfonyl group having 1 to 12 carbon atoms, and as the sulfonyl group, for example, a mesyl group, a tosyl group, and the like are included), a sulfinyl group (preferably a sulfinyl group having 1 to 20 carbon atoms, more preferably a sulfinyl group having 1 to 16 carbon atoms, and particularly preferably a sulfinyl group having 1 to 12 carbon atoms, and as the sulfinyl group, for example, a methane sulfinyl group, a benzene sulfinyl group, and the like are included), a ureide group (preferably a ureide group having 1 to 20 carbon atoms, more preferably a ureide group having 1 to 16 carbon atoms, and particularly preferably a ureide group having 1 to 12 carbon atoms, and as the ureide group, for example, a ureide group, a methyl ureide group, a phenyl ureide group, and the like are included), a phosphoric acid amide group (preferably a phosphoric acid amide group having 1 to 20 carbon atoms, more preferably a phosphoric acid amide group having 1 to 16 carbon atoms, and particularly preferably a phosphoric acid amide group having 1 to 12 carbon atoms, and as the phosphoric acid amide group, for example, a diethyl phosphoric acid amide group, a phenyl phosphoric acid amide group, and the like are included), a hydroxy group, a mercapto group, and a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (preferably a heterocyclic group having 1 to 30 carbon atoms, and more preferably a heterocyclic group having 1 to 12, and as a hetero atom, for example, a nitrogen atom, an oxygen atom, a sulfur atom, and specifically, for example, an imidazolyl group, a pyridyl group, a quinolyl group, a furyl group, a piperidyl group, a morpholino group, a benzoxazolyl group, a benzimidazolyl group, a benzothiazolyl group, and the like are included), a silyl group (preferably a silyl group having 3 to 40 carbon atoms, more preferably a silyl group having 3 to 30 carbon atoms, and particularly preferably a silyl group having 3 to 24 carbon atoms, and as the silyl group, for example, a trimethyl silyl group, a triphenyl silyl group, and the like are included), and the like are included. Among them, an alkyl group, an aryl group, a substituted or non-substituted amino group, an alkoxy group, and an aryl oxy group are more preferable, and an alkyl group, an aryl group, and an alkoxy group are even more preferable.

These substituent groups may be further substituted with the substituent groups T. In addition, when two or more substituent groups are used, the substituent groups may be identical to each other or different from each other. In addition, when it is possible, the substituent groups may form a ring by being connected to each other.

In addition, in General Formula (B), at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acyl amino group, an alkoxy carbonyl amino group, an aryl oxy carbonyl amino group, a sulfonyl amino group, a hydroxy group, a mercapto group, and a carboxyl group, is more preferably an amino group, and a hydroxy group, and is particularly preferably a hydroxy group. In addition, these groups may be substituted with a substituent group. In this case, as the substituent group, the substituent groups T described above are able to be applied, and a preferred range is also identical to that of the substituent group T.

Hereinafter, a preferred example of a compound denoted by General Formula (B) described above will be described, but the present invention is not limited to these specific examples.

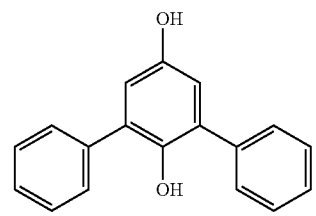

B-1

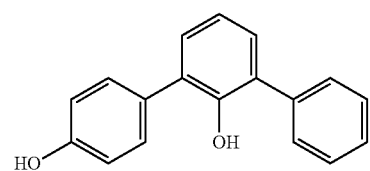

B-2

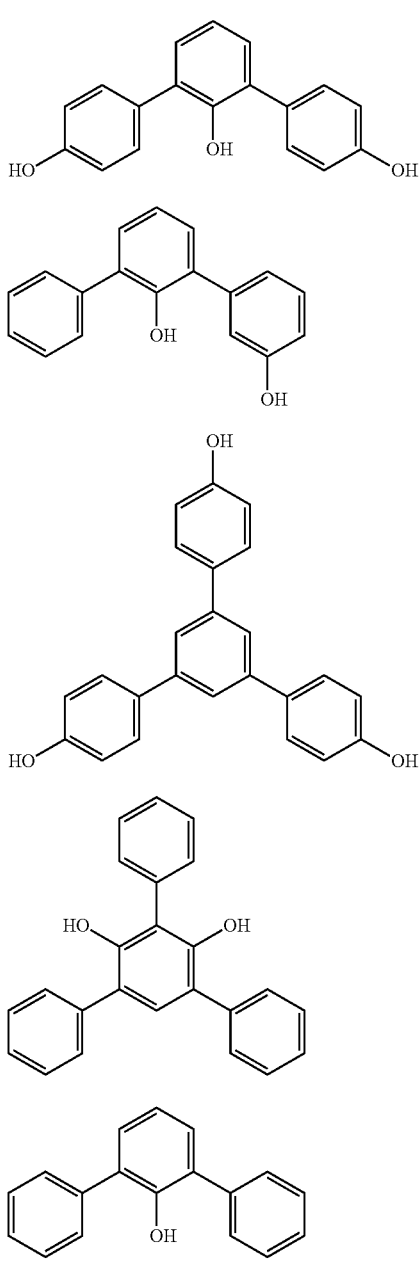

As the moisture permeability reduced compound contained in the substrate film described above, a novolac-based compound is also able to be preferably used.

A novolac type phenol resin used in the present invention is not particularly limited, and in general, a novolac type phenol resin in which phenols react with aldehydes by using an acidic substance as a catalyst is preferably used. Phenols which are a raw material of the novolac type phenol resin are not particularly limited, and as the phenols, for example, phenol, cresol such as o-cresol, m-cresol, and p-cresol, xylenol such as 2,3-xylenol, 2,4-xylenol, 2,5-xylenol, 2,6-xylenol, 3,4-xylenol, and 3,5-xylenol, ethyl phenol such as o-ethyl phenol, m-ethyl phenol, and p-ethyl phenol, butyl phenol such as isopropyl phenol, butyl phenol, and p-tert-butyl phenol, alkyl phenol such as p-tert-amyl phenol, p-octyl phenol, p-nonyl phenol, and p-cumyl phenol, halogenated phenol such as fluorophenol, chlorophenol, bromophenol, and iodine phenol, a monovalent phenol substituent such as p-phenyl phenol, aminophenol, nitrophenol, dinitrophenol, and trinitrophenol, monovalent phenols such as 1-naphthol, and 2-naphthol, polyvalent phenols such as resorcin, alkyl resorcin, pyrogallol, catechol, alkyl catechol, hydroquinone, alkyl hydroquinone, phloroglucin, bisphenol A, bisphenol F, bisphenol S, and dihydroxy naphthalene, and the like are included. The phenols are able to be independently used or two or more types thereof are able to be used in combination, and in general, phenol and cresol are usually used.

In the substrate film described above, the content of the moisture permeability reduced compound described above is preferably greater than or equal to 10 mass % and less than or equal to 100 mass % with respect to the mass of the thermoplastic resin. The content of the moisture permeability reduced compound is more preferably greater than or equal to 15 mass % and less than or equal to 90 mass %, and is even more preferably greater than or equal to 20 mass % and less than or equal to 80 mass %.

(Thickness of Light Transmissive Support Body)

The thickness of the light transmissive support body described above is preferably 5 μm to 90 is more preferably 10 μm to 70 μm, is particularly preferably 10 μm to 50 μm, and is more particularly preferably 20 μm to 40 μm. The film thickness is controlled such that the film thickness is in the range described above, and thus it is possible to reduce the unevenness of the panel according to an environment in which the liquid crystal display device is placed after a layer containing a cyclic polyolefin-based resin is laminated, that is, a change in temperature and humidity.

(Moisture Permeability of Light Transmissive Support Body)

The moisture permeability of the light transmissive support body described above is measured on the basis of HS Z-0208 under conditions of 40° C. and a relative humidity of 90%.

The moisture permeability of the light transmissive support body described above is preferably less than or equal to 800 g/m²/day, is more preferably less than or equal to 400 g/m²/day, is particularly preferably less than or equal to 200 g/m²/day, and is more particularly preferably less than or equal to 150 g/m²/day. The moisture permeability of the light transmissive support body described above is controlled such that the moisture permeability is in the range described above, and thus it is possible to suppress warping of a liquid crystal cell, and display unevenness at the time of black display after aging of the liquid crystal display device in which an optical film (the optical film of the present invention) including the layer containing the cyclic polyolefin-based resin is mounted at a normal temperature, high humidity, and a high temperature and high humidity environment.

(Oxygen Transmission Coefficient of Light Transmissive Support Body)

In order to reduce the moisture permeability, it is preferable to suppress diffusion of water in the film, that is, it is preferable to decrease the free volume of the film. In general, the free volume of the film correlates with the oxygen transmission coefficient of the film.

The oxygen transmission coefficient of the light transmissive support body described above is preferably less than or equal to 100 cm³·mm/(m²·day·atm), and is more preferably less than or equal to 30 cm³·mm/(m²·day·atm).

(Haze of Light Transmissive Support Body)

It is preferable that the total haze value of the light transmissive support body described above is less than or equal to 2.00%. When the total haze value is less than or equal to 2.00%, the transparency of the film is high, and it is effective to improve the contrast ratio and the brightness of the liquid crystal display device. The total haze value is preferably less than or equal to 1.00%, is more preferably less than or equal to 0.50%, is particularly preferably less than or equal to 0.30%, and is most preferably less than or equal to 0.20%. The optical performance is excellent as the total haze value becomes lower, and in consideration of selection of a raw material, manufacturing management, or the handling properties of a roll film, it is preferable that the total haze value is greater than or equal to 0.01%.

It is preferable that the internal haze value of the light transmissive support body described above is less than or equal to 1.00%. By setting the internal haze value to be less than or equal to 1.00%, the contrast ratio of the liquid crystal display device is improved, and thus it is possible to realize excellent display properties. The internal haze value is more preferably less than or equal to 0.50%, is even more preferably less than or equal to 0.20%, is particularly preferably less than or equal to 0.10%, and is most preferably less than or equal to 0.05%. It is preferable that the internal haze value is greater than or equal to 0.01% from a viewpoint of the selection of the raw material, the manufacturing management, or the like.

As the light transmissive support body described above, in particular, a light transmissive support body having a total haze value of less than or equal to 0.30% and an internal haze value of less than or equal to 0.10% is preferable.

The total haze value and the internal haze value are able to be adjusted according to the type or the added amount of the film material, selection of the additive (in particular, the particle diameter, the refractive index, and the added amount of matting agent particles) or film manufacturing conditions (the temperature, the stretching ratio, or the like at the time of stretching).

Furthermore, the haze is able to be obtained by measuring a film sample of 40 mm×80 mm at 25° C. and a relative humidity of 60% by using a hazemeter (HGM-2DP, manufactured by Suga Test Instruments Co., Ltd.) according to JIS K-6714.

(Modulus of Elasticity of Light Transmissive Support Body)

It is preferable that the modulus of elasticity of the light transmissive support body is 1800 MPa to 7000 MPa in a thickness direction (a TD direction).

In the present invention, setting the modulus of elasticity in the TD direction to be in the range described above is preferable from a viewpoint of the manufacturing aptitude such as the display unevenness at the time of the black display after the aging at high humidity and a high temperature and high humidity environment, transportability at the time of preparing a film, slitting properties of an end portion, or difficulty of breakage. When the TD modulus of elasticity excessively decreases, the display unevenness at the time of the black display after the aging at high humidity and a high temperature and high humidity environment easily occurs, and a problem occurs in the manufacturing aptitude, and when the TD modulus of elasticity excessively increases, film workability deteriorates, and thus the modulus of elasticity in the TD direction is preferably 1800 MPa to 5000 MPa, and is more preferably 1800 MPa to 4000 MPa.

In addition, the modulus of elasticity of the light transmissive support body described above in a transporting direction (a MD direction) is 1800 MPa to 4000 MPa, and is more preferably 1800 MPa to 3000 MPa.

Here, the transporting direction (a longitudinal direction) of the film is a transporting direction (the MD direction) at the time of preparing a film, and the thickness direction is a direction (the TD direction) perpendicular to the transporting direction at the time of preparing the film.

The modulus of elasticity of the film is able to be adjusted according to the type or the added amount of the thermoplastic resin of the material of the light transmissive support body described above, the selection of the additive (in particular, the particle diameter, the refractive index, and the added amount of the matting agent particles), and further, film manufacturing conditions (a stretching ratio and the like).

The modulus of elasticity, for example, is able to be obtained by measuring stress at a tensile speed of 10%/minute and stretching of 0.5% in an atmosphere of 23° C. and 70 RH % by using a versatile tensile tester "STM T50BP" manufactured by Baldwin Ltd.

(Glass Transition Temperature Tg of Light Transmissive Support Body)

The glass transition temperature Tg of the light transmissive support body described above is preferably higher than or equal to 100° C. and lower than or equal to 200° C., and is more preferably higher than or equal to 100° C. and less than or equal to 150° C. from a viewpoint of the manufacturing aptitude and the heat resistance.

The glass transition temperature is able to be obtained as the average value of a temperature at which a baseline derived from the glass transition of the film starts to be changed and a temperature at which the changed baseline returns to the baseline at the time of performing measurement at a temperature rising rate of 10° C./minute using a differential scanning calorimeter (DSC).

In addition, the glass transition temperature is able to be measured by using the following dynamic viscoelasticity measurement device. A (unstretched) film sample of 5 mm×30 mm is subjected to humidity adjustment at 25° C. and 60% RH for 2 hours, and then is measured at a distance between grippers of 20 mm, a temperature rising rate of 2° C./minute, a measurement temperature range of 30° C. to 250° C., and a frequency of 1 Hz by using a dynamic viscoelasticity measurement device (Vibron: DVA-225 (manufactured by IT Keisoku Seigyo KK)), and when a vertical axis indicates the modulus of storage elasticity as a logarithmic axis, and a horizontal axis indicates a temperature (° C.) as a linear axis, an intersection between a straight line 1 and a straight line 2 at the time of drawing a rapid reduction in the modulus of storage elasticity which is observed at the time of the transition of the modulus of storage elasticity from a solid region to a glass transition region as a straight line 1 in the solid region and as a straight line 2 in the glass transition region is a temperature at which the modulus of storage elasticity is rapidly reduced at the time of temperature rising and the film starts to be softened, and is a temperature at which the modulus of storage elasticity starts to be transitioned to the glass transition region, and thus is the glass transition temperature Tg (dynamic viscoelasticity). In the present invention, the glass transition temperature Tg was measured by a method using the dynamic viscoelasticity measurement device.

(Knoop Hardness of Light Transmissive Support Body)

It is preferable that a polarizer protective film which is used in the outermost surface has high surface hardness, and in this case, as the properties of the light transmissive support body, it is preferable that knoop hardness is high.

The knoop hardness is preferably greater than or equal to 100 N/mm$^2$, and is more preferably greater than or equal to 150 N/mm$^2$ (Equilibrium Moisture Content of Light Transmissive Support Body)

When the light transmissive support body is used as the protective film of the polarizer, the moisture content (the equilibrium moisture content) of the light transmissive support body described above, it is preferable that the moisture content at 25° C. and a relative humidity of 80% is 0 mass % to 4 mass % regardless of the film thickness, in order not to impair the adhesiveness with respect to the water-soluble thermoplasticity of polyvinyl alcohol or the like. The moisture content of the light transmissive support body is more preferably 0 mass % to 2.5 mass %, and is even more preferably 0 mass % to 1.5 mass %. When the equilibrium moisture content is less than or equal to 4 mass %, the dependency of retardation due to a humidity change merely increases, and thus setting the equilibrium moisture content to be less than or equal to 4 mass % is preferable from a viewpoint of suppressing the display unevenness at the time of the black display after the aging of the liquid crystal display device at a normal temperature and high humidity, and a high temperature and high humidity environment.

The equilibrium moisture content is able to be calculated by measuring the water content of a film sample of 7 mm×35 mm by a Karl Fischer method using a moisture measuring instrument, sample drying devices "CA-03" and "VA-05" {all are manufactured by Mitsubishi Chemical Corporation}, and then by dividing a moisture content (g) by a sample mass (g).

(Dimensional Change of Light Transmissive Support Body)

In the dimensional stability of the light transmissive support body described above, it is preferable that both of a dimensional change rate when the light transmissive support body is placed under conditions of 60° C. and a relative humidity of 90% for 24 hours (high humidity) and a dimensional change rate when the light transmissive support body is placed under conditions of 80° C. and a DRY environment (a relative humidity of less than or equal to 5%) for 24 hours (high temperature) are less than or equal to 0.5%. Both of the dimensional change rates are more preferably less than or equal to 0.3%, and are even more preferably less than or equal to 0.15%.

(Photoelastic Coefficient of Light Transmissive Support Body)

When the optical film of the present invention is used as a protective film for a polarizer, birefringence (Re and Rth) may be changed due to stress or the like according to contraction of a polarizing element. Such a change in the birefringence due to the stress is able to be measured as a photoelastic coefficient, and the modulus of elasticity of the light transmissive support body is preferably less than or equal to 15 ($10^{-12}$/Pa), is more preferably −3 ($10^{-12}$/Pa) to 12 ($10^{-12}$/Pa), and is even more preferably 0 ($10^{-12}$/Pa) to 11 ($10^{-12}$/Pa).

<Manufacturing Method of Light Transmissive Support Body>

It is preferable that the manufacturing method of the light transmissive support body described above includes a step of forming a polymer film (the light transmissive support body described above) by casting (doping) a polymer solution containing a thermoplastic resin and a solvent or a step of forming the light transmissive support body by forming a film by melting a thermoplastic resin. That is, it is preferable that the light transmissive support body described above is formed by forming a film by casting the polymer solution containing the thermoplastic resin and the solvent or by forming a film by melting the thermoplastic resin.

As a film forming method of the polymer film, a manufacturing method such as an inflation method, a T-die method, a calender method, a cutting method, a casting method, an emulsion method, and a hot press method is able to be used, and a solution film forming using a casting method is preferable from a viewpoint of suppressing coloring, foreign matter defects, and optical defects such as a die line.

The polymer film may be either an unstretched film or a stretched film. When the polymer film is a stretched film, the polymer film may be either a monoaxially stretched film or a biaxially stretched film. When the polymer film is a biaxially stretched film, the polymer film may be either a simultaneously biaxially stretched film or a sequentially biaxially stretched film. When the polymer film is a biaxially stretched, mechanical strength is improved, and film performance is improved. According to high stretching, the moisture permeability decreases in addition to improvement in the toughness of the substrate, and thus the high stretching is preferable.

It is preferable that the polymer film described above is stretched in the transporting direction (the MD direction) and/or the thickness direction (the TD direction) orthogonal to the transporting direction. According to the stretching in the thickness direction, unevenness occurring at the time of drying and peeling out the support body is reduced, and thus an excellent surface state in film plane is able to be obtained.

In a case of solution casting, the polymer film may be stretched in a wet state, the polymer film may be dried in an unstretched state in order to form a dry film of which the amount of a residual solvent is less than or equal to 3.0 mass % in the film, and then may be stretched, and it is preferable that the polymer film is a wet film. Furthermore, when the dry film is stretched, the dry film may be prepared in an unstretched state, and may be wound once, and then may be further stretched.

It is preferable that a stretching temperature is in the vicinity of the glass transition temperature of the resin which is the film raw material, and specifically, the stretching temperature is preferably in a range of glass transition temperature−30° C. to glass transition temperature+100° C., and is more preferably in a range of glass transition temperature−20° C. to glass transition temperature+80° C. By setting the stretching temperature to be higher than or equal to glass transition temperature−30° C., a sufficient stretching ratio is able to be obtained. In addition, by setting the stretching temperature to be lower than or equal to glass transition temperature+100° C., stable stretching is able to be performed.

It is preferable that the stretching ratio is 1.1 times to 25 times by an area ratio. When the polymer film contains a (meth)acrylic resin as a main component, the stretching ratio is more preferably in a range of 5.0 times to 20 times, and is particularly preferably in a range of 8 times to 15 times. By setting the stretching ratio to be greater than or equal to 1.1 times, the toughness is improved due to the stretching. In addition, by setting the stretching ratio to be less than or equal to 25 times, an effect of increasing the stretching ratio is confirmed. When the stretching ratio is greater than or equal to 5 times, the moisture permeability decreases in addition to an improvement in the toughness, and thus setting the stretching ratio to be greater than or equal to 5 times is preferable in the present invention.

When the polymer film contains a cellulose-based resin as a main component, the stretching ratio is more preferably 1.2 times to 20 times, is even more preferably 1.4 times to 15 times, and is particularly preferably 2.3 times to 10 times, by an area ratio. When the stretching ratio is greater than or equal to 1.4 times, the moisture permeability decreases in addition to an improvement in the toughness, and thus setting the stretching ratio to be greater than or equal to 1.4 times is preferable in the present invention. Furthermore, even when the stretching is not performed by intentionally applying draw tension in the transporting direction, tension due to the transporting is applied, and thus as a result thereof, a film which is stretched at a ratio of approximately 1.01 times to 1.1 times is obtained.

In order to stabilize the optical isotropy or the mechanical properties of the polymer film, the polymer film is able to be subjected to a heat treatment (annealing) or the like after a stretching treatment. The conditions of the heat treatment may be suitably selected as with the conditions of a heat treatment which is performed with respect to a known stretched film in the related art, but are not particularly limited.

(Solvent)

A solvent which is useful for forming dope is not particularly limited insofar as the solvent dissolves the thermoplastic resin described above.

In the present invention, as an organic solvent, either a chlorine-based solvent containing a chlorine-based organic solvent as a main solvent or a non-chlorine-based solvent not containing a chlorine-based organic solvent is able to be used. Two or more types of the organic solvents may be used by being mixed.

At the time of preparing the dope, the chlorine-based organic solvent is preferably used as a main solvent. In the present invention, the type of the chlorine-based organic solvent is not particularly limited insofar as the object thereof is able to be attained within a range where the thermoplastic resin described above is dissolved and cast, and thus a film is able to be formed. It is preferable that the chlorine-based organic solvent is dichloromethane and chloroform. It is particularly preferable that the chlorine-based organic solvent is dichloromethane. In addition, organic solvents other than the chlorine-based organic solvent may be mixed. In this case, it is necessary that dichloromethane is able to be used in the amount of at least 50 mass % with respect to the total amount of the organic solvent. In the present invention, other organic solvents which are used in combination with the chlorine-based organic solvent will be described below. That is, as preferred other organic solvents, a solvent selected from ester, ketone, ether, alcohol, hydrocarbon, and the like having 3 to 12 carbon atoms is preferable. Ester, ketone, ether, and alcohol may have a cyclic structure. A compound having two or more functional groups (that is, —O—, —CO—, and —COO—) of ester, ketone, and ether is also able to be used as the solvent, and for example, the compound may simultaneously have other functional groups such as an alcoholic hydroxyl group. When a solvent having two or more types of the functional group is used, the number of carbon atoms of the solvent may be in a specified range of a compound having any one functional group.

As an example of esters having 3 to 12 carbon atoms, ethyl formate, propyl formate, pentyl formate, methyl acetate, ethyl acetate, pentyl acetate, and the like are included. As an example of ketones having 3 to 12 carbon atoms, acetone, methyl ethyl ketone, diethyl ketone, diisobutyl ketone, cyclopentanone, cyclohexanone, methyl cyclohexanone, and the like are included. As an example of ethers having 3 to 12 carbon atoms, diisopropyl ether, dimethoxy methane, dimethoxy ethane, 1,4-dioxane, 1,3-dioxolane, tetrahydrofuran, anisole, phenetole, and the like are included. As an example of the organic solvent having two or more types of the functional group, 2-ethoxy ethyl acetate, 2-methoxy ethanol, 2-butoxy ethanol, and the like are included.

In addition, alcohol which is used in combination with the chlorine-based organic solvent may be preferably straight chained alcohol, branched alcohol, or cyclic alcohol, and among them, saturated aliphatic hydrocarbon is preferable. A hydroxyl group of alcohol may be any one of a primary hydroxyl group to a tertiary hydroxyl group. As an example of alcohol, methanol, ethanol, 1-propanol, 2-propanol, 1-butanol, 2-butanol, t-butanol, 1-pentanol, 2-methyl-2-butanol, and cyclohexanol are included. Furthermore, as alcohol, fluorine-based alcohol is also able to be used. For example, 2-fluoroethanol, 2,2,2-trifluoroethanol, 2,2,3,3-tetrafluoro-1-propanol, and the like are also included. Further, hydrocarbon may be straight chained hydrocarbon, branched hydrocarbon, or cyclic hydrocarbon. Either aromatic hydrocarbon or aliphatic hydrocarbon is able to be used. The aliphatic hydrocarbon may be saturated aliphatic hydrocarbon or unsaturated aliphatic hydrocarbon. As an example of hydrocarbon, cyclohexane, hexane, benzene, toluene, and xylene are included.

As the other solvent, for example, solvents disclosed in JP2007-140497A are able to be used.

(Surface Treatment)

The light transmissive support body is subjected to a surface treatment according to case, and thus adhesion between the light transmissive support body, a layer containing a cyclic polyolefin-based resin, and the other layer (for example, a polarizing element, an undercoat layer, and a back layer) is able to be improved. For example, a glow discharge treatment, an ultraviolet irradiation treatment, a corona treatment, a flame treatment, and an acid or alkali treatment are able to be used. Here, the glow discharge treatment may be low temperature plasma under low pressure gas of $10^{-3}$ Torr to 20 Torr, or may be plasma treatment under atmospheric pressure. A plasma excitable gaseous body is a gaseous body which is plasma excited under the conditions described above, and as the plasma excitable gaseous body, fluorocarbons such as argon, helium, neon, krypton, xenon, nitrogen, carbon dioxide, and tetrafluoromethane, a mixture thereof, and the like are included. As the details thereof, materials specifically disclosed on Pages 30 to 32 of Japan Institute of Invention and Innovation disclosure (Public Technology No. 2001-1745, Published on Mar. 15, 2001, Japan Institute of Invention and Innovation) are preferably used in the present invention.

[Layer Containing Thermoplastic Resin and Resin Cured with Light and/or Heat (Layer A)]

The optical film of the present invention includes a layer containing the thermoplastic resin and a resin cured with light and/or heat (a layer A). That is, the layer A is a mixed layer of the thermoplastic resin and the resin cured with light and/or heat.

<Thermoplastic Resin Contained in Layer A>

The thermoplastic resin contained in the layer A is a thermoplastic resin identical to the thermoplastic resin contained in the light transmissive support body described above. Therefore, a specific example and a preferred range of the thermoplastic resin in the layer A are identical to the specific example and the preferred range of the thermoplastic resin contained in the light transmissive support body described above.

The content of the thermoplastic resin contained in the layer A is preferably greater than or equal to 5 mass % and less than or equal to 90 mass %, is more preferably greater than or equal to 20 mass % and less than or equal to 80 mass %, and is even more preferably greater than or equal to 20 mass % and less than or equal to 50 mass %, with respect to the total solid content of the layer A.

<Resin Cured with Light and/or Heat which is Contained in Layer A>

The resin cured with light and/or heat which is contained in the layer A is a resin obtained by curing a compound which is able to form a resin by being cured with light and/or heat, and a cured material of a multifunctional monomer or oligomer having two or more epoxy groups, oxetanyl groups, or ethylenically unsaturated double bond groups is preferable.

As the ethylenically unsaturated double bond group, polymerizable functional groups such as a (meth)acryloyl group, a vinyl group, a styryl group, and an allyl group are included, and among them, a (meth)acryloyl group, and —C(O)OCH=CH$_2$ are preferable, and a (meth)acryloyl group is more preferable.

It is preferable that the multifunctional monomer or oligomer is a compound having an alicyclic hydrocarbon group. When the resin cured with light and/or heat which is contained in the layer A is the cured material of the multifunctional monomer or oligomer having an alicyclic hydrocarbon group, the cured material has excellent affinity with respect to a cyclic polyolefin-based resin, and thus adhesiveness between the layer A and a layer (a layer B) containing a resin cured with light and/or heat described below and a cyclic polyolefin-based resin is improved, and therefore setting the resin cured with light and/or heat to the cured material is preferable.

Two or more types of the multifunctional monomer or oligomer described above may be used in combination.

[Compound Having Alicyclic Hydrocarbon Group and Ethylenically Unsaturated Double Bond Group]

A compound having an alicyclic hydrocarbon group and an ethylenically unsaturated double bond group which are able to be preferably used as the multifunctional monomer or oligomer having two or more ethylenically unsaturated double bond groups of the present invention will be described.

By using the compound having an alicyclic hydrocarbon group and an ethylenically unsaturated double bond group, low moisture permeability is able to be realized, adhesiveness between the substrate film and the layer containing a cyclic polyolefin-based resin is excellent, haze decreases, and light leakage of the polarizer is able to be prevented. The details are not obvious, but it is considered that the compatibility with respect to the cyclic polyolefin-based resin becomes excellent, the adhesiveness becomes excellent, and the haze decreases by using the compound having an alicyclic hydrocarbon group in a molecule. In addition, density at a crosslinking point increases by having an ethylenically unsaturated double bond group in the molecule, and thus a diffusion path in water molecules of the layer containing the cyclic polyolefin-based resin is limited, and the adhesiveness between the layer A and the layer B is able to be improved.

In order to improve the adhesiveness, it is more preferable that the number of ethylenically unsaturated double bond groups in the molecule is greater than or equal to 2.

As the alicyclic hydrocarbon group, a group having an alicyclic structure having carbon atoms of greater than or equal to 5, a group having an alicyclic structure having carbon atoms of greater than or equal to 8, and a group having an alicyclic structure having carbon atoms of greater than or equal to 10 is even more preferable.

As the alicyclic hydrocarbon group, a group derived from a polycyclic compound such as a bicyclic compound, and a tricyclic compound is particularly preferable.

More preferably, a central skeleton of a compound disclosed in claims of JP2006-215096A, a central skeleton of a compound disclosed in claims of JP2001-10999A, a skeleton of an adamantane derivative, and the like are included.

As the alicyclic hydrocarbon group (including a linking group), a group denoted by any one of General Formulas (I) to (V) described below is preferable, a group denoted by General Formula (I), (II), or (IV) described below is more preferable, and a group denoted by General Formula (I) described below is even more preferable.

In General Formula (I), L and L' each independently represent a bivalent or more linking group. n represents an integer of 1 to 3.

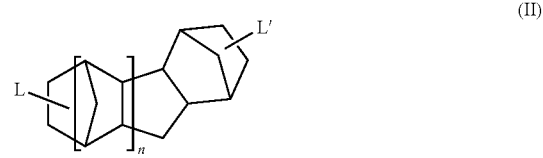

In General Formula (II), L and L' each independently represent a bivalent or more linking group. n represents an integer of 1 and 2.

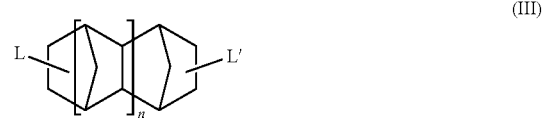

In General Formula (III), L and L' each independently represent a bivalent or more linking group. n represents an integer of 1 and 2.

In General Formula (IV), L and L' each independently represent a bivalent or more linking group, and L" represents a hydrogen atom or a bivalent or more linking group.

(V)

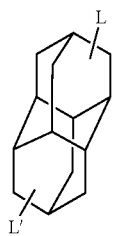

In General Formula (V), L and L' each independently represent a bivalent or more linking group.

As the alicyclic hydrocarbon group, specifically, norbornyl, tricyclodecanyl, tetracyclododecanyl, pentacyclopentadecanyl, adamantyl, diamantanyl, and the like are included.

As the ethylenically unsaturated double bond group, polymerizable functional groups such as a (meth)acryloyl group, a vinyl group, a styryl group, and an allyl group are included, and among them, a (meth)acryloyl group, and —C(O)OCH=CH$_2$ are preferable, and a (meth)acryloyl group is even more preferable.

A compound having an alicyclic hydrocarbon group, and having two or more ethylenically unsaturated double bond groups in a molecule is configured by bonding the alicyclic hydrocarbon group described above to a group having an ethylenically unsaturated double bond through a linking group.

As the linking group, a single bond, an alkylene group having 1 to 6 carbon atoms which may be substituted, an amide group in which an N position may be substituted, a carbamoyl group in which an N position may be substituted, an ester group, an oxy carbonyl group, an ether group, and a group obtained by combining these groups described above are included.

The compound, for example, is able to be easily synthesized by a one or two step reaction between polyol having the alicyclic hydrocarbon group described above, such as diol and triol, and a carboxylic acid, a carboxylic acid derivative, an epoxy derivative, an isocyanate derivative, and the like of a compound having a (meth)acryloyl group, a vinyl group, a styryl group, an allyl group, and the like.

Preferably, the compound is able to be synthesized by a reaction between a compound such as a (meth)acrylic acid, (meth)acryloyl chloride, a (meth)acrylic anhydride, and glycidyl (meth)acrylate, or a compound disclosed in WO2012/00316A (for example, 1,1-bis(acryloxy methyl)ethyl isocyanate) and polyol having the alicyclic hydrocarbon group described above.

Hereinafter, a preferred specific example of the compound having an alicyclic hydrocarbon group and an ethylenically unsaturated double bond group will be described, but the present invention is not limited thereto.

M-1

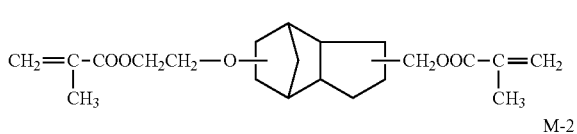

M-2

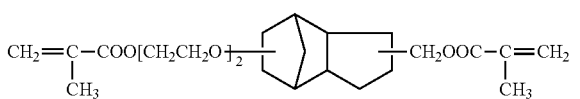

M-3

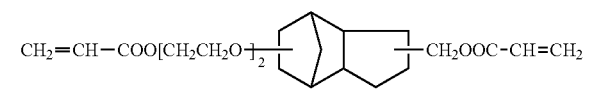

M-4

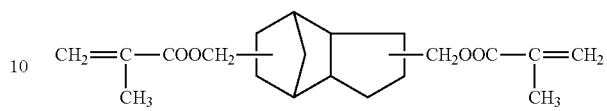

M-5

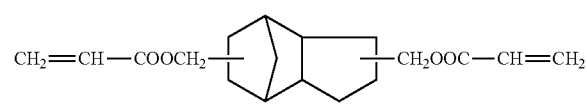

M-6

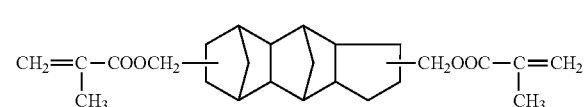

[Compound Having Fluorene Skeleton and Ethylenically Unsaturated Double Bond in Molecule]

As the multifunctional monomer or oligomer having two or more ethylenically unsaturated double bond groups in the present invention, a compound having a fluorene skeleton and an ethylenically unsaturated double bond in the molecule is also able to be preferably used.

The same effect as that of the compound having an alicyclic hydrocarbon group described above is able to be expected by having a fluorene skeleton in the molecule.

It is preferable that the compound having a fluorene skeleton and an ethylenically unsaturated double bond in the molecule is denoted by General Formula (VI) described below.

(VI)

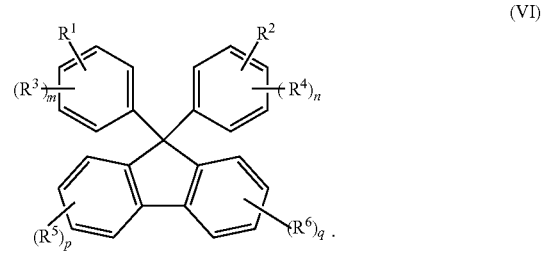

(in Formula (VI), $R^1$, $R^2$, $R^3$, $R^4$, $R^5$, and $R^6$ each independently represent a monovalent substituent group, m, n, p, and q each independently represent an integer of 0 to 4, and at least one of $R^1$ and $R^2$ represents a monovalent organic group having an ethylenically unsaturated group)

It is preferable that the compound having a fluorene skeleton and an ethylenically unsaturated double bond in the molecule is denoted by General Formula (VII) described below.

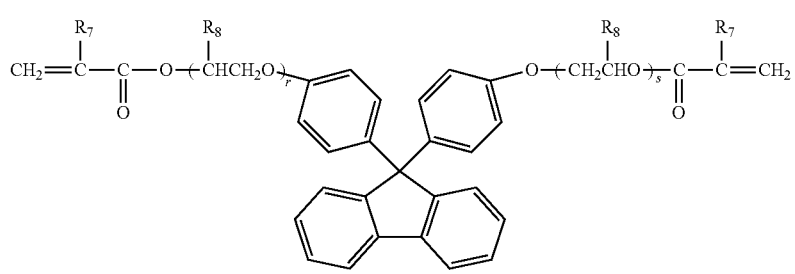

General Formula (VII)

(in the formula; $R_7$ and $R_8$ represent hydrogen or a methyl group, and r and s represent an integer of 0 to 5)

[Compound Having Ethylenically Unsaturated Double Bond Group and Not Having Alicyclic Hydrocarbon Group]

As the multifunctional monomer or oligomer having two or more ethylenically unsaturated double bond groups in the present invention, a compound having an ethylenically unsaturated double bond group and not having an alicyclic hydrocarbon group is also able to be used.

As the compound having an ethylenically unsaturated double bond group and not having an alicyclic hydrocarbon group, a (meth)acrylate compound having no alicyclic hydrocarbon group is preferable, and (meth)acrylic diesters of alkylene glycol, (meth)acrylic diesters of polyoxyalkylene glycol, (meth)acrylic diesters of polyvalent alcohol, (meth)acrylic diesters of an ethylene oxide or propylene oxide adduct, epoxy (meth)acrylates, urethane (meth)acrylates, polyester (meth)acrylates, and the like are able to be included.

Among them, esters of polyvalent alcohol and a (meth) acrylic acid are preferable. For example, 1,4-butanediol di(meth)acrylate, 1,6-hexanediol di(meth)acrylate, neopentyl glycol (meth)acrylate, ethylene glycol di(meth)acrylate, triethylene glycol di(meth)acrylate, pentaerythritol tetra(meth)acrylate, pentaerythritol tri(meth)acrylate, trimethylol propane tri(meth)acrylate, EO modified trimethylol propane tri(meth)acrylate, PO modified trimethylol propane tri (meth)acrylate, EO modified phosphate tri(meth)acrylate, trimethylol ethane tri(meth)acrylate, ditrimethylol propane tetra(meth)acrylate, dipentaerythritol tetra(meth)acrylate, dipentaerythritol penta(meth)acrylate, dipentaerythritol hexa(meth)acrylate, polyurethane polyacrylate, polyester polyacrylate, caprolactone modified tris(acryloxy ethyl)isocyanurate, and the like are included.

As multifunctional acrylate-based compounds having a (meth)acryloyl group, commercially available compounds are able to be used, and NK ester A-TMMT manufactured by Shin-Nakamura Chemical Co., Ltd., KAYARAD DPHA manufactured by Nippon Kayaku Co., Ltd., and the like are able to be included. A multifunctional monomer is disclosed in paragraph numbers "0114" to "0122" of JP2009-98658A, and the same applies to the present invention.

It is preferable that the compound having an ethylenically unsaturated double bond group and not having an alicyclic hydrocarbon group is a compound having a hydrogen bonding substituent group from a viewpoint of the adhesiveness with respect to the support body, low curling, and the fixability of a fluorine-containing or silicone-based compound described below. The hydrogen bonding substituent group indicates a substituent group in which an atom having large electro-negativity, such as nitrogen, oxygen, sulfur, and halogen is covalently bonded to a hydrogen bond, and specifically, as the substituent group, OH—, SH—, —NH—, CHO—, CHN—, and the like are included, and urethane (meth)acrylates or (meth)acrylates having a hydroxyl group is preferable. It is also possible to use commercially available multifunctional acrylate having a (meth)acryloyl group, and as the commercially available multifunctional acrylate having a (meth)acryloyl group, NK oligo U4HA and NK ester A-TMM-3 manufactured by Shin-Nakamura Chemical Co., Ltd., KAYARAD PET-30 manufactured by Nippon Kayaku Co., Ltd., and the like are able to be included.

(Compound Having Two or More Epoxy Groups or Oxetanyl Groups in Molecule)

As a specific example of a compound having two or more epoxy groups in the molecule, a bisphenol A type epoxy resin, a bisphenol F type epoxy resin, a phenol novolac type epoxy resin, a cresol novolac type epoxy resin, an aliphatic epoxy resin, and the like are able to be included.

These compounds are available as a commercially available product. For example, as the bisphenol A type epoxy resin, JER827, JER828, JER834, JER1001, JER1002, JER1003, JER1055, JER1007, JER1009, and JER1010 (all are manufactured by Japan Epoxy Resin Co., Ltd.), EPICLON860, EPICLON1050, EPICLON1051, and EPICLON1055 (all are manufactured by DIC Corporation), and the like are included, as the bisphenol F type epoxy resin, JER806, JER807, JER4004, JER4005, JER4007, and JER4010 (all are manufactured by Japan Epoxy Resin Co., Ltd.), EPICLON830, and EPICLON835 (all are manufactured by DIC Corporation), LCE-21, and RE-602S (all are manufactured by Nippon Kayaku Co., Ltd.), and the like are included, as the phenol novolac type epoxy resin, JER152, JER154, JER157S70, and JER157S65 (all are manufactured by Japan Epoxy Resin Co., Ltd.), EPICLON N-740, EPICLON N-770, and EPICLON N-775 (all are manufactured by DIC Corporation), and the like are included, as the cresol novolac type epoxy resin, EPICLON N-660, EPICLON N-665, EPICLON N-670, EPICLON N-673, EPICLON N-680, EPICLON N-690, and EPICLON N-695 (all are manufactured by DIC Corporation), EOCN-1020 (manufactured by Nippon Kayaku Co., Ltd.), and the like are included, and as the aliphatic epoxy resin, ADEKA RESIN EP-4080S, ADEKA RESIN EP-4085S, and ADEKA RESIN EP-4088S (all are manufactured by ADEKA Corporation), Celloxide 2021P, Celloxide 2081, Celloxide 2083, Celloxide 2085, EHPE3150, EPOLEAD PB 3600, and EPOLEAD PB 4700 (all are manufactured by Daicel Corporation), and the like are included. In addition, ADEKA RESIN EP-4000S, ADEKA RESIN EP-4003S, ADEKA RESIN EP-4010S, and ADEKA RESIN EP-4011S (all are manufactured by ADEKA Corporation), NC-2000, NC-3000, NC-7300, XD-1000, EPPN-501, and EPPN-502 (all are manufactured by ADEKA Corporation), and the like are included. One type of these resins is able to be independently used, or two or more types thereof are able to be used in combination.

Among them, as a preferred resin, an epoxy resin having an alicyclic hydrocarbon group is included.

As a specific example of a compound having two or more oxetanyl groups in the molecule, Aron Oxetane OXT-121, OXT-221, OX-SQ, and PNOX (all are manufactured by Toagosei Co., Ltd.) are able to be used. In addition, the compound having an oxetanyl group is able to be independently used or is able to be used by being mixed with a compound having an epoxy group.

(Initiator)

When the compound having an ethylenically unsaturated double bond is used as the multifunctional monomer or oligomer described above, a known photoradical generator, and a thermal radical generator are able to be used as an initiator. As the photoradical polymerization initiator, acetophenones, benzoins, benzophenones, phosphine oxides, ketals, anthraquinones, thioxanthones, azo compound, peroxides, 2,3-dialkyl dione compounds, disulfide compounds, fluoroamine compounds, aromatic sulfoniums, lophine dimers, onium salts, borate salts, active esters, active halogens, inorganic complex, coumarins, and the like are included.

As a commercially available photocleavage type photoradical polymerization initiator, "Irgacure 127", "Irgacure 651", "Irgacure 184", "Irgacure 819", "Irgacure 907", "Irgacure 1870" (CGI-403/Irg184=7/3, a mixed initiator), "Irgacure 500", "Irgacure 369", "Irgacure 1173", "Irgacure 2959", "Irgacure 4265", "Irgacure 4263", "OXE01", and the like, manufactured by BASF SE; "Kayacure DETX-S", "Kayacure BP-100", "Kayacure BDMK", "Kayacure CTX", "Kayacure BMS", "Kayacure 2-EAQ", "Kayacure ABQ", "Kayacure CPTX", "Kayacure EPD", "Kayacure ITX", "Kayacure QTX", "Kayacure BTC", "Kayacure MCA", and the like, manufactured by Nippon Kayaku Co., Ltd.; "Esacure (KIP100F, KB1, EB3, BP, X33, KTO46, KT37, KIP150, and TZT)", and the like, manufactured by Sartomer Company, and a combination thereof are included as a preferred example.

The content of a photopolymerization initiator is preferably in a range of 0.1 parts by mass to 15 parts by mass, and is more preferably in a range of 1 part by mass to 10 parts by mass, with respect to 100 parts by mass of the multifunctional monomer or oligomer described above.

When the compound having an epoxy group or an oxetanyl group is used as the multifunctional monomer or oligomer described above, a known photoacid generator or thermal acid generator is able to be used as an initiator. Specifically, an initiator disclosed in JP2011-221494A is able to be preferably used. In this case, the content of the initiator is preferably in a range of 0.1 parts by mass to 15 parts by mass, and is more preferably in a range of 1 part by mass to 10 parts by mass, with respect to 100 parts by mass of the multifunctional monomer or oligomer described above.

The content of the resin cured with light and/or heat which is contained in the layer A is preferably greater than or equal to 5 mass % and less than or equal to 90 mass %, is more preferably greater than or equal to 20 mass % and less than or equal to 80 mass %, and is even more preferably greater than or equal to 50 mass % and less than or equal to 80 mass %, with respect to the total solid content of the layer A.

(Film Thickness of Layer A)

The film thickness of the layer A is preferably 0.01 μm to 20 μm, is more preferably 0.01 μm to 10 μm, is even more preferably 0.03 μm to 8 μm, and is most preferably 1 μm to 5 μm, from a viewpoint of the adhesiveness with respect to the light transmissive support body.

[Layer Containing Resin Cured with Light and/or Heat and Cyclic Polyolefin-Based Resin (Layer B)]

The optical film of the present invention includes a layer containing a resin cured with light and/or heat and a cyclic polyolefin-based resin (the layer B). That is, the layer B is a mixed layer of the resin cured with light and/or heat and the cyclic polyolefin-based resin.

<Resin Cured with Light and/or Heat which is Contained in Layer B>

The resin cured with light and/or heat which is contained in the layer B is identical to the resin cured with light and/or heat which is contained in the layer A described above. Therefore, a specific example and a preferred range of the resin cured with light and/or heat in the layer B is identical to the specific example and the preferred range of the resin cured with light and/or heat in the layer A described above.

The content of the resin cured with light and/or heat which is contained in the layer B is preferably greater than or equal to 1 mass % and less than or equal to 95 mass %, is more preferably greater than or equal to 5 mass % and less than or equal to 80 mass %, and is even more preferably greater than or equal to 30 mass % and less than or equal to 60 mass %, with respect to the total solid content of the layer B.

<Cyclic Polyolefin-Based Resin Contained in Layer B>

The layer B contains a cyclic polyolefin-based resin. The cyclic polyolefin-based resin indicates a polymer resin having a cyclic olefin structure.

As an example of the polymer resin having a cyclic olefin structure which is used in the present invention, (1) a norbornene-based polymer, (2) a polymer of monocyclic olefin, (3) a polymer of cyclic conjugated diene, (4) a vinyl alicyclic hydrocarbon polymer, hydrides of (1) to (4), and the like are included.

As the cyclic polyolefin-based resin, a polymer having a structural unit derived from cyclic olefin denoted by General Formula (B-II) or (B-III) described below is preferable.

A polymer having a structural unit denoted by General Formula (B-II) described below is a norbornene-based addition polymer, and a polymer having a structural unit denoted by General Formula (B-III) described below is a norbornene-based ring opening polymer.

General Formula (B-II)

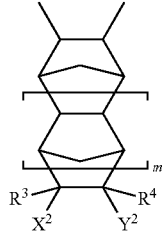

General Formula (B-III)

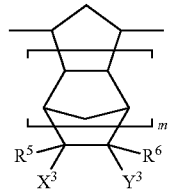

In General Formulas (B-II) and (B-III), m represents an integer of 0 to 4. $R^3$ to $R^6$ each independently represent a hydrogen atom or a hydrocarbon group having 1 to 10 carbon atoms, $X^2$ and $X^3$, and $Y^2$ and $Y^3$ each independently represent a hydrogen atom, a hydrocarbon group having 1 to 10 carbon atoms, a halogen atom, a hydrocarbon group having 1 to 10 carbon atoms which is substituted with a halogen atom, —$(CH_2)_nCOOR^{11}$, —$(CH_2)_nOCOR^{12}$, —$(CH_2)_nNCO$, —$(CH_2)_nNO_2$, —$(CH_2)_nCN$, —$(CH_2)_nCONR^{13}R^{14}$, —$(CH_2)_nNR^{13}R^{14}$, —$(CH_2)_nOZ$, —$(CH_2)_nW$, or (—$CO)_2O$, (—$CO)_2NR^{15}$ configured of $X^2$ and $Y^2$ or $X^3$ and $Y^3$. Furthermore, $R^{11}$, $R^{12}$, $R^{13}$, $R^{14}$, and $R^{15}$ each independently represent a hydrogen atom, and a hydrocarbon group having 1 to 20 carbon atoms, Z represents a hydrocarbon group or a hydrocarbon group substituted with halogen, W represents $SiR^{16}_pD_{3-p}$ ($R^{16}$ represents a hydrocarbon group having 1 to 10 carbon atoms, D represents a halogen atom, —$OCOR^{16}$, or —$OR^{16}$, and p represents an integer of 0 to 3), and n represents an integer of 0 to 10.

In General Formula (B-II) or (B-III) described above, it is particularly preferable that m represents 0 or 1, and $R^3$ to $R^6$, $X^2$ and $X^3$, and $Y^2$ and $Y^3$ each represent a hydrogen atom.

The polymer having the structural unit denoted by General Formula (B-II) or (B-III) may further have at least one structural unit denoted by General Formula (B-I) described below.

General Formula (B-I)

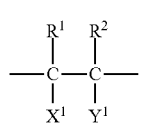

In General Formula (B-I), $R^1$ and $R^2$ each independently represent a hydrogen atom or a hydrocarbon group having 1 to 10 carbon atoms, $X^1$ and $Y^1$ each independently represent a hydrogen atom, a hydrocarbon group having 1 to 10 carbon atoms, a halogen atom, a hydrocarbon group having 1 to 10 carbon atoms substituted with a halogen atom, —$(CH_2)_nCOOR^{11}$, —$(CH_2)_nOCOR^{12}$, —$(CH_2)_nNCO$, —$(CH_2)_nNO_2$, —$(CH_2)_nCN$, —$(CH_2)_nCONR^{13}R^{14}$, —$(CH_2)_nNR^{13}R^{14}$, $(CH_2)_nOZ$, —$(CH_2)_nW$, or (—$CO)_2O$, (—$CO)_2NR^{15}$ configured of $X^1$ and $Y^1$. Furthermore, $R^{11}$, $R^{12}$, $R^{13}$, $R^{14}$, and $R^{15}$ each independently represent a hydrogen atom, a hydrocarbon group having 1 to 20 carbon atoms, Z represents a hydrocarbon group or a hydrocarbon group substituted with halogen, W represents $SiR^{16}_pD_{3-p}$ ($R^{16}$ represents a hydrocarbon group having 1 to 10 carbon atoms, D represents a halogen atom, —$OCOR^{16}$, or —$OR^{16}$, and p represents an integer of 0 to 3), and n represents an integer of 0 to 10.

From a viewpoint of a decrease in the moisture permeability, and the adhesiveness between the layer A and the layer B, the content of the structural unit derived from cyclic olefin in the cyclic polyolefin-based resin is preferably less than or equal to 90 mass %, is more preferably 30 mass % to 85 mass %, is even more preferably 50 mass % to 79 mass, and is most preferably 60 mass % to 75 mass %, with respect to the total mass of the cyclic polyolefin-based resin. Here, a ratio of the structural unit derived from cyclic polyolefin indicates the average value in the cyclic polyolefin-based resin.

As disclosed in JP1989-240517A (JP-H01-240517A), JP1995-196736A (JP-H07-196736A), JP1985-26024A (JP-S60-26024A), JP1987-19801A (JP-S62-19801A), JP2003-1159767A, JP2004-309979A, and the like, a norbornene-based polymer hydride is prepared by performing addition polymerization or methathesis ring opening polymerization with respect to a polycyclic unsaturated compound, and then by adding hydrogen thereto. In the norbornene-based polymer used in the present invention, it is preferable that $R^3$ to $R^6$ represent a hydrogen atom or —$CH_3$, and it is more preferable that $R^3$ to $R^6$ represent a hydrogen atom from a viewpoint of low moisture permeability. It is preferable that $X^3$ and $Y^3$ represent a hydrogen atom, Cl, and —$COOCH_3$, and it is more preferable that $X^3$ and $Y^3$ represent a hydrogen atom from a viewpoint of low moisture permeability. Other groups are suitably selected. It is preferable that m represents 0 or 1. The norbornene-based resin has been released with a trade name of Arton G or Arton F from JSR Corporation, and is commercially available with a trade name of Zeonor ZF14, ZF16, Zeonex 250, or Zeonex 280 from Zeon Corporation, and these products are able to be used.

A norbornene-based addition (co)polymer is disclosed in JP1998-7732A (JP-H10-7732A), JP2002-504184A, US2004/229157A1, WO2004/070463A1, and the like. The norbornene-based addition (co)polymer is able to be obtained by performing addition polymerization with respect to norbornene-based polycyclic unsaturated compounds. In addition, as necessary, the norbornene-based polycyclic unsaturated compound is able to be additionally polymerized with ethylene, propylene, butene; conjugated diene such as butadiene, and isoprene; non-conjugated diene such as ethylidene norbornene; and a linear diene compound such as acrylonitrile, an acrylic acid, a methacrylic acid, a maleic acid anhydride, acrylic ester, methacrylic ester, maleimide, vinyl acetate, and vinyl chloride. Among them, a copolymer with ethylene is preferable. The norbornene-based addition (co)polymer has been released with a trade name of Apel from Mitsui Chemicals, Inc., and has a grade of different glass transition temperatures (Tg), for example, APL8008T (Tg of 70° C.), APL6013T (Tg of 125° C.), APL6015T (Tg of 145° C.), or the like. Pellets such as TOPAS8007, TOPAS6013, and TOPAS6015 have been released from Polyplastics Co., Ltd. Further, Appear 3000 has been released from Film Ferrania S.R.L.

In the present invention, the glass transition temperature (Tg) of the cyclic polyolefin-based resin is not limited, and for example, a cyclic polyolefin-based resin having a high Tg such as 150° C. to 400° C. is also able to be used.

The melt flow rate (MFR) of the cyclic polyolefin-based resin is preferably 1 g/10 min to 500 g/10 min, is more preferably 5 g/10 min to 200 g/10 min, is even more preferably 40 g/10 min to 200 g/10 min, and is most preferably 100 g/10 min to 200 g/10 min, from a viewpoint of the viscosity of a composition containing a cyclic polyolefin-based resin, and the adhesiveness between the layer A and the layer B.

(Surfactant)

It is preferable that a composition for forming a layer containing a cyclic polyolefin-based resin according to the present invention uses various surfactants. In general, the surfactant is able to suppress film thickness unevenness or the like due to a drying variation in a local distribution of drying air, or is able to improve surface concavities and convexities of the layer containing the cyclic polyolefin-based resin or the cissing of a coating material. As the surfactant, a known fluorine-based surfactant, a silicone-based surfactant, or a hydrocarbon-based surfactant is able to be used. A preferred aspect and a specific example of the fluorine-based surfactant are disclosed in paragraph numbers "0023" to "0080" of JP2007-102206A, and the same applies to the present invention.

As a preferred example of the silicone-based surfactant, a surfactant having a plurality of dimethyl silyl oxy units as a repeating unit, and having a substituent group in a terminal and/or a side chain of a compound chain is included. A structural unit other than the dimethyl silyl oxy unit may be contained in the compound chain having the dimethyl silyl oxy unit as a repeating unit. The substituent groups may be identical to each other or different from each other, and a plurality of substituent groups are preferable. As a preferred example of the substituent group, a group having a polyether group, an alkyl group, an aryl group, an aryloxy group, a cynamoyl group, an oxetanyl group, a fluoroalkyl group, a polyoxy alkylene group, and the like are included.

The number average molecular weight is not particularly limited, and is preferably less than or equal to 100000, is more preferably less than or equal to 50000, is particularly preferably 1000 to 30000, and is most preferably 1000 to 20000.

As a preferred example of the silicone-based compound, "X-22-174DX", "X-22-2426", "X22-164C", and "X-22-176D", (all are trade names, manufactured by Shin-Etsu Chemical Co., Ltd.); "FM-7725", "FM-5521", and "FM-6621", (all are trade names, manufactured by Chisso Corporation); "DMS-U22", and "RMS-033" (all are trade names, manufactured by Gelest Inc.); "SH200", "DC11PA", "ST80PA", "L7604", "FZ-2105", "L-7604", "Y-7006", and "SS-2801" (all are trade names, manufactured by Dow Corning Toray Co., Ltd.); "TSF400" (a trade name, manufactured by Momentive Performance Materials Japan LLC.); and the like are included, and the present invention is not limited thereto.

The content of the surfactant described above is preferably 0.001 mass % to 0.5 mass %, and is more preferably 0.01 mass % to 0.3 mass %, with respect to the total solid content of the coating composition for a layer containing a cyclic polyolefin-based resin.

The content of the cyclic polyolefin-based resin contained in the layer B is preferably greater than or equal to 1 mass % and less than or equal to 95 mass %, is more preferably greater than or equal to 5 mass % and less than or equal to 80 mass %, and is even more preferably greater than or equal to 30 mass % and less than or equal to 60 mass %, with respect to the total solid content of the layer B.

(Film Thickness of Layer B)

The film thickness of the layer B is preferably 0.5 µm to 30 µm, is more preferably 0.5 µm to 20 µm, is even more preferably 1 µm to 15 µm, and is most preferably 1 µm to 7 µm, from a viewpoint of the application of the adhesiveness, and low moisture permeability.

(Confirmation Method of Layer A and Layer B)

The presence or absence of the mixed layer (the layer A and the layer B), for example, is able to be measured in a sectional surface SEM. When a sectional surface is cut out by cutting the optical film using a microtome, and the sectional surface is dyed with osmium tetraoxide for 20 hours to 30 hours, and then is cut out again and is observed in a sectional surface SEM, a monomer or an oligomer having an ethylenically unsaturated double bond which is mixed with the thermoplastic resin (or the cyclic polyolefin resin) of the light transmissive support body is hindered by the polymer chain of the thermoplastic resin (or the cyclic polyolefin resin), and a photopolymerization reaction may not be able to be completed, and thus the monomer or the oligomer is dyed, and thus the brightnesses and darknesses of the layer A and the light transmissive support body are observed as being different. In particular, a boundary surface is observed as being bright. When an epoxy compound is used as a compound which is able to form a resin by being cured with light and/or heat, the dyeing is performed by using ruthenium tetraoxide instead of osmium tetraoxide dye, and thus the same observation as that described above is able to be performed.

As other methods, when a sectional surface is cut out by cutting the optical film with a microtome at an inclination of approximately 3 degrees in a normal direction of the film on the basis of the surface direction of the film, and is analyzed by using a flight time type secondary ion mass analysis device (TOF-SIMS IV and a $Bi^{3+}$ primary ion gun (25 kV, and 0.2 pA), manufactured by ION-TOF GmbH), a portion of the light transmissive support body in which a thermoplastic resin component and the compound capable of forming a resin by being cured with light and/or heat are detected together is able to be detected as the layer A, and a region of the light transmissive support body in which the compound capable of forming a resin by being cured with light and/or heat and a cyclic polyolefin resin component are detected together is able to be detected as the layer B. For example, when cellulose acetate is used as the thermoplastic resin of the light transmissive support body, $C_6H_5O_2^+$ is able to be used in the detection, when A-DCP is used as the compound which is able to form a resin by being cured with light and/or heat, $C_3H_3O^+$ is able to be used in the detection, and when APL (Apel) manufactured by Mitsui Chemicals, Inc. is used as the cyclic polyolefin resin, a fragment of $C_7H_{11}^+$ is able to be used in the detection. In one method, the presence or absence of the mixed layer may be determined, or a plurality of methods may be used in combination.

In the present invention, the methods using SEM and TOF-SIMS described above are used in combination, and thus the type of the compound in the mixed layer and the thickness of the mixed layer were confirmed.

<Layer Configuration of Optical Film>

The optical film of the present invention includes the light transmissive support body formed of the thermoplastic resin, the layer containing the thermoplastic resin described above and the resin cured with light and/or heat (the layer A), and the layer containing the resin cured with light and/or heat and the cyclic polyolefin-based resin (the layer B) in this order.

Furthermore, the cyclic polyolefin-based resin of the layer B may be contained in the layer A. The thermoplastic resin of the layer A may be contained in the layer B.

The optical film of the present invention may include a layer containing the resin of the layer A cured with light and/or heat and not containing the thermoplastic resin of the light transmissive support body and the cyclic polyolefin-based resin of the layer B (also referred to as a layer C) between the layer A and the layer B.

The optical film of the present invention may include a layer containing the cyclic polyolefin-based resin of the layer B and not containing the resin of the layer A cured with light and/or heat (also referred to as a layer D) on a surface of the layer B on a side opposite to the layer A side.

In addition, it is preferable that the optical film of the present invention includes various functional layers such as a hard coat layer or an antiglare layer, an antireflection layer (a layer in which the refractive index is adjusted, such as a layer of low refractive index, a layer of intermediate refractive index, and a layer of high refractive index), an antistatic layer, an ultraviolet absorption layer, and an optical anisotropic layer on the layer B or the layer D (on a surface on a side opposite to the layer A side). In addition, it is also preferable that the functional layer is formed on a surface of a transparent support body on a side opposite to a surface of the transparent support body on which the layer B is formed. When a plurality of functional layers are laminated, one functional layer is able to be laminated on the layer B or the layer D, and another functional layer is able to be laminated on a surface on which the layer B is not laminated. One functional layer described above may be disposed, or a plurality of functional layers may be disposed. In addition, a lamination method of the functional layer described above is not particularly limited. A specific and preferred layer configuration of the optical film of the present invention will be described below.

Light Transmissive Support Body/Layer A/Layer B
Light Transmissive Support Body/Layer A/Layer C/Layer B
Light Transmissive Support Body/Layer A/Layer B/Layer D
Light Transmissive Support Body/Layer A/Layer C/Layer B/Layer D
Light Transmissive Support Body/Layer A/Layer B/Hard Coat Layer or Antiglare Layer/(Layer of Low Refractive Index)
Light Transmissive Support Body/Layer A/Layer B/Hard Coat Layer or Antiglare Layer/Layer of High Refractive Index/Layer of Low Refractive Index
Light Transmissive Support Body/Layer A/Layer B/Hard Coat Layer or Antiglare Layer/Layer of Intermediate Refractive Index/Layer of High Refractive Index/Layer of Low Refractive Index
Optical Anisotropic Layer/(Alignment Film)/Light Transmissive Support Body/Layer A/Layer B/(Hard Coat Layer)/(Layer of Low Refractive Index)
( ) indicates that the layer may not be laminated.

As the hard coat layer, the antiglare layer, the layer of intermediate refractive index, the layer of high refractive index, and the layer of low refractive index, layers disclosed in JP2006-17870A, JP2006-30881A, JP2007-298974A, JP2011-136503A, JP2012-159692A, and the like are able to be preferably used, and the present invention is not limited thereto.

(Optical Anisotropic Layer)

The optical anisotropic layer which is able to be disposed on the optical film of the present invention may be an optical anisotropic layer in which a film having a constant phase difference is formed with in-plane uniformity, or may be an optical anisotropic layer having a pattern formed thereon, in which phase difference regions having slow axis directions and phase differences different from each other are regularly arranged in the plane. It is preferable that the optical anisotropic layer is formed on a surface of the substrate film on which the layer containing the cyclic polyolefin-based resin is not formed.

The material and the manufacturing conditions of the optical anisotropic layer are able to be selected according to various usages, and in the present invention, an optical anisotropic layer using a polymerizable liquid crystal compound is preferable. In this case, forming an alignment film between the optical anisotropic layer and the substrate film so as to be in contact with the optical anisotropic layer is also a preferred aspect.

As a preferred example of the optical anisotropic layer formed with in-plane uniformity, an aspect is included in which the optical anisotropic layer is a λ/4 film, and in particular, the optical anisotropic layer is useful as a member of an active type 3D liquid crystal display device. An aspect in which the optical anisotropic layer of the λ/4 film is laminated on the substrate film is disclosed in JP2012-098721A and JP2012-127982A, and such an aspect is able to be preferably used in the optical film of the present invention.

On the other hand, as a preferred example of the optical anisotropic layer having a pattern formed thereon, a pattern type λ/4 film is included, and an aspect disclosed in JP4825934B and JP4887463B is able to be preferably used in the optical film of the present invention.

The thickness of the functional layer described above is more preferably 0.01 μm to 50 μm, and is particularly preferably 0.02 μm to 20 μm.

[Antiglare Layer]

The antiglare layer is able to be formed in order to apply anti-glare characteristics due to surface scattering, and preferably hard coat properties for improving the hardness and the scratch resistance of the film to the film.

When the antiglare layer is disposed in the present invention, it is preferable that an antiglare layer contains a binder and light transmissive particles for applying the anti-glare characteristic, and has concavities and convexities on the surface due to a projection of the light transmissive particles themselves or a projection formed of an aggregate of a plurality of particles.

In addition, by using an antiglare layer having hard coat properties, it is not necessary to separately form the hard coat layer.

As a specific example of the light transmissive particles, for example, particles of an inorganic compound such as silica particles, and $TiO_2$ particles; resin particles such as acrylic particles, cross-linking acrylic particles, polystyrene particles, cross-linking styrene particles, melamine resin particles, and benzoguanamine resin particles are preferably included. Among them, cross-linking styrene particles, cross-linking acrylic particles, and silica particles are preferable.

Either spherical or amorphous light transmissive particles are able to be used.

From a viewpoint of adjusting internal haze and surface haze, it is preferable that the refractive index of the binder is adjusted according to the refractive index of each of the light transmissive particles selected from the particles described above. As the binder adjusted according to the light transmissive particles, for example, a combination of a binder containing a trifunctional or more (meth)acrylate monomer as a main component (the refractive index after being cured is 1.55 to 1.70), and one or both of light transmissive particles of a cross-linking poly(meth)acrylate polymer in which the content ratio of styrene is 50 mass % to 100 mass % and benzoguanamine particles is included, and among them, a combination of the binder described above and light transmissive particles (the refractive index is 1.54 to 1.59) formed of a cross-linking poly(styrene-acrylate) copolymer in which the content ratio of styrene is 50 mass % to 100 mass % is preferably exemplified.

In addition, from the viewpoint described above, it is preferable that an absolute value in a difference between the refractive index of the binder and the refractive index of the light transmissive particles is less than or equal to 0.04. The absolute value in the difference between the refractive index of the binder and the refractive index of the light transmissive particles is preferably 0.001 to 0.030, is more preferably 0.001 to 0.020, and is even more preferably 0.001 to 0.015.

Here, the refractive index of the binder is able to be directly measured by using an Abbe's refractometer, or is able to be quantitatively evaluated by measuring a spectral reflection spectrum or spectroscopic ellipsometry. The refractive index of the light transmissive particles is measured by equivalently dispersing the light transmissive particles in a solvent in which the refractive index is changed by changing a mixing ratio of two types of solvents having different refractive indexes, by measuring turbidity, and by measuring the refractive index of the solvent at the time that the turbidity is minimized using an Abbe's refractometer.

From a viewpoint of the anti-glare characteristics, the content of the light transmissive particles is preferably 3 mass % to 30 mass %, and is preferably 5 mass % to 20 mass %, with respect to the total solid content in the formed antiglare layer.

In addition, two or more types of light transmissive particles having different particle diameters may be used in combination. The light transmissive particles having a larger particle diameter are able to apply the anti-glare characteristics, and the light transmissive particles having a smaller particle diameter are able to apply other optical properties.

In addition, when the antiglare layer is disposed in the present invention, in order to control the aggregation properties of the light transmissive particles, an aspect is also preferably exemplified in which a smectite type clay organic composite body obtained by intercalating a quaternary ammonium salt in smectite type clay is used. The content of the smectite type clay organic composite body is preferably 0.2 mass % to 8.0 mass %, is more preferably 0.3 mass % to 4.0 mass %, is even more preferably 0.4 mass % to 3.0 mass %, and is particularly preferably 0.5 mass % to 2.0 mass %, with respect to the total solid content of an antiglare layer to be formed.

As the quaternary ammonium salt, a quaternary ammonium salt denoted by General Formula (1) described below is preferable.

 (1)

(in the formula, $R^1$ and $R^2$ are not identical to each other, $R^1$ represents an alkyl group, an alkenyl group, or an alkynyl group having 4 to 24 carbon atoms, $R^2$ represents an alkyl group, an alkenyl group, or an alkynyl group having 1 to 10 carbon atoms, and $X^-$ represents an anion)

As the ammonium ions of General Formula (1), for example, trioctyl•methyl•ammonium ions, tristearyl•ethyl•ammonium ions, trioctyl•ethyl•ammonium ions, tristearyl•methyl•ammonium ions, tridecyl•hexyl•ammonium ions, tritetradecyl•propyl•ammonium ions, and the like are included, and among them, trioctyl•methyl•ammonium ions and tristearyl•ethyl•ammonium ions are preferably exemplified.

In General Formula (1), $X^-$ represents an anion. As the anion, for example, $Cl^-$, $Br^-$, $OH^-$, $NO_3^-$, and the like are included, and among them, $Cl^-$ is preferably exemplified.

As a commercially available product of the smectite type clay organic composite body, Rusentite SAN, Rusentite STN, Rusentite SEN, and Rusentite SPN (all are manufactured by Co-op Chemical Co., Ltd.), and the like are included, and the products are able to be independently used or two or more types thereof are able to be used in combination.

When the antiglare layer is disposed in the present invention, the film thickness is preferably 0.5 µm to 50 is more preferably 1 µm to 35 µm, and is even more preferably 1 µm to 25 µm.

When the antiglare layer is disposed in the present invention, it is preferable that center line average roughness ($Ra_{75}$) is in a range of 0.10 µm to 0.40 µm.

In addition, the strength of the antiglare layer is preferably greater than or equal to H, is more preferably greater than or equal to 2H, and is most preferably greater than or equal to 3H by a pencil hardness test.

As a method of forming the antiglare layer, for example, a method of forming the antiglare layer by laminating a mat-like shaping film having fine concavities and convexities on the surface as disclosed in claim 22 of JP1994-16851A (JP-H06-16851A), a method of forming the antiglare layer by curing and contracting an ionizing radiation curing resin due to a difference in ionizing radioactive ray irradiation dose as disclosed in claim 10 of JP2000-206317A, a method of forming concavities and convexities on the surface of a coated film by reducing the weight ratio of a good solvent to a light transmissive resin by drying, and thus by solidifying light transmissive particles and the light transmissive resin while gelating as disclosed in claim 6 of JP2000-338310A, a method of applying concavities and convexities on the surface by the pressure from the outside as disclosed in claim 8 of JP2000-275404A, and the like are known, and these known methods are able to be used.

In addition, an aspect in which the light transmissive particles are contained in the support body, and thus an anti-glaring function is applied to the support body is also able to be preferably used. As this aspect, a film having an anti-glaring function disclosed in claim 1 of JP2009-258720A or claim 1 of JP2005-105926A is preferably exemplified.

[Layer of High Refractive Index, Layer of Intermediate Refractive Index, and Layer of Low Refractive Index]

When the layer of high refractive index is disposed in the present invention, the refractive index is preferably 1.70 to 1.74, and is more preferably 1.71 to 1.73. When the layer of intermediate refractive index is disposed in the present invention, the refractive index is adjusted to be a value between the refractive index of the layer of low refractive index and the refractive index of the layer of high refractive index. The refractive index of the layer of intermediate refractive index is preferably 1.60 to 1.64, and is more preferably 1.61 to 1.63. When the layer of low refractive index is disposed in the present invention, it is preferable that the refractive index is 1.30 to 1.47. In a case of a multilayer thin film interference type antireflection film (the layer of intermediate refractive index/the layer of high refractive index/the layer of low refractive index), the refractive index of the layer of low refractive index is preferably 1.33 to 1.38, and is more preferably 1.35 to 1.37.

In a forming method of the layer of high refractive index, the layer of intermediate refractive index, and the layer of low refractive index, a transparent thin film of an inorganic oxide is able to be used by a chemical vapor deposition (CVD) method or a physical vapor deposition (PVD) method, and in particular, by a vacuum vapor deposition method or a sputtering method which is one type of the physical vapor deposition methods, and a method using all wet coating is preferable.

As the layer of high refractive index, the layer of intermediate refractive index, and the layer of low refractive index, layers disclosed in paragraph numbers "0197" to "0211" of JP2009-98658A are able to be used.

The layers are able to be formed on the antiglare layer, and it is preferable that the material or the thickness thereof is able to be suitably adjusted.

[Hard Coat Layer]

In the optical film of the present invention, the hard coat layer may be disposed in order to apply the physical strength of the film. By disposing the hard coat layer, the scratch resistance of a pencil scratch test or the like is further strengthened, and thus disposing the hard coat layer is preferable.

As the hard coat layer, hard coat layers disclosed in paragraph numbers "0190" to "0196" of JP2009-98658A are able to be used.

(Moisture Permeability of Optical Film)

The moisture permeability of the optical film of the present invention is measured under conditions of 40° C. and a relative humidity of 90% on the basis of JIS Z-0208.

The moisture permeability of the optical film of the present invention is preferably less than 200 g/m²/day, is more preferably less than 100 g/m²/day, is even more preferably less than 50 g/m²/day, is particularly preferably less than 30 g/m²/day, and is even more particularly preferably less than 10 g/m²/day.

(Haze of Optical Film)

It is preferable that the total haze value of the optical film of the present invention is less than or equal to 2.0%. When the total haze value is less than or equal to 2.0%, the transparency of the film is high, and thus the contrast ratio and the brightness of the liquid crystal display device are improved. The total haze value is preferably less than or equal to 1.0%, is more preferably less than or equal to 0.5%, and is particularly preferably less than or equal to 0.3%. The optical performance becomes excellent as the total haze value becomes lower, and in consideration of the selection of the raw material, the manufacturing management, and the handling properties of the roll film, it is preferable that the total haze value is greater than or equal to 0.01%.

It is preferable that the internal haze value of the optical film is less than or equal to 1.0%. By setting the internal haze value to be less than or equal to 1.0%, the contrast ratio of the liquid crystal display device is improved, and thus it is possible to realize excellent display properties. The internal haze value is preferably less than or equal to 0.5%, is more preferably less than or equal to 0.2%, and is particularly preferably less than or equal to 0.1%. It is preferable that the internal haze value is greater than or equal to 0.01% from a viewpoint of the selection of the raw material, the manufacturing management, and the like.

Furthermore, the haze is able to be obtained by measuring a film sample of 40 mm×80 mm at 25° C. and a relative humidity of 60% using a hazemeter (HGM-2DP, manufactured by Suga Test Instruments Co., Ltd.) on the basis of JIS K-6714.

[Process for Producing Optical Film]

A process for producing an optical film of the present invention which includes a layer containing a cyclic polyolefin-based resin on at least one surface of a light transmissive support body containing a thermoplastic resin, includes the following steps of (a), (b), and (c) in this order.

(a) A step of disposing a coated layer by applying a first composition containing at least a compound which is able to form a resin by being cured with light and/or heat and a first solvent onto a light transmissive support body (b) A step of applying a second composition containing at least a cyclic polyolefin-based resin and a second solvent onto the same surface as that of the light transmissive support body on which the coated layer is disposed in the step of (a) described above (c) A step of forming a resin by curing the compound which is able to form a resin by being cured with light and/or heat using light irradiation and/or heating The layer A of the optical film of the present invention is formed by swelling or dissolving the thermoplastic resin configuring the light transmissive support body by the first solvent at the time of applying the first composition containing the compound which is able to form a resin by being cured with light and/or heat and the first solvent, and by allowing the compound which is able to form a resin by being cured with light and/or heat to permeate through the thermoplastic resin configuring the light transmissive support body or by mixing the compound with the thermoplastic resin described above.

In addition, the layer B of the optical film of the present invention is formed by adjusting the degree of curing of the compound which is able to form a resin by being cured with light and/or heat, by swelling or dissolving the compound which is able to form a resin by being cured with light and/or heat at the time of applying the second composition containing the cyclic polyolefin-based resin and the second solvent, and by mixing the compound with the cyclic polyolefin-based resin or by allowing the cyclic polyolefin-based resin to permeate through the compound which is able to form a resin by being cured with light and/or heat.

[Step of (a)]

The step of (a) is a step of disposing the coated layer by applying the first composition containing at least the compound which is able to form a resin by being cured with light and/or heat and the first solvent onto the light transmissive support body.

The step of (a) may be performed in a plurality of steps. At this time, the compounds which are able to form the resin by being cured with light and/or heat and the solvents used in the respective steps may be identical to each other, or may be different from each other.

The light transmissive support body is identical to the light transmissive support body of the optical film of the present invention described above.

As the compound which is able to form a resin by being cured with light and/or heat, the monomers or the oligomers described in <Resin Cured with Light and/or Heat Which is Contained in Layer A> are able to be used.

It is preferable that the compound which is able to form a resin by being cured with light and/or heat is a monomer or an oligomer which is dissolved in the second solvent described below (preferably a main solvent) in the amount of greater than or equal to 30 mass %. Further, it is preferable that the compound is dissolved in the second solvent in the amount of greater than or equal to 50 mass %, and it is most preferable that the compound is dissolved in the second solvent in the amount of greater than or equal to 70 mass %.

The content of the compound which is able to form a resin by being cured with light and/or heat is preferably 30 mass % to 99 mass %, is more preferably 50 mass % to 99 mass %, and is even more preferably 80 mass % to 99 mass %, with respect to the total solid content of the first composition.

<First Solvent>

The first solvent may be only one type solvent, or may contain two or more types of solvents.

It is preferable that the first solvent in the step of (a) is an organic solvent, and as the first solvent, a chain-like aliphatic hydrocarbon-based solvent such as n-pentane, n-hexane, n-heptane, fluid paraffin, and mineral spirits, an alicyclic hydrocarbon-based solvent such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroinden, and cyclooctane, an aromatic hydrocarbon-based solvent such as benzene, toluene, and xylene, a hydrocarbon-based solvent having an aliphatic ring and an aromatic ring such as inden, and tetrahydronaphthalene, a nitrogen-containing hydrocarbon-based solvent such as nitromethane, nitrobenzene, and acetonitrile, an oxygen-containing hydrocarbon-based solvent such as diethyl ether, and tetrahydrofuran, a chlorine-based solvent such as dichloromethane, and chloroform, an alcohol-based solvent such as methanol, ethanol, isopropanol, n-butyl alcohol, cyclohexyl alcohol, 2-ethyl-1-hexanol, 2-methyl-1hexanol, 2-methoxy ethanol, 2-propoxy ethanol, 2-butoxyethanol, and diacetone alcohol, a carbonate-based solvent such as dimethyl carbonate, diethyl carbonate, diisopropyl carbonate, methyl ethyl carbonate, methyl n-propyl carbonate, an ester-based solvent such as ethyl formate, propyl formate, pentyl formate, methyl acetate, ethyl acetate, propyl acetate, methyl propionate, ethyl propionate, 2-ethoxy ethyl propionate, methyl acetoacetate, ethyl acetoacetate, 2-methoxy methyl acetate, 2-ethoxy methyl acetate, and 2-ethoxy ethyl acetate, an ether-based solvent such as ethylene glycol ethyl ether, ethylene glycol isopropyl ether, ethylene glycol butyl ether, propylene glycol methyl ether, dibutyl ether, dimethoxy ethane, diethoxy ethane, tetrahydrofuran, anisole, and phenetole, a ketone-based solvent such as acetone, 1,2-diacetoxy acetone, acetyl acetone, methyl ethyl ketone, diethyl ketone, dipropyl ketone, diisobutyl ketone, cyclopentanone, cyclohexanone, methyl cyclohexanone, methyl isobutyl ketone, 2-octanone, 2-pentanone, and 2-hexanone, and the like are included, and it is preferable that at least one of them is used.

Among them, in the step of (a), it is preferable that at least one type of the first solvent is a solvent which dissolves or swells the light transmissive support body. By using the solvent which dissolves or swells the light transmissive support body, a coating material such as the compound which is able to form a resin by being cured with light and/or heat permeates through the light transmissive support body, and thus a layer in which the thermoplastic resin configuring the light transmissive support body and the compound which is able to form a resin by being cured with light and/or heat are mixed is easily formed, and excellent adhesiveness between the light transmissive support body and the resin cured with light and/or heat is exhibited through a curing step, and thus using the solvent which dissolves or swells the light transmissive support body is preferable.

As the solvent which dissolved or swells the light transmissive support body containing the cellulose-based resin and the light transmissive support body containing the (meth)acrylic resin, acetone, methyl acetate, ethyl acetate, butyl acetate, methyl acetoacetate, ethyl acetoacetate, chloroform, methylene chloride, trichloroethane, tetrahydrofuran, methyl ethyl ketone, cyclohexanone, nitromethane, 1,4-dioxane, dioxolane, N-methyl pyrrolidone, N,N-dimethyl formamide, diisopropyl ether, methyl cellosolve, ethyl cellosolve, butyl cellosolve, dimethyl carbonate, diethyl carbonate, di-n-propyl carbonate, diisopropyl carbonate, methyl ethyl carbonate, methyl n-propyl carbonate, and ethyl n-propyl carbonate are included.

In particular, when the light transmissive support body is formed of the cellulose-based resin or the (meth)acrylic resin, the first solvent to be used is preferably at least one selected from methyl ethyl ketone, ethyl acetate, methyl acetate, methyl acetoacetate, cyclohexanone, acetone, dimethyl carbonate, and diethyl carbonate, and is more preferably at least one selected from methyl ethyl ketone, methyl acetate, methyl acetoacetate, cyclohexanone, acetone, dimethyl carbonate, and diethyl carbonate, from a viewpoint of excellent adhesiveness obtained by dissolving or swelling the light transmissive support body.

As the solid content concentration of the first composition containing at least the compound which is able to form a resin by being cured with light and/or heat and the first solvent is preferably 5 mass % to 80 mass %, is more preferably 30 mass % to 70 mass %, and is most preferably 40 mass % to 65 mass %. By setting the solid content concentration of the first composition to be in the range described above, a balance between the swelling or dissolving degree of the light transmissive support body surface and the permeation degree of the coating material such as the compound which is able to form a resin by being cured with light and/or heat with respect to the light transmissive support body is excellent, and thus the first composition permeates through the light transmissive support body such that excellent adhesiveness is expressed.

<Coating Method>

The respective layers of the film of the present invention are able to be formed by the following coating methods, but the present invention is not limited to the methods.

Known methods such as a dip coating method, an air knife coating method, a curtain coating method, a roller coating method, a wire bar coating method, a gravure coating method, an extrusion coating method (a die coating method) (refer to the specification of U.S. Pat. No. 2,681,294A), and a microgravure coating method are used, and among them, a microgravure coating method, and a die coating method are preferable.

[Step of (b)]

The step of (b) is a step of applying the second composition containing at least the cyclic polyolefin-based resin and the second solvent onto the same surface as that of the light transmissive support body on which the coated layer is disposed in the step of (a) described above.

The step of (b) will be described.

According to the step of (b), a layer is formed in which the compound which is able to form a resin by being cured with light and/or heat and the cyclic polyolefin-based resin are mixed.

As a coating method in the step of (b), the same coating methods as those in the step of (a) are able to be used. When the coated layer which is coated in the step of (a) is coated in the step of (b) in an uncured state, the coating is able to be performed in non-contact with the coated film, and thus it is preferable to use a die coating method.

As the cyclic polyolefin-based resin of the second composition in the step of (b), the same cyclic polyolefin-based resin as that of the optical film of the present invention is able to be used.

The content of the cyclic polyolefin-based resin is preferably 50 mass % to 100 mass %, is more preferably 70 mass % to 100 mass %, and is even more preferably 90 mass % to 100 mass %, with respect to the total solid content of the second composition.

In the second composition of the step of (b), the compound of the optical film of the present invention which is able to form a resin by being cured with light and/or heat is able to be used in combination. By using the compound in combination, the adhesiveness between the light transmissive support body and the cyclic polyolefin-based resin is easily obtained.

As the second solvent in the step of (b), the same solvent as the first solvent in the step of (a) described above is able to be used. The second solvent may be only one type of solvent, or may contain two or more types of solvents. Among the solvents described above, as the second solvent, it is preferable to contain at least one of an alicyclic hydrocarbon-based solvent and an aromatic hydrocarbon-based solvent from a viewpoint of the solubility and the versatility of the cyclic polyolefin-based resin, and among the second solvents, it is more preferable that a main solvent (a solvent of which the content is greater than 50 mass % with respect to the total solvent) is an alicyclic hydrocarbon-based solvent or an aromatic hydrocarbon-based solvent.

It is preferable that the alicyclic hydrocarbon-based solvent or the aromatic hydrocarbon-based solvent described above is at least one of cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroinden, cyclooctane, toluene, and xylene.

The boiling point of the solvent which is contained in the coating composition described above in the largest amount is preferably lower than 150° C., is more preferably lower than 120° C., and is most preferably lower than 90° C., from a viewpoint of reducing a drying load.

The content of the compound dissolved in the second solvent, which is able to form a resin by being cured with light and/or heat in the step of (a) described above is preferably greater than or equal to 30 mass %, is more preferably greater than or equal to 50 mass %, and is most preferably greater than or equal to 70 mass %.

Among the second solvents, it is more preferable that a main solvent (a solvent of which the content is greater than 50 mass % with respect to the total solvent) has the properties described above.

By using the monomer or the oligomer having solubility as described above, a layer is easily formed in which the resin cured with light and/or heat and the cyclic polyolefin-based resin are mixed in the step of (b), excellent adhesiveness between the light transmissive support body and the resin cured with light and/or heat is exhibited through the curing step, and thus using the monomer or the oligomer having solubility as described above is preferable.

The solid content concentration of the second composition is preferably 1 mass % to 50 mass %, is more preferably 1 mass % to 30 mass %, and is even more preferably 5 mass % to 20 mass %.

A step of curing the compound which is able to form a resin by being cured with light and/or heat described above may also be included between the step of (a) and the step of (b) described above. By adjusting the reaction rate, it is possible to adjust the mixed state of the resin cured with light and/or heat described above and the cyclic polyolefin-based resin described above. The reaction rate of the compound which is able to form a resin by being cured with light and/or heat in the coated layer obtained in the step of (a) at the time of performing the step of (b) described above is preferably less than 80%, is more preferably greater than or equal to 0% and less than 50%, and is most preferably greater than or equal to 0% and less than 30%. By setting the reaction rate to be less than 80%, a layer is formed in which the resin cured with light and/or heat described above and the cyclic polyolefin-based resin described above are mixed, and thus the adhesiveness is able to be applied.

[Step of (c)]

The step of (c) is a step of forming the resin by curing the compound which is able to form a resin by being cured with light and/or heat using light irradiation and/or heating.

The step of (c) will be described.

(Curing Conditions of Compound Which is able to Form Resin by Being Cured with Light and/or Heat in Coated Layer)

In the present invention, it is possible to select curing conditions suitable for a curable functional group of each component used in each coated layer.

A preferred example will be described below.

(A) System of Using Thermosetting Compound

When a thermosetting compound is used, the curing temperature is preferably 60° C. to 200° C., is more preferably 80° C. to 130° C., and is most preferably 80° C. to 110° C. When the light transmissive support body easily deteriorates at a high temperature, a low temperature is preferable as the curing temperature. The time required for thermal curing is preferably 30 seconds to 60 minutes, and is more preferably 1 minute to 20 minutes. For example, when a resin having an epoxy group and/or an oxetanyl group and a thermal acid generator are contained as an initiator, the curing is able to be performed by using heat.

(B) System of Using Photosetting Compound

When a photosetting compound is used, the curing is able to be performed by using irradiation of ionizing radiation. Further, it is effective to perform the curing by being combined with a heat treatment before the irradiation, simultaneously with the irradiation, or after the irradiation. For example, when a resin having an ethylenically unsaturated double bond group and a photoradical initiator are contained, or when a resin having an epoxy group and/or an oxetanyl group and a photoacid generator are contained as an initiator, the curing is able to be performed by using light.

Hereinafter, several patterns of a manufacturing step will be described, but the present invention is not limited thereto.

Before Irradiation→Simultaneously with Irradiation-→After Irradiation (- indicates that the heat treatment is not performed)

(1) Heat Treatment→Ionizing Radiation Curing→-

(2) Heat Treatment→Ionizing Radiation Curing→Heat Treatment (3) -→Ionizing Radiation Curing→Heat Treatment In addition, a step of performing the heat treatment simultaneously with the ionizing radiation curing is also preferable.

(Heat Treatment)

In the present invention, as described above, it is preferable that the heat treatment is performed in combination with the irradiation of the ionizing radiation. The heat treatment is not particularly limited insofar as the heat treatment does not impair a constituent layer including the light transmissive support body of the optical film, and the respective layers formed by the coating, and is preferably 60° C. to 200° C., is more preferably 80° C. to 130° C., and is most preferably 80° C. to 110° C.

By increasing the temperature, it is possible to control the distribution of each component in the coated film or control a photocuring reaction. The time required for performing the heat treatment is different according to the molecular weight of the component to be used, the interaction with respect to other components, the viscosity, and the like, and is 30 seconds to 24 hours, is preferably 60 seconds to 5 hours, and is most preferably 3 minutes to 30 minutes.

A method of adjusting the film surface temperature of the film to be a desirable temperature is not particularly limited, and as the method, a method of heating a roll and of bringing the roll into contact with the film, a method of spraying heated nitrogen, far infrared or infrared irradiation, and the like are preferable. A method of heating a rotary metal roll by allowing warm water or vapor to flow through the rotary metal roll which is disclosed in JP2523574B is also able to be used. On the other hand, in a case of performing the ionizing radioactive ray irradiation described below, when the film surface temperature of the film increases, a method of cooling the roll and of bringing the roll into contact with the film is able to be used.

(Ionizing Radioactive Ray Irradiation Conditions)

The film surface temperature at the time of performing the ionizing radioactive ray irradiation is not particularly limited, and is generally 20° C. to 200° C., is preferably 20° C. to 150° C., and is most preferably 40° C. to 120° C., from a viewpoint of handling properties and evenness of in-plane performance. When the film surface temperature is lower than or equal to the upper limit value described above, a problem in that the fluidity of a low molecular component in the binder excessively increase, and thus the surface state deteriorates, or the support body is damaged due to heat does not occur, and thus setting the film surface temperature to be lower than or equal to the upper limit value described above is preferable. In addition, when the film surface temperature is higher than or equal to the lower limit value described above, the curing reaction sufficiently progresses, and the adhesiveness of the coated film becomes excellent, and thus setting the film surface temperature to be higher than or equal to the lower limit value described above is preferable.

The type of the ionizing radioactive ray is not particularly limited, and as the type of the ionizing radioactive ray, an X-ray, an electron beam, an ultraviolet ray, visible light, an infrared ray, and the like are included, and it is preferable to use an ultraviolet ray. For example, when the coated film is an ultraviolet curable film, it is preferable that each of the layers is cured by being irradiated with an ultraviolet ray of 10 mJ/cm$^2$ to 1000 mJ/cm$^2$ from an ultraviolet lamp. At the time of performing the irradiation, the energy described above may be applied at one time, or may be applied by being divided. In particular, it is preferable that an ultraviolet ray is applied by being divided into approximately 2 times to 8 times from a viewpoint of reducing a variation in the in-plane performance of the coated film.

(Oxygen Concentration)

The oxygen concentration in a step of performing the ionizing radioactive ray irradiation is preferably less than or equal to 3 volume %, is more preferably less than or equal to 1 volume %, is even more preferably less than or equal to 0.1 volume %, and is most preferably less than or equal to 0.03 volume %. A step of performing the ionizing radioactive ray irradiation at an oxygen concentration of less than or equal to 3 volume % is able to include a step of maintaining the state immediately before or immediately after the step of performing the ionizing radioactive ray irradiation under an atmosphere in which the oxygen concentration is less than or equal to 3 volume %. According to this, the curing of the film is sufficiently accelerated, and a coated film having excellent adhesiveness and physical strength is able to be formed.

A step of performing the heat treatment before performing the ionizing radioactive ray irradiation, simultaneously with the irradiation, or after the irradiation is able to be performed in an air atmosphere, and it is preferable that the step of performing the heat treatment is performed by decreasing the oxygen concentration as with the ionizing radioactive ray irradiation. In particular, when the thermal stability of a polymerization initiator, a polymerizable compound, or the like is insufficient, the heat treatment is performed by decreasing the oxygen concentration, and thus it is possible to strongly maintain the strength of the film after ending all curing steps.

As means for decreasing the oxygen concentration, means for substituting air (a nitrogen concentration of approximately 79 volume %, and an oxygen concentration of approximately 21 volume %) with another inert gas is preferable, and means for substituting air with nitrogen (nitrogen purge) is particularly preferable. Transporting is performed under an atmosphere of a low oxygen concentration before the step of performing the ionizing radioactive ray irradiation, and thus it is possible to effectively reduce the oxygen concentration of the surface of the coated film and the inner portion of the coated film, and it is possible to accelerate the curing.

<Polarizer>

The polarizer of the present invention includes a polarizing element, and at least one optical film of the present invention as a protective film of the polarizing element described above.

The optical film of the present invention is able to be used as the protective film for a polarizer. When the optical film is used as the protective film for a polarizer, a preparing method of the polarizer is not particularly limited, and the polarizer is able to be prepared by a general method. There is a method in which the obtained optical film is subjected to an alkali treatment, and the optical film is bonded to both surfaces of the polarizing element prepared by dipping and stretching a polyvinyl alcohol film in an iodine solution using an aqueous solution of fully saponified polyvinyl alcohol. Easy adhesion processing disclosed in JP1994-94915A (JP-H06-94915A), and JP1994-118232A (JP-H06-118232A) may be performed instead of the alkali treatment. In addition, the surface treatment as described above may be performed. The surface of the optical film to be bonded to the polarizing element may be a surface on which a layer containing a cyclic polyolefin-based resin is laminated, or may be a surface on which a layer containing a cyclic polyolefin is not laminated.

As an adhesive agent used for bonding a treatment surface of the protective film to the polarizing element, for example, a polyvinyl alcohol-based adhesive agent such as polyvinyl alcohol, and polyvinyl butyral, vinyl-based latex such as butyl acrylate, and the like are included.

The polarizer is configured of the polarizing element, and the protective film protecting both surfaces of the polarizing element, and is configured by bonding the protective film to one surface of the polarizer and by bonding a separate film to the opposite surface. The protective film and the separate film are used for protecting the polarizer at the time of shipping the polarizer, of performing product inspection, or the like. In this case, the protective film is bonded to the surface of the polarizer in order to protect the surface, and is used on a surface side opposite to the surface of the polarizer which is bonded to a liquid crystal plate. In addition, the separate film is used in order to cover an adhesive layer which is bonded to the liquid crystal plate, and is used on both sides of the polarizer which are bonded to the liquid crystal plate.

<Liquid Crystal Display Device>

The liquid crystal display device of the present invention includes liquid crystal cells, and the polarizer of the present invention which is arranged in at least one of the liquid crystal cells, and the optical film of the present invention which is included in the polarizer described above is arranged to be the outermost layer.

The optical film of the present invention is able to be used as an optical compensation film of the liquid crystal display device. In this case, it is more preferable that the liquid crystal display device has a configuration in which the liquid crystal cell is formed by supporting a liquid crystal between two electrode substrates, two polarizing elements are arranged on both sides of the liquid crystal cell, and at least one optical film of the present invention is arranged between the liquid crystal cell and the polarizing element as the optical compensation film. As the liquid crystal display device, a liquid crystal display device in a TN mode, an IPS mode, an FLC mode, an AFLC mode, an OCB mode, an STN mode, an ECB mode, a VA mode, and an HAN mode is preferable, and a liquid crystal display device in a TN mode, an OCB mode, an IPS mode, and a VA mode is more preferable <General Configuration of Liquid Crystal Display Device>

The liquid crystal display device has a configuration in which the liquid crystal cell is formed by supporting the liquid crystal between two electrode substrates, two polarizers are arranged on both sides of the liquid crystal cell, and as necessary, at least one optical compensation film is arranged between the liquid crystal cell and the polarizer.

A liquid crystal layer of the liquid crystal cell is generally formed by sealing a space formed by interposing a spacer between two substrates with the liquid crystal. A transparent electrode layer is formed on the substrate as a transparent film containing a conductive substance. In the liquid crystal cell, a gas barrier layer, a hard coat layer, or an undercoat layer (used in adhesion of the transparent electrode layer) may be further disposed. These layers are generally disposed on the substrate. The substrate of the liquid crystal cell generally has a thickness of 50 µm to 2 mm.

In general, in the liquid crystal display device, the substrate including the liquid crystal cell between two polarizers is arranged, the protective film for a polarizer to which the optical film of the present invention is applied is able to be used as the protective film of any one of the two polarizers, and the protective film which is used as a protective film arranged on the outside of the liquid crystal cell with respect to the polarizing element is preferable among two protective films of each of the polarizers.

A polarizer on a visible side in which the optical film of the present invention is arranged as a protective film on the visible side is particularly preferably among the two polarizers.

In addition, a polarizer on the visible side in which the optical film of the present invention is arranged as a protective film on the visible side, and the optical film of the present invention is arranged as a protective film on a backlight side of a polarizer on the backlight side, and thus the expansion and contraction of the polarizing element included in the two polarizers is suppressed, and the warping of a panel is prevented is also preferable among the two polarizers.

<Type of Liquid Crystal Display Device>

The film of the present invention is able to be used in liquid crystal cells in various display modes. Various display modes such as Twisted Nematic (TN), In-Plane Switching (IPS), Ferroelectric Liquid Crystal (FLC), Anti-ferroelectric Liquid Crystal (AFLC), Optically Compensatory Bend (OCB), Super Twisted Nematic (STN), Vertically Aligned (VA), Electrically Controlled Birefringence (ECB), and Hybrid Aligned Nematic (HAN) have been proposed. In addition, a display mode in which the display modes described above are aligned and divided has been also proposed. The optical film of the present invention is effective in the liquid crystal display device in any display mode. In addition, the optical film of the present invention is effective in all of transmissive, reflective, and semitransmissive liquid crystal display devices.

EXAMPLES

Hereinafter, the present invention will be more specifically described with reference to examples, but the range of the present invention is not limited by the examples. Furthermore, unless otherwise specifically stated, "parts" and "%" are on the mass basis.

Example 1

Preparation of Light Transmissive Support Body 1

The following compositions were put into a mixing tank, and were stirred while being heated, and each component was dissolved, and thus a cellulose acetate solution (a dope A) having a solid content concentration of 22 mass % was prepared.

[Composition of Cellulose Acetate Solution (Dope A)]

Cellulose Acetate Having Degree of Substitution of Acetyl of 2.86 and Weight Average Molecular Weight of 190000 100 parts by mass Triphenyl Phosphate (Plasticizer) 7.8 parts by mass Biphenyl Diphenyl Phosphate (Plasticizer) 3.9 parts by mass Ultraviolet Absorbent (Tinuvin 328 manufactured by BASF SE) 0.9 parts by mass Ultraviolet Absorbent (Tinuvin 326 manufactured by BASF SE) 0.2 parts by mass Methylene Chloride (First Solvent) 336 parts by mass Methanol (Second Solvent) 29 parts by mass 1-Butanol (Third Solvent) 11 parts by mass The prepared dope A was uniformity cast onto a stainless steel endless band (a cast support body) having a width of 2000 mm from a cast die by using a band casting device. When the amount of residual solvent in the dope A was 40 mass %, the dope A was peeled out from the cast support body as a polymer film, transported without being actively stretched by a tenter, and then was dried at 130° C. in a drying zone. The thickness of the obtained light transmissive support body 1 was 40 µm.

Preparation of Light Transmissive Support Body 2

The prepared dope A was uniformity cast onto a stainless steel endless band (a cast support body) having a width of 2000 mm from a cast die by using a band casting device. When the amount of residual solvent in the dope A was 40 mass %, the dope A was peeled out from the cast support body as a polymer film, was stretched in the transporting direction by setting the rotational speed of the roller on a downstream side to be faster than the rotational speed of the roller on an upstream side in a crossover portion, was stretched 1.2 times in the transporting direction (MD) at a temperature of 170° C. and 1.5 times in a direction (the TD direction) orthogonal to the transporting direction by the tenter (the stretching ratio was 1.8 times by the area ratio), and was dried at 130° C. in the drying zone. The film thickness of the obtained light transmissive support body 2 was 40 µm.

Preparation of Light Transmissive Support Body 3

(Film Formed of Acrylic Resin Having Lactone Ring Structure in Main Chain)

8000 g of methyl methacrylate (MMA), 2000 g of 2-(hydroxymethyl)methyl acrylate (MHMA), and 10000 g of toluene as a polymerization solvent were put into a reactor having an internal volume of 30 L provided with a stirring device, a temperature sensor, a cooling pipe, and a nitrogen introduction pipe, and the temperature of the reactor was increased up to 105° C. while allowing nitrogen to flow through the reactor. When reflux started according to the increase in the temperature, 10.0 g of t-amyl peroxyisononanoate was added as a polymerization initiator, solution polymerization progressed under reflux of approximately 105° C. to 110° C. while dropping a solution formed of 20.0 g of t-amyl peroxyisononanoate and 100 g of toluene for 2 hours, and maturation was performed for 4 hours. The polymerization reaction rate was 96.6%, and the content ratio (the mass ratio) of MHMA in the obtained polymer was 20.0%.

Next, 10 g of a mixture of phosphate stearyl/phosphate distearyl (Phoslex A-18, manufactured by Sakai Chemical Industry Co., Ltd.) was added to the obtained polymerization solution as a cyclization catalyst, and a cyclocondensation reaction progressed under reflux of approximately 80° C. to 100° C. for 5 hours.

Next, the obtained polymerization solution was introduced to a vent type screw biaxial extruder ($\varphi$=29.75 mm, and L/D=30) in which a barrel temperature was 260° C., a rotational speed was 100 rpm, a pressure reduction degree was 13.3 hPa to 400 hPa (10 mmHg to 300 mmHg), the number of rear vents was 1, and the number of forehand vents was 4 at a treatment speed of 2.0 kg/hour in terms of resin amount, and cyclocondensation reaction and devolatilization were performed in the extruder. Next, after completely ending the devolatilization, the resin in a heated and melted state which remained in the extruder was discharged from a distal end of the extruder, was pelletized by a pelletizer, and thus a transparent pellet formed of an acrylic resin having a lactone ring structure in a main chain was obtained. The weight average molecular weight of the resin was 148000, the melt flow rate (obtained at a test temperature of 240° C. and a load of 10 kg on the basis of JIS K7120, and the same applies to the following manufacturing examples) was 11.0 g/10 minutes, and the glass transition temperature was 130° C.

Next, the obtained pellet and an AS resin (a trade name: Toyo AS AS20, manufactured by Toyo Styrene Co., Ltd.) were kneaded at a weight ratio of pellet/AS resin=90/10 by using a monoaxial extruder ($\varphi$=30 mm), and thus a transparent pellet having a glass transition temperature of 127° C. was obtained.

The pellet of the resin composition prepared as described above was melted and extruded from a coat hanger type T die by using a biaxial extruder, and thus a resin film having a thickness of approximately 160 µm was prepared.

Next, the obtained unstretched resin film was melted and extruded to be simultaneously biaxially stretched 2.0 times in the transporting direction, and was melted and extruded to be simultaneously biaxially stretched 2.0 times in a direction orthogonal to the transporting direction (the stretching ratio was 4 times by the area ratio), and thus a light transmissive support body was prepared. The thickness of the light transmissive support body 3 obtained in this way was 40 µm, the in-plane phase difference was 2 nm, the phase difference in the thickness direction was 3 nm, the total light transmittance was 92%, the haze was 0.3%, and the glass transition temperature was 127° C.

Preparation of Light Transmissive Support Body 4

(Highly Stretched Film Formed of Acrylic Resin Having Lactone Ring Unit Structure in Main Chain)

The pellet prepared in <Preparation of Light Transmissive Support Body 3> described above was melted and extruded from a coat hanger type T die by using a biaxial extruder, and thus a resin film having a thickness of approximately 500 µm was prepared.

Next, the obtained unstretched resin film was melted and extruded to be biaxially stretched 3.4 times in the transporting direction, and was melted and extruded to be biaxially stretched 3.6 times in a direction orthogonal to the transporting direction (the stretching ratio was 12.2 times by the area ratio), and thus a light transmissive support body 4 was prepared. The thickness of the light transmissive support body 4 obtained in this way was 40 µm.

Preparation of Light Transmissive Support Body 5

First, cellulose ester, an acrylic resin, and an ultraviolet absorbent used in a light transmissive support body 5 will be described.

(Cellulose Ester)

Cellulose ester was used in which the total degree of substitution of an acyl group was 2.75, the degree of substitution of acetyl was 0.19, the degree of substitution of propionyl was 2.56, and the weight average molecular weight was 200000.

The cellulose ester was synthesized as follows.

A sulfuric acid (7.8 parts by mass with respect to 100 parts by mass of cellulose) was added to cellulose as a catalyst, a carboxylic acid which was a raw material of an acyl substituent group was added thereto, and thus an acylation reaction was performed at 40° C. At this time, the amount of carboxylic acid was adjusted, and thus the degree of substitution of an acetyl group and a propionyl group was adjusted. In addition, maturation was performed at 40° C. after the acylation. Further, a low molecular weight component of the cellulose ester was removed by being washed with acetone (hereinafter, referred to as cellulose ester CE-1).

(Acrylic Resin)

The following acrylic resin was used. As the acrylic resin, a commercially available product was available.

Dianal BR88 (trade name) having a weight average molecular weight of 1500000, manufactured by Mitsubishi Rayon Co., Ltd. (hereinafter, referred to as an acrylic resin AC-1).

(Ultraviolet Absorbent)

The following ultraviolet absorbent was used.

UV Agent 1: Tinuvin 328 (manufactured by BASF SE)

(Preparation of Dope B)

The following compositions were put into a mixing tank, and were stirred while being heated, and each component was dissolved, and thus a dope B was prepared.

(Composition of Dope B)
Cellulose Ester CE-1 30 parts by mass
Acrylic Resin AC-1 70 parts by mass
(Total Content of Cellulose Ester and Acrylic Resin Was 100 Parts by Mass)
Ultraviolet Absorbent UV Agent 1 2 parts by mass
Dichloromethane 319 parts by mass
Ethanol 43 parts by mass The solid content concentration of the dope B (the total concentration of the cellulose ester, the acrylic resin, and the ultraviolet absorbent) was 22 mass %.

The prepared dope B was uniformity cast onto a stainless steel endless band (a cast support body) having a width of 2000 mm from a cast die by using a band casting device. When the amount of residual solvent in the dope was 40 mass %, the dope B was peeled out from the cast support body, transported without being actively stretched by a tenter, and then was dried at 130° C. in a drying zone. The film thickness of the obtained light transmissive support body 5 was 40 μm.

Preparation of Light Transmissive Support Body 6

The prepared dope B was uniformity cast onto a stainless steel endless band (a cast support body) having a width of 2000 mm from a cast die by using a band casting device. When the amount of residual solvent in the dope B was 40 mass %, the dope B was peeled off from the cast support body as a polymer film, was stretched in the transporting direction by setting the rotational speed of the roller on a downstream side to be faster than the rotational speed of the roller on an upstream side in a crossover portion, was stretched 1.2 times in the transporting direction (MD) at a temperature of 170° C. and 1.5 times in a direction (the TD direction) orthogonal to the transporting direction by the tenter (the stretching ratio was 1.8 times by the area ratio), and was dried at 130° C. in the drying zone. The film thickness of the obtained light transmissive support body 6 was 40 μm.

(Preparation of Composition Containing Multifunctional Monomer or Oligomer)

Each component was mixed as shown in Table 1 described below, was put into a glass separable flask with a stirrer, was stirred at room temperature for 30 minutes, and was filtered through a polypropylene depth filter having a hole diameter of 5 μm, and thus each composition was obtained.

TABLE 1

| First Composition Coating Solution No | Multifunctional Monomer or Oligomer | | Initiator | | First Solvent | |
|---|---|---|---|---|---|---|
| | Type | Parts by Mass | Type | Parts by Mass | Typ | Parts by Mass |
| A-1 | A-TMMT | 45.5 | Irg.907 | 2.5 | MEK/Methyl Acetate | 26/26 |
| A-2 | DPHA | 45.5 | Irg.907 | 2.5 | MEK/Methyl Acetate | 26/26 |
| A-3 | A-DCP | 45.5 | Irg.907 | 2.5 | MEK/Methyl Acetate | 26/26 |
| A-4 | DCP | 45.5 | Irg.907 | 2.5 | MEK/Methyl Acetate | 26/26 |
| A-5 | ADDA | 45.5 | Irg.907 | 2.5 | MEK/Methyl Acetate | 26/26 |
| A-6 | JER825 | 43 | CPI-100P | 5 | MEK/Methyl Acetate | 26/26 |
| A-7 | EP-4088S | 43 | CPI-100P | 5 | MEK/Methyl Acetate | 26/26 |
| A-8 | A-DCP/ DCP | 22.5/ 23 | Irg.907 | 2.5 | MEK/Methyl Acetate | 26/26 |

(Preparation of Composition Containing Cyclic Polyolefin-Based Resin)

Each component was mixed as shown in Table 2 described below, was put into a glass separable flask with a stirrer, was stirred at room temperature for 24 hours, was filtered through a polypropylene depth filter having a hole diameter of 20 μm, and thus each composition was obtained.

TABLE 2

| Second Composition Coating Solution No | Cyclic Polyolefin Resin | | | Leveling Agent | | Second Solvent | |
|---|---|---|---|---|---|---|---|
| | Type | Cyclic Olefin Containing Unit/wt % | Parts by Mass | Type | Parts by Mass | Type | Parts by Mass |
| B-1 | APL8008T | 62 | 10 | F-1 | 0.05 | Cyclohexane | 90 |
| B-2 | APL6011T | 71 | 10 | F-1 | 0.05 | Cyclohexane | 90 |
| B-3 | APL5014DP | 78 | 10 | F-1 | 0.05 | Cyclohexane | 90 |
| B-4 | APL6015T | 81 | 10 | F-1 | 0.05 | Cyclohexane | 90 |
| B-5 | TOPAS9506F-4 | 62 | 10 | F-1 | 0.05 | Cyclohexane | 90 |
| B-6 | TOPAS6013 | 77 | 10 | F-1 | 0.05 | Cyclohexane | 90 |
| B-7 | TOPAS6015S-4 | 80 | 10 | F-1 | 0.05 | Cyclohexane | 90 |
| B-8 | TOPAS6017S-4 | 83 | 10 | F-1 | 0.05 | Cyclohexane | 90 |
| B-9 | COC1 | 89 | 10 | F-1 | 0.05 | Cyclohexane | 90 |

Hereinafter, the used compounds will be described.

TOPAS9506F-4: a cyclic polyolefin resin denoted by General Formula (B1) described below (manufactured by Polyplastics Co., Ltd.)
Content Ratio (Y) of Structural Unit Derived from Cyclic Olefin: 62 mass %
MFR: 20 g/10 min TOPAS6013: a cyclic polyolefin resin denoted by General Formula (B1) described below (manufactured by Polyplastics Co., Ltd.)
Content Ratio (Y) of Structural Unit Derived from Cyclic Olefin: 77 mass %
MFR: 14 g/10 min TOPAS6015S-4: a cyclic polyolefin resin denoted by General Formula (B1) described below (manufactured by Polyplastics Co., Ltd.)
Content Ratio (Y) of Structural Unit Derived from Cyclic Olefin: 80 mass %
MFR: 4 g/10 min TOPAS6017S-4: a cyclic polyolefin resin denoted by General Formula (B1) described below (manufactured by Polyplastics Co., Ltd.)
Content Ratio (Y) of Structural Unit Derived from Cyclic Olefin: 83 mass %
MFR: 2 g/10 min General Formula (B1)

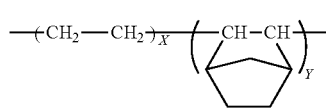

Apel APL8008T: a cyclic polyolefin resin denoted by General Formula (B2) described below (manufactured by Mitsui Chemicals, Inc.)
Content Ratio (Y) of Structural Unit Derived from Cyclic Olefin: 62 mass %
MFR: 15 g/10 min Apel APL6011T: a cyclic polyolefin resin denoted by General Formula (B2) described below (manufactured by Mitsui Chemicals, Inc.)
Content Ratio (Y) of Structural Unit Derived from Cyclic Olefin: 71 mass % MFR: 26 g/10 min Apel APL5014DP: a cyclic polyolefin resin denoted by General Formula (B2) described below (manufactured by Mitsui Chemicals, Inc.)
Content Ratio (Y) of Structural Unit Derived from Cyclic Olefin: 78 mass %
MFR: 36 g/10 min Apel APL6015T: a cyclic polyolefin resin denoted by General Formula (B2) described below (manufactured by Mitsui Chemicals, Inc.)
Content Ratio (Y) of Structural Unit Derived from Cyclic Olefin: 81 mass %
MFR: 10 g/10 min General Formula (B2)

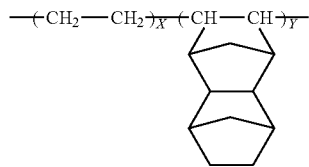

COC1: a ring-opened copolymer (1) disclosed in Example 1 of JP2011-246624A
Content Ratio (Y) of Structural Unit Derived from Cyclic Olefin Described below: 89 mass %

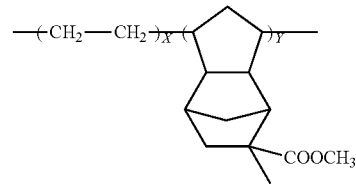

A-TMMT: pentaerythritol tetraacrylate (manufactured by Shin-Nakamura Chemical Co., Ltd.)

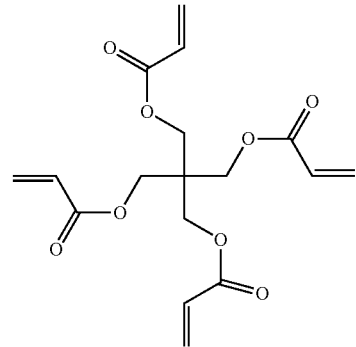 [SMILES: C=CC(=O)OCC(COC(=O)C=C)(COC(=O)C=C)COC(=O)C=C]

DPHA: a mixture of dipentaerythritol hexaacrylate and dipentaerythritol pentaacrylate (manufactured by Nippon Kayaku Co., Ltd.)

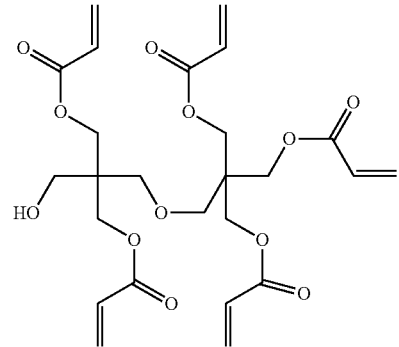

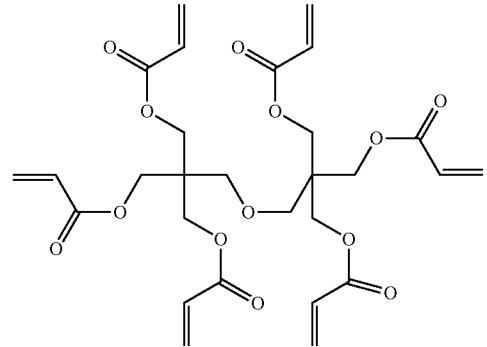

A-DCP: tricyclodecane dimethanol diacrylate (manufactured by Shin-Nakamura Chemical Co., Ltd.)

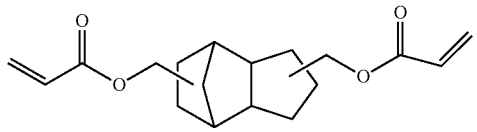

DCP: tricyclodecane dimethanol dimethacrylate (manufactured by Shin-Nakamura Chemical Co., Ltd.)

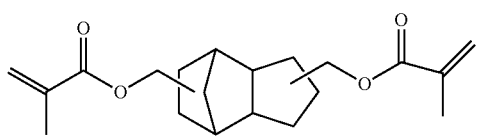

ADDA: 1,3-adamantane diol diacrylate (manufactured by Shin-Nakamura Chemical Co., Ltd.)

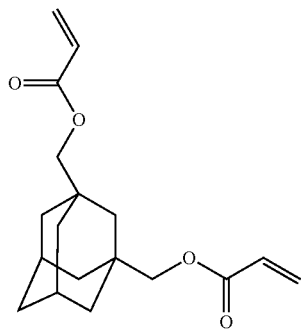 [SMILES: C=CC(=O)OCC12CC3CC(C1)CC(COC(=O)C=C)(C3)C2]

Irg.907: a photopolymerization initiator IRGACURE907 (manufactured by BASF SE)

JER825: a bisphenol A type epoxy monomer (manufactured by Mitsubishi Chemical Corporation)

EP-4088S: a dicyclopentadiene type epoxy compound (manufactured by ADEKA Corporation)

CPI-100P: a photoacid generator having the following structure (manufactured by San-Apro Ltd.), and a solid content of approximately 50%

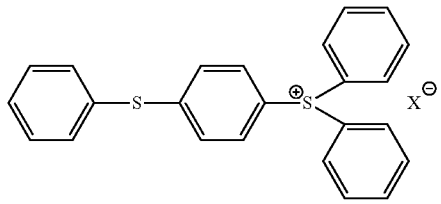

X = PF$_6$

F-1: a leveling agent denoted by the following general formula

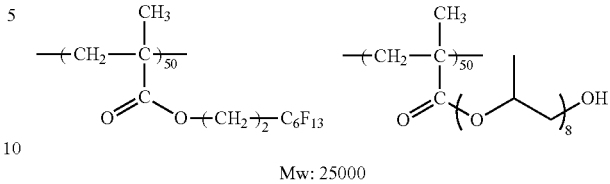

Mw: 25000

(Preparation of Optical Film 1)

The coating composition B-1 containing the cyclic polyolefin resin described above was applied onto the light transmissive support body 1 as the light transmissive support body by a die coating method using a slot die disclosed in Example 1 of JP2006-122889A such that the film thickness after performing drying in conditions of a transporting speed of 10 m/minute was 10 μm, and was dried at 120° C. for 5 minutes, and thus an optical film 1 was obtained.

(Preparation of Optical Film 2)

The coating composition A-1 which is the first composition containing the compound capable of forming a resin by being cured with light and/or heat (the multifunctional monomer or oligomer) described above was applied onto the light transmissive support body 1 as the light transmissive support body at 15 cm$^3$/m$^2$ by using a gravure coater, and then was dried at 25° C. for 1 minute.

Subsequently, the coating composition B-1 containing the cyclic polyolefin resin described above which is the second composition was applied in the same coated amount and by the same method as those in the preparation of the optical film 1 described above in a state where the multifunctional monomer or oligomer described above was not cured, and was dried at 120° C. for 5 minutes. After that, the coated layer was cured by being irradiated with an ultraviolet ray having an illuminance of 400 mW/cm$^2$ and an irradiation dose of 300 mJ/cm$^2$ using an air-cooled metal halide lamp (manufactured by Eye Graphics Co., Ltd.) of 160 W/cm at an oxygen concentration of approximately 0.01% under nitrogen purge, and thus an optical film 2 was prepared.

(Preparation of Optical Films 3 to 6, 9 to 17, and 21 to 25)

Optical films 3 to 6, 9 to 17, and 21 to 25 were prepared by the same method as that in the preparation of the optical film 2 except that the type of the light transmissive support body, the type of the coating composition containing the compound capable of forming a resin by being cured with light and/or heat (the multifunctional monomer or oligomer) described above, and the type of the coating composition containing a cyclic polyolefin resin were changed as shown in Table 3.

(Preparation of Optical Film 7)

The coating composition A-6 containing the compound capable of forming a resin by being cured with light and/or heat (the multifunctional monomer or oligomer) described above was applied onto the light transmissive support body 1 as the light transmissive support body at 15 cm$^3$/m$^2$ by using a gravure coater, and then was dried at 25° C. for 1 minute.

Subsequently, the coating composition B-1 containing the cyclic polyolefin resin described above was applied in the same coated amount and by the same method as those in the preparation of the optical film 1 described above in a state where the multifunctional monomer or oligomer described above was not cured, and was dried at 120° C. for 5 minutes.

After that, the coated layer was irradiated with an ultraviolet ray having an illuminance of 400 mW/cm² and an irradiation dose of 300 mJ/cm² using an air-cooled metal halide lamp (manufactured by Eye Graphics Co., Ltd.) of 160 W/cm at an oxygen concentration of approximately 0.01% under nitrogen purge. After that, the coated layer was cured by being heated at 120° C. for 10 minutes, and thus an optical film 7 was prepared.

(Preparation of Optical Film 8)

An optical film 8 was prepared by the same method as that in the preparation of the optical film 7 except that the coating composition containing the compound capable of forming a resin by being cured with light and/or heat (the multifunctional monomer or oligomer) described above was changed to the coating composition A-7.

(Preparation of Optical Film 18)

The coating composition A-3 containing the compound capable of forming a resin by being cured with light and/or heat (the multifunctional monomer or oligomer) described above was applied onto the light transmissive support body 1 as the light transmissive support body at 15 cm³/m² by using a gravure coater, and then was dried at 25° C. for 1 minute.

Subsequently, the coated layer was irradiated with an ultraviolet ray having an illuminance of 400 mW/cm² and an irradiation dose of 300 mJ/cm² using an air-cooled metal halide lamp (manufactured by Eye Graphics Co., Ltd.) of 160 W/cm at an oxygen concentration of approximately 0.01% under nitrogen purge.

Subsequently, the coating composition B-1 containing a cyclic polyolefin resin described above was applied in the same coated amount and by the same method as those in the preparation of the optical film 1 described above, and was dried at 120° C. for 5 minutes. After that, the coated layer was further cured by being irradiated with an ultraviolet ray having an illuminance of 400 mW/cm² and an irradiation dose of 300 mJ/cm² using an air-cooled metal halide lamp (manufactured by Eye Graphics Co., Ltd.) of 160 W/cm at an oxygen concentration of approximately 0.01% under nitrogen purge, and thus an optical film 18 was prepared.

(Preparation of Optical Film 19)

An optical film 19 was prepared by the same method as that in the preparation of the optical film 18 except that the coating composition A-3 containing the compound capable of forming a resin by being cured with light and/or heat (the multifunctional monomer or oligomer) described above was applied onto the light transmissive support body 1 as the light transmissive support body at 15 cm³/m² by using a gravure coater, and then was dried at 25° C. for 1 minute, and then was irradiated with an ultraviolet ray having an illuminance of 400 mW/cm² and an irradiation dose of 2 mJ/cm² using an air-cooled metal halide lamp (manufactured by Eye Graphics Co., Ltd.) of 160 W/cm under air.

(Preparation of Optical Film 20)

An optical film 20 was prepared by the same method as that in the preparation of the optical film 18 except that the coating composition A-3 containing the compound capable of forming a resin by being cured with light and/or heat (the multifunctional monomer or oligomer) described above was applied onto the light transmissive support body 1 as the light transmissive support body at 15 cm³/m² by using a gravure coater, and then was dried at 25° C. for 1 minute, and then was irradiated with an ultraviolet ray having an illuminance of 400 mW/cm² and an irradiation dose of 10 mJ/cm² using an air-cooled metal halide lamp (manufactured by Eye Graphics Co., Ltd.) of 160 W/cm under air.

[Evaluation of Optical Film]

The prepared optical films of each of the examples and comparative examples were subjected to physical property measurement and evaluation.

(1) Moisture Permeability (Moisture Permeability at 40° C. and Relative Humidity of 90%)

The moisture permeability was measured by adjusting the humidity of optical film samples of 70 mmφ in each of the examples and comparative examples at 40° C. and a relative humidity of 90% for 24 hours using a method of JIS Z-0208.

(2) Adhesiveness Evaluation

The evaluation was performed by using a crosscut peeling method disclosed in JIS-K5400. That is, an adhesion test was performed with using a cellophane tape (manufactured by Nichiban Co., Ltd.) by putting 100 crosscuts having an interval of 1 mm on a layer of the sample which contained a cyclic polyolefin-based resin. The operation of bonding a new cellophane tape to the sample and peeling off the cellophane tape from the same was repeatedly performed 3 times in the same portion, and was determined on the basis of the following criteria.

A Cells of the crosscuts were not peeled off even at the time of repeating the operation 3 times B The peeling occurred at the third operation, but there was no problem C The peeling occurred at the second operation, but there was no problem D The peeling occurred at the first operation, and the ratio of the cells of the crosscuts which were not peeled off was greater than or equal to 10%, and thus there was a problem E The peeling occurred at the first operation, and the ratio of the cells of the crosscuts which were not peeled off was less than 10%, and thus there was an extremely great problem (3) Haze The haze of the obtained film was measured on the basis of JIS-K7136. When the haze was less than 1%, it was evaluated as OK.

(4) Confirmation of Presence or Absence of Mixed Layer (Layer A and Layer B), and Film Thickness The film thickness of the mixed layer was measured by cutting the optical film with a microtome, by exposing the sectional surface, by dyeing the sectional surface with osmium tetraoxide for 24 hours, by cutting the surface again, by removing an excessive osmium dyed portion, and then by observing the surface using a sectional surface SEM. The monomer or oligomer having an ethylenically unsaturated double bond which was mixed with the thermoplastic resin (or the cyclic polyolefin resin) of the light transmissive support body was hindered by the polymer chain of the thermoplastic resin (or the cyclic polyolefin resin), and was not able to complete the photopolymerization reaction in many cases, and thus the brightnesses and darknesses of the layer A and the light transmissive support body were observed as being different by dyeing the monomer or oligomer. When an epoxy compound was used as the compound capable of forming a resin by being cured with light and/or heat, the same observation was performed by performing the dyeing by using ruthenium tetraoxide instead of the osmium tetraoxide.

In the compound composition of each of the mixed layers, when the sectional surface is cut out by cutting the film with a microtome at an inclination of approximately 3 degrees in the normal direction of the film on the basis of the surface direction of the film, and was analyzed by a flight time type secondary ion mass analysis device (TOF-SIMS IV and a $Bi^{3+}$ primary ion gun (25 kV, and 0.2 pA), manufactured by ION-TOF GmbH), a portion of the light transmissive support body in which a thermoplastic resin component and a resin component cured with light and/or heat in the first compound were detected together was detected as the layer A, and a region of the light transmissive support body in which a resin component cured with light and/or heat and a cyclic polyolefin resin component were detected together was detected as the layer B. For example, when cellulose acetate was used as the thermoplastic resin of the light transmissive support body, $C_6H_5O_2^+$ was able to be used in the detection, when A-DCP was used as the compound capable of forming a resin by being cured with light and/or heat, $C_3H_3O^+$ was able to be used in the detection, and when APL (Apel) manufactured by Mitsui Chemicals, Inc. was used as the cyclic polyolefin resin, a fragment of $C_7H_{11}^+$ was able to be used in the detection.

In the present invention, SEM and TOF-SIMS described above were used in combination, and thus the compound composition and the film thickness of each of the mixed layers were confirmed.

(5) Reaction Rate

In order to examine the reaction rate of the coated layer obtained by first coating, FT-IR was measured (a device: NICOLET6700, manufactured by Thermo Fisher Scientific K.K.). The reaction rate is able to be calculated by using an absorption peak peculiar to the functional group of the used resin according to the functional group of the used resin.

When the resin having an ethylenically unsaturated double bond was used, absorption intensity of 812 cm$^{-1}$ was measured, and thus the reaction rate (%) was calculated by the following formula. In order to examine the absorption intensity of only the coated layer, the absorption intensity was obtained by subtracting the absorption spectrum of only the light transmissive substrate from the absorption spectrum of the film after the coating.

$$\text{Reaction Rate (\%)} = \frac{A_0^{812} - A_I^{812}}{A_0^{812}} \times 100 \qquad \text{[Expression 1]}$$

$A_0^{812}$: Absorption Intensity of 812 cm$^{-1}$ Before Light Irradiation $A_I^{812}$: Absorption Intensity of 812 cm$^{-1}$ After Light Irradiation (and/or Heating)

The obtained evaluation results are shown in Table 3.

TABLE 3

| Sample No | Support Body | First Coating — First Composition | First Coating — Curing Conditions — UV Irradiation Dose (mJ/cm²) | First Coating — Curing Conditions — Oxygen Concentration | Reaction Rate % | Second Coating — Second Composition | Second Coating — Cyclic Olefin Structural Unit Content Ratio | Second Coating — Curing Conditions — UV Irradiation Dose (mJ/cm²) | Second Coating — Curing Conditions — Oxygen Concentration | Second Coating — Curing Conditions — Post Heating | Moisture Permeability g/m²/day | Mixed Layer A (μm) | Mixed Layer B (μm) | Adhesiveness | Haze (%) | Reference |
|---|---|---|---|---|---|---|---|---|---|---|---|---|---|---|---|---|
| 1 | Light Transmissive Support Body 1 | — | — | — | — | B-1 | 62 Mass % | — | — | — | 15 | None | None | E | 0.35 | Comparative Example |
| 2 | Light Transmissive Support Body 1 | A-1 | — | — | 0 | B-1 | 62 Mass % | 300 | 100 ppm | — | 45 | 4 | 13.5 | B | 0.58 | Example |
| 3 | Light Transmissive Support Body 1 | A-2 | — | — | 0 | B-1 | 62 Mass % | 300 | 100 ppm | — | 45 | 2.5 | 15 | B | 0.66 | Example |
| 4 | Light Transmissive Support Body 1 | A-3 | — | — | 0 | B-1 | 62 Mass % | 300 | 100 ppm | — | 25 | 3.5 | 14 | A | 0.42 | Example |
| 5 | Light Transmissive Support Body 1 | A-4 | — | — | 0 | B-1 | 62 Mass % | 300 | 100 ppm | — | 18 | 2.5 | 15 | A | 0.40 | Example |
| 6 | Light Transmissive Support Body 1 | A-5 | — | — | 0 | B-1 | 62 Mass % | 300 | 100 ppm | — | 21 | 3 | 14.5 | A | 0.43 | Example |
| 7 | Light Transmissive Support Body 1 | A-6 | — | — | 0 | B-1 | 62 Mass % | 300 | 100 ppm | 120° C. 10 Minutes | 52 | 5 | 12.5 | C | 0.68 | Example |
| 8 | Light Transmissive Support Body 1 | A-7 | — | — | 0 | B-1 | 62 Mass % | 300 | 100 ppm | 120° C. 10 Minutes | 29 | 5 | 12.5 | B | 0.44 | Example |
| 9 | Light Transmissive Support Body 1 | A-8 | — | — | 0 | B-1 | 62 Mass % | 300 | 100 ppm | — | 20 | 3 | 14.5 | A | 0.40 | Example |
| 10 | Light Transmissive Support Body 1 | A-3 | — | — | 0 | B-2 | 71 Mass % | 300 | 100 ppm | — | 26 | 3.5 | 14 | A | 0.42 | Example |

TABLE 3-continued

| Sample No | Support Body | First Composition | First Coating Curing Conditions UV Irradiation Dose (mJ/cm²) | First Coating Curing Conditions Oxygen Concentration | Reaction Rate % | Second Composition | Cyclic Olefin Structural Unit Content Ratio | Second Coating Curing Conditions UV Irradiation Dose (mJ/cm²) | Second Coating Curing Conditions Oxygen Concentration | Post Heating | Moisture Permeability g/m²/day | Mixed Layer A (μm) | Mixed Layer B (μm) | Adhesiveness | Haze (%) | Reference |
|---|---|---|---|---|---|---|---|---|---|---|---|---|---|---|---|---|
| 11 | Light Transmissive Support Body 1 | A-3 | — | — | 0 | B-3 | 78 Mass % | 300 | 100 ppm | — | 45 | 3.5 | 14 | B | 0.44 | Example |
| 12 | Light Transmissive Support Body 1 | A-3 | — | — | 0 | B-4 | 81 Mass % | 300 | 100 ppm | — | 62 | 3.5 | 14 | C | 0.49 | Example |
| 13 | Light Transmissive Support Body 1 | A-3 | — | — | 0 | B-5 | 62 Mass % | 300 | 100 ppm | — | 23 | 3.5 | 14 | A | 0.42 | Example |
| 14 | Light Transmissive Support Body 1 | A-3 | — | — | 0 | B-6 | 77 Mass % | 300 | 100 ppm | — | 42 | 3.5 | 14 | B | 0.47 | Example |
| 15 | Light Transmissive Support Body 1 | A-3 | — | — | 0 | B-7 | 80 Mass % | 300 | 100 ppm | — | 61 | 3.5 | 14 | C | 0.53 | Example |
| 16 | Light Transmissive Support Body 1 | A-3 | — | — | 0 | B-8 | 83 Mass % | 300 | 100 ppm | — | 70 | 3.5 | 14 | C | 0.53 | Example |
| 17 | Light Transmissive Support Body 1 | A-3 | — | — | 0 | B-9 | 50 Mass % | 300 | 100 ppm | — | 192 | 3.5 | 14 | A | 0.38 | Example |
| 18 | Light Transmissive Support Body 1 | A-3 | 300 | 100 ppm | 80 | B-1 | 62 Mass % | 300 | 100 ppm | — | 14 | 3.5 | None | E | 0.35 | Comparative Example |
| 19 | Light Transmissive Support Body 1 | A-3 | 2 | Under Air | 10 | B-1 | 62 Mass % | 300 | 100 ppm | — | 20 | 3.5 | 8 | A | 0.40 | Example |
| 20 | Light Transmissive Support Body 1 | A-3 | 10 | Under Air | 20 | B-1 | 62 Mass % | 300 | 100 ppm | — | 18 | 3.5 | 5 | A | 0.38 | Example |
| 21 | Light Transmissive Support Body 1 | A-3 | — | — | 0 | B-1 | 62 Mass % | 300 | 100 ppm | — | 25 | 4.5 | 13 | A | 0.42 | Example |

TABLE 3-continued

| Sample No | Support Body | First Coating | | | | Second Coating | | | | | | Moisture Permeability g/m²/day | Mixed Layer A (μm) | Mixed Layer B (μm) | Adhesiveness | Haze (%) | Reference |
|---|---|---|---|---|---|---|---|---|---|---|---|---|---|---|---|---|---|
| | | First Composition | Curing Conditions | | Reaction Rate % | Second Composition | Cyclic Olefin Structural Unit Content Ratio | Curing Conditions | | | | | | | | | |
| | | | UV Irradiation Dose (mJ/cm²) | Oxygen Concentration | | | | UV Irradiation Dose (mJ/cm²) | Oxygen Concentration | Post Heating | | | | | | | |
| 22 | Light Transmissive Support Body 2 | A-3 | — | — | 0 | B-1 | 62 Mass % | 300 | 100 ppm | — | 23 | 3.5 | 14 | A | 0.42 | Example |
| 23 | Light Transmissive Support Body 3 | A-3 | — | — | 0 | B-1 | 62 Mass % | 300 | 100 ppm | — | 23 | 4 | 13.5 | A | 0.42 | Example |
| 24 | Light Transmissive Support Body 4 | A-3 | — | — | 0 | B-1 | 62 Mass % | 300 | 100 ppm | — | 24 | 3.5 | 14 | A | 0.42 | Example |
| 25 | Light Transmissive Support Body 5 | A-3 | — | — | 0 | B-1 | 62 Mass % | 300 | 100 ppm | — | 24 | 4 | 13.5 | A | 0.42 | Example |

In Table 3, it is found that the optical film including the layer A in which at least the thermoplastic resin described above and at least the resin cured with light and/or heat are mixed, and the layer B in which at least the resin cured with light and/or heat and at least the cyclic polyolefin-based resin are mixed has low moisture permeability and haze, and has more excellent adhesiveness.

[Evaluation of Panel]

<Preparation of Polarizer>

1) Saponification of Film

A commercially available cellulose acylate film (Fujitac ZRD40, manufactured by Fujifilm Corporation) and various optical films 2 to 17, 19, 21, 24, and 25 prepared as described above were dipped in 1.5 mol/L of an NaOH aqueous solution (a saponification solution) maintained at 55° C. for 2 minutes, and the film was washed with water, and after that, the film was dipped in 0.05 mol/L of an aqueous solution of a sulfuric acid at 25° C. for 30 seconds, then was washed again with flowing water for 30 seconds, and thus the film was in a neutral state. Then, water draining was repeatedly performed 3 times by using an air knife, and the film was retained and dried in a drying zone at 70° C. for 15 seconds after the water draining, and thus a film which was subjected to a saponification treatment was prepared.

2) Preparation of Polarizing Element

Iodine was adsorbed in a stretched polyvinyl alcohol film according to Example 1 of JP2001-141926A, and thus a polarizing element having a film thickness of 20 μm was prepared.

3) Bonding

The optical film after the saponification described above (the surface of each of the optical films on which the coated layer was not laminated was arranged to be in contact with the polarizing element), the polarizing element prepared as described above, and the cellulose acylate film ZRD40 after the saponification were bonded in this order by using a PVA-based adhesive agent, and were heated and dried, and thus a polarizer was prepared.

At this time, the prepared polarizing element was arranged such that a longitudinal direction of the roll of the prepared polarizing element is parallel to a longitudinal direction of the optical film. In addition, the polarizing element was arranged such that the longitudinal direction of the roll of the polarizing element is parallel to the longitudinal direction of the roll of the cellulose acylate film ZRD40 described above.

(Preparation 2 of Polarizer)

The surface of the prepared optical films 21 and 22 on which the coated layer was not laminated was bonded to one surface of the polarizing element prepared as described above after being subjected to a corona treatment by using an acrylic adhesive agent. The commercially available cellulose acylate film ZRD40 which was saponified was bonded to the other surface side of the polarizing element prepared as described above by using a polyvinyl alcohol-based adhesive agent, and was dried at 70° C. for greater than or equal to 10 minutes, and thus a polarizer was prepared.

At this time, the prepared polarizing element was arranged such that the longitudinal direction of the roll of the polarizing element was parallel to the longitudinal direction of the optical film. In addition, the polarizing element was arranged such that the longitudinal direction of the roll of the polarizing element was parallel to the longitudinal direction of the roll of the cellulose acylate film ZRD40 described above.

<Mounting on IPS Panel>

Upper and lower polarizers of an IPS mode liquid crystal cell (42LS5600, manufactured by LG Display Co., Ltd.) were peeled off, and the polarizer prepared as described above was bonded such that ZRD40 was on the liquid crystal cell side. The polarizers were arranged in crossed nicol such that a transmission axis of the upper polarizer is in a vertical direction, and a transmission axis of the lower polarizer is in a horizontal direction.

A display device mounted by using the optical film described above which had small black display unevenness after the aging in a high temperature and high humidity environment and excellent display properties was obtained.

According to the present invention, an optical film having excellent adhesiveness between the light transmissive support body and each of the layers and low moisture permeability is able to be provided.

The present invention is described in detail with reference to specific embodiments, but it is obvious that various changes or corrections are able to be performed by a person skilled in the art without deviating from the gist and the range of the present invention.

This application is based upon Japanese Patent Application No. 2013-085260, filed on Apr. 15, 2013; the entire contents of which are incorporated herein by reference.

What is claimed is:

1. An optical film having a total haze of less than 1%, and comprising, in this order:
   a light transmissive support body containing a thermoplastic resin;
   a layer A essentially consisting of the thermoplastic resin, an initiator and a resin cured with light and/or heat, formed by applying a solution containing the initiator and a compound precursor of the resin cured with light and/or heat, to a surface of the light transmissive support body; and
   a layer B containing a cyclic polyolefin-based resin, an initiator and a resin same as the resin cured with light and/or heat, formed on a surface of the layer A opposite to the light transmissive support body;
   wherein a content of the thermoplastic resin in the layer A is 20 mass % to 50 mass % with respect to a total solid content of the layer A, and a content of the resin cured with light and/or heat in the layer A is 50 mass % to 80 mass % with respect to the total solid content of the layer A,
   wherein a content of the cyclic polyolefin-based resin in the layer B is 30 mass % to 95 mass % with respect to a total solid content of the layer B, and a content of the resin cured with light and/or heat in the layer B is 1 mass % to 60 mass % with respect to the total solid content of the layer B,
   wherein the thermoplastic resin comprises at least one selected from the group consisting of a (meth)acrylic resin, a polycarbonate-based resin, a polystyrene-based resin and a cellulose-based resin, and does not include the cyclic polyolefin-based resin,
   wherein the resin cured with light and/or heat is a cured material of a multifunctional monomer or oligomer having two or more epoxy groups, oxetanyl groups, or ethylenically unsaturated double bond groups,
   wherein the multifunctional monomer or oligomer is a compound having an alicyclic hydrocarbon group,
   wherein the cured material has excellent affinity with respect to the cyclic polyolefin-based material, and there is excellent adhesiveness between the light transmissive support body and the cured material, and between the layer A and the layer B.

2. The optical film according to claim 1,
wherein the alicyclic hydrocarbon group of the compound having an alicyclic hydrocarbon group is a group denoted by General Formula (I) or (IV) described below:

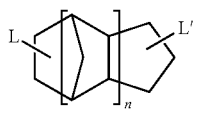
(I)

in General Formula (I),
L and L' each independently represent a bivalent or more linking group, and
n represents an integer of 1 to 3:

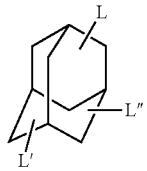
(IV)

in General Formula (IV),
L and L' each independently represent a bivalent or more linking group, and
L" represents a hydrogen atom or a bivalent or more linking group.

3. The optical film according to claim 1,
wherein the cyclic polyolefin-based resin is a polymer having a structural unit derived from cyclic olefin denoted by General Formula (B-II) or (B-III) described below:

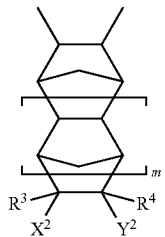
General Formula (B-II)

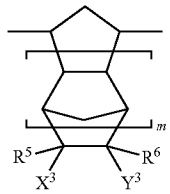
General Formula (B-III)

in General Formulas (B-II) and (B-III),
m represents an integer of 0 to 4;
$R^3$ to $R^6$ each independently represent a hydrogen atom or a hydrocarbon group having 1 to 10 carbon atoms, $X^2$ and $X^3$, and $Y^2$ and $Y^3$ each independently represent a hydrogen atom, a hydrocarbon group having 1 to 10 carbon atoms, a halogen atom, a hydrocarbon group having 1 to 10 carbon atoms which is substituted with a halogen atom, a vinyl group which may have a substituent group, a (meth)acryloyl group, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOZ$, $-(CH_2)_nN$, or $-(CO)_2O$, $(-CO)_2NR^{15}$ configured of $X^2$ and $Y^2$, or $X^3$ and $Y^3$; and $R^{11}$, $R^{12}$, $R^{13}$, $R^{14}$, and $R^{15}$ each independently represent a hydrogen atom, a hydrocarbon group having 1 to 20 carbon atoms, Z represents a hydrocarbon group or a hydrocarbon group substituted with halogen, W represents $SiR^{16}_pD_{3-p}$ wherein $R^{16}$ represents a hydrocarbon group having 1 to 10 carbon atoms, D represents a halogen atom, $-OCOR^{16}$, or $-OR^{16}$, and p represents an integer of 0 to 3, and n represents an integer of 0 to 10.

4. The optical film according to claim 3,
wherein in General Formula (B-II) or (B-III) described above, m represents 0 or 1, and $R^3$ to $R^6$, $X^2$ and $X^3$, and $Y^2$ and $Y^3$ each represent a hydrogen atom.

5. The optical film according to claim 1,
wherein the cyclic polyolefin-based resin contains the structural unit derived from the cyclic olefin in the amount of less than or equal to 90 mass % with respect to the total mass of the cyclic polyolefin-based resin.

6. The optical film according to claim 1,
wherein the thermoplastic resin contained in the light transmissive support body contains the cellulose-based resin as a main component.

7. The optical film according to claim 1,
wherein the thermoplastic resin contained in the light transmissive support body contains the (meth)acrylic resin as a main component.

8. The optical film according to claim 1,
wherein moisture permeability of the optical film at 40° C. and a relative humidity of 90% is less than 200 g/m²/day.

9. A polarizer including the optical film according to claim 1.

10. An image display device, comprising:
the optical film according to claim 1.

11. The optical film according to claim 1,
wherein the cellulose-based resin is a cellulose acylate having two or more types of acyl groups.

12. The optical film according to claim 1,
wherein the thermoplastic resin contained in the light transmissive support body contains the cellulose-based resin or the (meth)acrylic resin as a main component.

13. The optical film according to claim 1, wherein a thickness of the layer A is 0.1 μm to 20 μm.

14. The optical film according to claim 1, wherein a thickness of the layer B is 0.5 μm to 30 μm.

15. A process for producing an optical film, the process comprising, in this order:
(a) a step of disposing a coated layer by applying a first composition containing at least a compound precursor of a resin cured with light and/or heat, an initiator and a first solvent onto a surface of a light transmissive support body;
(b) a step of applying a second composition containing at least a cyclic polyolefin-based resin and a second solvent onto the same surface as that of the light transmissive support body on which the coated layer is disposed in the step of (a); and (c) a step of forming a resin by curing the compound precursor of the resin cured with light and/or heat using light irradiation and/or heating; thus forming an optical film having a total haze of less than 1%, and comprising, in this order;

a light transmissive support body containing a thermoplastic resin;

a layer A essentially consisting of the thermoplastic resin, the initiator and the resin cured with light and/or heat, a layer B containing the cyclic polyolefin-based resin, the initiator and a resin same as the resin cured with light and/or heat, formed on a surface of the layer A opposite to the light transmissive support body;

wherein a content of the thermoplastic resin in the layer A is 20 mass % to 50 mass % with respect to a total solid content of the layer A, and a content of the resin cured with light and/or heat in the layer A is 50 mass % to 80 mass % with respect to the total solid content of the layer A, wherein a content of the cyclic polyolefin-based resin is 30 mass % to 95 mass % with respect to a total solid content of the layer B, and a content of the resin cured with light and/or heat in the layer B is 1 mass % to 60 mass % with respect to the total solid content of the layer B, wherein the thermoplastic resin comprises at least one selected from the group consisting of a (meth)acrylic resin, a polycarbonate-based resin, a polystyrene-based resin and a cellulose-based resin, and does not include the cyclic polyolefin-based resin, wherein the resin cured with light and/or heat is a cured material of a multifunctional monomer or oligomer having two or more epoxy groups, oxetanyl groups, or ethylenically unsaturated double bond groups, wherein the multifunctional monomer or oligomer is a compound having an alicyclic hydrocarbon group, wherein the cured material has excellent affinity with respect to the cyclic polyolefin-based material, and there is excellent adhesiveness between the light transmissive support body and the cured material, and between the layer A and the layer B.

16. The process for producing an optical film according to claim 15, wherein a reaction rate of the compound which is able to form a resin by being cured with light and/or heat in the coated layer obtained in the step of (a) at the time of performing the step of (b) is less than 80%.

17. The process for producing an optical film according to claim 15, wherein the compound which is able to form a resin by being cured with light and/or heat is a monomer or an oligomer which is dissolved in the second solvent in the amount of greater than or equal to 30 mass %.

18. The process for producing an optical film according to claim 15, wherein the second solvent is an alicyclic hydrocarbon-based solvent or an aromatic hydrocarbon-based solvent.

19. The process for producing an optical film according to claim 18, wherein the alicyclic hydrocarbon-based solvent or the aromatic hydrocarbon-based solvent is at least one selected from cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroinden, cyclooctane, toluene, and xylene.

20. The process for producing an optical film according to claim 15, wherein the first solvent is a solvent which dissolves or swells the light transmissive support body.

21. The process for producing an optical film according to claim 20, wherein the solvent which dissolves or swells the light transmissive support body is at least one selected from methyl ethyl ketone, methyl acetate, methyl acetoacetate, cyclohexanone, acetone, dimethyl carbonate, and diethyl carbonate.

* * * * *